US012803938B2

(12) United States Patent
Rosenberg et al.

(10) Patent No.: US 12,803,938 B2
(45) Date of Patent: Nov. 17, 2026

(54) METHODS AND SYSTEMS FOR ENABLING REAL-TIME CONVERSATIONAL INTERACTION WITH AN EMBODIED LARGE-SCALE PERSONIFIED COLLECTIVE INTELLIGENCE

(71) Applicant: UNANIMOUS A.I., INC., Arlington, VA (US)

(72) Inventors: Louis B. Rosenberg, San Luis Obispo, CA (US); Gregg Willcox, Seattle, WA (US)

(73) Assignee: UNANIMOUS A.I., INC., Arlington, VA (US)

( * ) Notice: Subject to any disclaimer, the term of this patent is extended or adjusted under 35 U.S.C. 154(b) by 365 days.

(21) Appl. No.: 18/676,768

(22) Filed: May 29, 2024

(65) Prior Publication Data

US 2024/0323152 A1 Sep. 26, 2024

Related U.S. Application Data

(63) Continuation-in-part of application No. 18/588,851, filed on Feb. 27, 2024, now Pat. No. 12,166,735, and (Continued)

(51) Int. Cl.

*H04L 51/56* (2022.01)
*H04L 51/04* (2022.01)

(Continued)

(52) U.S. Cl.

CPC ............ *H04L 51/046* (2013.01); *H04L 51/04* (2013.01); *H04L 51/216* (2022.05); *H04L 51/56* (2022.05)

(58) Field of Classification Search

CPC ....... H04L 51/46; H04L 51/56; H04L 51/216; H04L 51/04

(Continued)

(56) References Cited

U.S. PATENT DOCUMENTS 5,867,799 A 2/1999 Lang
6,567,797 B1 5/2003 Schuetze (Continued)

OTHER PUBLICATIONS

Rosenberg et al; U.S. Appl. No. 18/657,612, filed May 7, 2024.

(Continued)

*Primary Examiner* — Nguyen T Truong

(74) *Attorney, Agent, or Firm* — Fitch, Even, Tabin & Flannery LLP

(57) ABSTRACT

Methods and systems for real-time conversational interaction with an embodied large-scale personified collective intelligence are described. For example, a user may communicate with a personified collective intelligence (e.g., an artificial intelligence (AI) powered conversational agent based on aggregated input collected from a large number of human participants). In some aspects, the user may ask questions and/or hold a conversation with to a real-time personified collective intelligence agent, which may respond, to inquiries received from the user, based on real-time responses of a plurality of human participants. For instance, a plurality of human participants may respond to the inquiries, and a large language model may process (e.g., receive, analyze, and aggregate) the plurality of inquiry responses to determine a collective intelligence response that is expressed by the personified collective intelligence agent (e.g., in a first-person conversational form to the user). In some such embodiments, the human participants are organized into an interconnected network of interconnected subgroups for local deliberation, efficient aggregation, and amplified collective intelligence.

52 Claims, 22 Drawing Sheets

Related U.S. Application Data a continuation-in-part of application No. 18/367,089, filed on Sep. 12, 2023, now Pat. No. 12,190,294, said application No. 18/588,851 is a continuation of application No. 18/240,286, filed on Aug. 30, 2023, now Pat. No. 11,949,638, said application No. 18/367,089 is a continuation-in-part of application No. 18/240,286, filed on Aug. 30, 2023, now Pat. No. 11,949,638.

(60) Provisional application No. 63/538,833, filed on Sep. 17, 2023, provisional application No. 63/456,483, filed on Apr. 1, 2023, provisional application No. 63/451,614, filed on Mar. 12, 2023, provisional application No. 63/449,986, filed on Mar. 4, 2023.

(51) Int. Cl.
*H04L 51/046* (2022.01)
*H04L 51/216* (2022.01)

(58) Field of Classification Search
USPC .......... 706/46
See application file for complete search history.

(56) References Cited

U.S. PATENT DOCUMENTS

| | | | |
|---|---|---|---|
| 6,606,615 | B1 | 8/2003 | Jennings |
| 6,792,399 | B1 | 9/2004 | Phillips |
| 6,903,723 | B1 | 6/2005 | Forest |
| 7,040,982 | B1 | 5/2006 | Jarvis |
| 7,155,510 | B1 | 12/2006 | Kaplan |
| 7,451,213 | B2 | 11/2008 | Kaplan |
| 7,624,077 | B2 | 11/2009 | Bonabeau |
| 7,653,726 | B2 | 1/2010 | Kaplan |
| 7,690,991 | B2 | 4/2010 | Black |
| 7,856,602 | B2 | 12/2010 | Armstrong |
| 7,880,741 | B2 | 2/2011 | Proebsting |
| 7,937,285 | B2 | 5/2011 | Goldberg |
| 7,958,006 | B2 | 6/2011 | Keil |
| 8,209,250 | B2 | 6/2012 | Bradway |
| 8,229,824 | B2 | 7/2012 | Berg |
| 8,250,071 | B1 | 8/2012 | Killalea |
| 8,341,065 | B2 | 12/2012 | Berg |
| 8,396,777 | B1 | 3/2013 | Fine |
| 8,468,580 | B1 | 6/2013 | Casey |
| 8,583,470 | B1 | 11/2013 | Fine |
| 8,612,331 | B2 | 12/2013 | Hanson |
| 8,660,972 | B1 | 2/2014 | Heidenreich |
| 8,676,735 | B1 | 3/2014 | Heidenreich |
| 8,682,837 | B2 | 3/2014 | Skelton |
| 8,814,660 | B2 | 8/2014 | Thompson |
| 8,858,313 | B1 | 10/2014 | Selfors |
| 9,005,016 | B2 | 4/2015 | Amaitis |
| 9,772,759 | B2 | 9/2017 | Hogan |
| 9,852,239 | B2 | 12/2017 | Natarajan |
| 9,947,174 | B2 | 4/2018 | Rangarajan |
| 10,277,645 | B2 | 4/2019 | Rosenberg |
| 10,310,802 | B2 | 6/2019 | Rosenberg |
| 10,353,551 | B2 | 7/2019 | Rosenberg |
| 10,410,287 | B2 | 9/2019 | Marsh |
| 10,515,516 | B1 | 12/2019 | Eckman |
| 10,551,999 | B2 | 2/2020 | Rosenberg |
| 10,713,303 | B2 | 7/2020 | Ashoori |
| 10,817,158 | B2 | 10/2020 | Rosenberg |
| 10,902,194 | B2 | 1/2021 | Toronto |
| 11,037,400 | B2 | 6/2021 | Cohen |
| 11,360,656 | B2 | 6/2022 | Rosenberg |
| 11,949,638 | B1 | 4/2024 | Rosenberg |
| 12,001,667 | B2 | 6/2024 | Rosenberg |
| 12,166,735 | B2 | 12/2024 | Rosenberg |
| 12,190,294 | B2 | 1/2025 | Rosenberg |
| 12,231,383 | B2 | 2/2025 | Rosenberg |
| 12,234,383 | B2 | 2/2025 | Rosenberg |
| 2002/0152110 | A1 | 10/2002 | Stewart |
| 2003/0023685 | A1 | 1/2003 | Cousins |
| 2003/0033193 | A1 | 2/2003 | Holloway |
| 2003/0079218 | A1 | 4/2003 | Goldberg |
| 2003/0088458 | A1 | 5/2003 | Afeyan |
| 2003/0100357 | A1 | 5/2003 | Walker |
| 2003/0119579 | A1 | 6/2003 | Walker |
| 2003/0208535 | A1 | 11/2003 | Appleman |
| 2003/0210227 | A1 | 11/2003 | Smith |
| 2003/0227479 | A1 | 12/2003 | Mizrahi |
| 2004/0015429 | A1 | 1/2004 | Tighe |
| 2004/0064394 | A1 | 4/2004 | Wallman |
| 2005/0067493 | A1 | 3/2005 | Urken |
| 2006/0010057 | A1 | 1/2006 | Bradway |
| 2006/0204945 | A1 | 9/2006 | Masuichi |
| 2006/0287907 | A1 | 12/2006 | Kim |
| 2007/0011073 | A1 | 1/2007 | Gardner |
| 2007/0055610 | A1 | 3/2007 | Palestrant |
| 2007/0067211 | A1 | 3/2007 | Kaplan |
| 2007/0073606 | A1 | 3/2007 | Lai |
| 2007/0078977 | A1 | 4/2007 | Kaplan |
| 2007/0094601 | A1 | 4/2007 | Greenberg |
| 2007/0099162 | A1 | 5/2007 | Sekhar |
| 2007/0208727 | A1 | 9/2007 | Saklikar |
| 2007/0209069 | A1 | 9/2007 | Saklikar |
| 2007/0216712 | A1 | 9/2007 | Louch |
| 2007/0226296 | A1 | 9/2007 | Lowrance |
| 2008/0003559 | A1 | 1/2008 | Toyama |
| 2008/0016463 | A1 | 1/2008 | Marsden |
| 2008/0103877 | A1 | 5/2008 | Gerken |
| 2008/0140477 | A1 | 6/2008 | Tevanian |
| 2008/0140688 | A1 | 6/2008 | Clayton |
| 2008/0189634 | A1 | 8/2008 | Tevanian |
| 2009/0063379 | A1 | 3/2009 | Kelly |
| 2009/0063991 | A1 | 3/2009 | Baron |
| 2009/0063995 | A1 | 3/2009 | Baron |
| 2009/0073174 | A1 | 3/2009 | Berg |
| 2009/0076939 | A1 | 3/2009 | Berg |
| 2009/0076974 | A1 | 3/2009 | Berg |
| 2009/0170595 | A1 | 7/2009 | Walker |
| 2009/0182624 | A1 | 7/2009 | Koen |
| 2009/0239205 | A1 | 9/2009 | Morgia |
| 2009/0276764 | A1 | 11/2009 | Ghorbani |
| 2010/0100204 | A1 | 4/2010 | Ng |
| 2010/0144426 | A1 | 6/2010 | Winner |
| 2010/0145715 | A1 | 6/2010 | Cohen |
| 2010/0198648 | A1 | 8/2010 | Bank |
| 2010/0199191 | A1 | 8/2010 | Takahashi |
| 2010/0205541 | A1 | 8/2010 | Rapaport |
| 2011/0003627 | A1 | 1/2011 | Nicely |
| 2011/0016137 | A1 | 1/2011 | Goroshevsky |
| 2011/0208328 | A1 | 8/2011 | Cairns |
| 2011/0320374 | A1 | 12/2011 | Wang |
| 2012/0011006 | A1 | 1/2012 | Schultz |
| 2012/0042013 | A1 | 2/2012 | Roman |
| 2012/0088222 | A1 | 4/2012 | Considine |
| 2012/0101933 | A1 | 4/2012 | Hanson |
| 2012/0110087 | A1 | 5/2012 | Culver |
| 2012/0179755 | A1 | 7/2012 | Fishkin |
| 2012/0191774 | A1 | 7/2012 | Bhaskaran |
| 2012/0233229 | A1 | 9/2012 | Steiner |
| 2012/0290950 | A1 | 11/2012 | Rapaport |
| 2012/0322540 | A1 | 12/2012 | Shechtman |
| 2013/0035981 | A1 | 2/2013 | Brown |
| 2013/0097245 | A1 | 4/2013 | Adarraga |
| 2013/0132284 | A1 | 5/2013 | Convertino |
| 2013/0184039 | A1 | 7/2013 | Steir |
| 2013/0191181 | A1 | 7/2013 | Balestrieri |
| 2013/0203506 | A1 | 8/2013 | Brown |
| 2013/0254146 | A1 | 9/2013 | Ellis |
| 2013/0311904 | A1 | 11/2013 | Tien |
| 2013/0317966 | A1 | 11/2013 | Bass |
| 2014/0012780 | A1 | 1/2014 | Sanders |
| 2014/0057240 | A1 | 2/2014 | Colby |
| 2014/0074751 | A1 | 3/2014 | Rocklitz |
| 2014/0075004 | A1 | 3/2014 | Van Dusen |
| 2014/0087841 | A1 | 3/2014 | Council |
| 2014/0089233 | A1 | 3/2014 | Ellis |
| 2014/0100924 | A1 | 4/2014 | Ingenito |
| 2014/0108293 | A1 | 4/2014 | Barrett |

(56) References Cited

U.S. PATENT DOCUMENTS

| | | | | |
|---|---|---|---|---|
| 2014/0128162 | A1 | 5/2014 | Arafat | |
| 2014/0155142 | A1 | 6/2014 | Conroy | |
| 2014/0162241 | A1 | 6/2014 | Morgia | |
| 2014/0214831 | A1 | 7/2014 | Chi | |
| 2014/0257930 | A1 | 9/2014 | Lehmann | |
| 2014/0278835 | A1 | 9/2014 | Moseson | |
| 2014/0279625 | A1 | 9/2014 | Carter | |
| 2014/0282586 | A1 | 9/2014 | Shear | |
| 2014/0337097 | A1 | 11/2014 | Farlie | |
| 2014/0358825 | A1 | 12/2014 | Phillipps | |
| 2014/0364181 | A1 | 12/2014 | Emura | |
| 2015/0012339 | A1 | 1/2015 | Onischuk | |
| 2015/0065214 | A1 | 3/2015 | Olson | |
| 2015/0089399 | A1 | 3/2015 | Megill | |
| 2015/0120619 | A1 | 4/2015 | Baughman | |
| 2015/0156233 | A1 | 6/2015 | Bergo | |
| 2015/0170050 | A1 | 6/2015 | Price | |
| 2015/0236866 | A1 | 8/2015 | Colby | |
| 2015/0242755 | A1 | 8/2015 | Gross | |
| 2015/0294527 | A1 | 10/2015 | Kolomiiets | |
| 2015/0302308 | A1 | 10/2015 | Bartek | |
| 2015/0310687 | A1 | 10/2015 | Morgia | |
| 2015/0331601 | A1 | 11/2015 | Rosenberg | |
| 2015/0339020 | A1 | 11/2015 | D Amore | |
| 2015/0347903 | A1 | 12/2015 | Saxena | |
| 2015/0378587 | A1 | 12/2015 | Falaki | |
| 2016/0034305 | A1 | 2/2016 | Shear | |
| 2016/0044073 | A1 | 2/2016 | Rosenberg | |
| 2016/0048274 | A1 | 2/2016 | Rosenberg | |
| 2016/0055236 | A1 | 2/2016 | Frank | |
| 2016/0057182 | A1 | 2/2016 | Rosenberg | |
| 2016/0062735 | A1 | 3/2016 | Wilber | |
| 2016/0078458 | A1 | 3/2016 | Gold | |
| 2016/0082348 | A1 | 3/2016 | Kehoe | |
| 2016/0092989 | A1 | 3/2016 | Marsh | |
| 2016/0098778 | A1 | 4/2016 | Blumenthal | |
| 2016/0133095 | A1 | 5/2016 | Shraibman | |
| 2016/0170594 | A1 | 6/2016 | Rosenberg | |
| 2016/0170616 | A1 | 6/2016 | Rosenberg | |
| 2016/0189025 | A1 | 6/2016 | Hayes | |
| 2016/0274779 | A9 | 9/2016 | Rosenberg | |
| 2016/0335647 | A1 | 11/2016 | Rebrovick | |
| 2016/0349976 | A1 | 12/2016 | Lauer | |
| 2016/0357418 | A1 | 12/2016 | Rosenberg | |
| 2016/0366200 | A1 | 12/2016 | Healy | |
| 2017/0091633 | A1 | 3/2017 | Vemula | |
| 2017/0300198 | A1 | 10/2017 | Rosenberg | |
| 2017/0337498 | A1 | 11/2017 | Rahimi | |
| 2018/0204184 | A1 | 7/2018 | Rosenberg | |
| 2018/0205676 | A1 | 7/2018 | Goyal | |
| 2018/0302233 | A1 | 10/2018 | Viera | |
| 2018/0375676 | A1 | 12/2018 | Bader-Natal | |
| 2019/0066133 | A1 | 2/2019 | Cotton | |
| 2019/0121529 | A1 | 4/2019 | Rosenberg | |
| 2020/0005341 | A1 | 1/2020 | Marsh | |
| 2020/0265194 | A1 | 8/2020 | Ohbitsu | |
| 2020/0287849 | A1 | 9/2020 | G | |
| 2021/0004150 | A1 | 1/2021 | Rosenberg | |
| 2021/0136023 | A1 | 5/2021 | Chang | |
| 2021/0150443 | A1 | 5/2021 | Shih | |
| 2021/0209554 | A1 | 7/2021 | Hill | |
| 2021/0409354 | A1 | 12/2021 | Jang | |
| 2022/0276774 | A1 | 9/2022 | Rosenberg | |
| 2023/0236718 | A1 | 7/2023 | Rosenberg | |
| 2024/0168933 | A1 * | 5/2024 | Emma | G06F 16/22 |
| 2024/0177171 | A1 | 5/2024 | Thangappa | |
| 2024/0296420 | A1 | 9/2024 | Rosenberg | |
| 2024/0297857 | A1 | 9/2024 | Rosenberg | |
| 2024/0297858 | A1 | 9/2024 | Rosenberg | |
| 2024/0297859 | A1 | 9/2024 | Rosenberg | |
| 2024/0305711 | A1 | 9/2024 | Yekollu | |
| 2025/0016124 | A1 | 1/2025 | Rosenberg | |
| 2025/0055820 | A1 | 2/2025 | Rosenberg | |
| 2025/0078033 | A1 | 3/2025 | Rosenberg | |
| 2025/0080481 | A1 | 3/2025 | Rosenberg | |
| 2025/0141820 | A1 | 5/2025 | Rosenberg | |

OTHER PUBLICATIONS

Puleston et al.; "Predicting the Future: Primary Research Exploring the Science of Prediction"; Copyright Esomar 2014; 31 pages; (Year: 2014).
Quora; "What are Some Open Source Prediction Market Systems?"; retrieved from https://www.quora.com/What-are-some-Open-Source-Prediction-Market-systems; on Mar. 19, 2020 (Year: 2016).
Rosenberg; U.S. Appl. No. 17/024,580, filed Sep. 17, 2020.
Rosenberg; U.S. Appl. No. 16/230,759, filed Dec. 21, 2018.
Rosenberg; U.S. Appl. No. 17/744,464, filed May 13, 2022.
Rosenberg; U.S. Appl. No. 18/194,056, filed Mar. 31, 2023.
Rosenberg; U.S. Appl. No. 18/240,286, filed Aug. 30, 2023.
Rosenberg; U.S. Appl. No. 18/584,802, filed Feb. 22, 2024.
USPTO; Non-Final Office Action for U.S. Appl. No. 17/024,580 mailed Nov. 23, 2021.
USPTO; Non-Final Office Action for U.S. Appl. No. 16/230,759 mailed Mar. 26, 2020.
USPTO; Notice of Allowance for U.S. Appl. No. 17/024,580 mailed Apr. 12, 2022.
USPTO; Notice of Allowance for U.S. Appl. No. 18/240,286 mailed Jan. 31, 2024.
USPTO; Notice of Allowance for U.S. Appl. No. 16/230,759 mailed Jul. 17, 2020.
USPTO; Notice of Allowance for U.S. Appl. No. 18/194,056 mailed Nov. 20, 2023.
USPTO; Notice of Allowance issued in U.S. Appl. No. 17/744,464 mailed Dec. 20, 2023.
USPTO; Notice of Allowance issued in U.S. Appl. No. 17/744,464 mailed Oct. 24, 2023.
Rosenberg; U.S. Appl. No. 18/588,851, filed Feb. 27, 2024.
Rosenberg; U.S. Appl. No. 18/639,963, filed Apr. 19, 2024.
Rosenberg; U.S. Appl. No. 14/925,837, filed Oct. 28, 2015.
USPTO; Notice of Allowance for U.S. Appl. No. 14/925,837 mailed Nov. 7, 2019.
USPTO; Final Office Action issued in U.S. Appl. No. 14/925,837 mailed Aug. 7, 2019.
USPTO; Non-Final Office Action issued in U.S. Appl. No. 14/925,837 mailed Apr. 3, 2018.
Rosenberg; U.S. Appl. No. 18/367,089, filed Sep. 12, 2023.
PCT; International Search Report and Written Opinion of the International Searching Authority for PCT/US2024/017887 mailed Apr. 11, 2024.
Rosenberg et al; "Hyperchat and Hypervideo: Enabling Real-time Groupwise Conversations at Unlimited Scale"; 2025 IEEE 6th Annual World AI IoT Congress; May 1, 2025; pp. 530-536.
Rosenberg et al: "Conversational Swarms of Humans and AI Agents enable Hybrid Collaborative Decision-making"; IEEE 15th Annual Ubiquitous Computing, Electronics, and Mobile Communications Conference Oct. 2024; published online Sep. 22, 2024; 7 pages.
Rosenberg; "Collective Superintelligence: Enabling Real-Time Conversational Deliberations Among Humans and AI Agents at Unprecedented Scale"; Foundations and Frontiers in Decision Science; IntechOpen; Jun. 9, 2025; 21 pages.
Rosenberg; U.S. Appl. No. 18/887,029, filed Sep. 16, 2024.
Rosenberg; U.S. Appl. No. 18/931,511, filed Oct. 30, 2024.
Rosenberg; U.S. Appl. No. 18/949,863, filed Nov. 15, 2024.
Rosenberg; U.S. Appl. No. 18/949,891, filed Nov. 15, 2024.
Rosenberg; U.S. Appl. No. 19/007,215, filed Dec. 31, 2024.
Rosenberg; U.S. Appl. No. 19/241,852, filed Jun. 18, 2025.
USPTO; Non-Final Office Action for U.S. Appl. No. 18/584,802 mailed Sep. 30, 2024.
USPTO; Non-Final Office Action issued in U.S. Appl. No. 18/639,963 mailed Jun. 16, 2025.
USPTO; Notice of Allowance for U.S. Appl. No. 18/657,612 mailed Oct. 3, 2024.
USPTO; Notice of Allowance issued in U.S. Appl. No. 18/588,851 mailed Sep. 26, 2024.

(56) References Cited

OTHER PUBLICATIONS

USPTO; Notice of Allowance issued in U.S. Appl. No. 19/367,089 mailed Oct. 9, 2024.

* cited by examiner

700

1300

1400

METHODS AND SYSTEMS FOR ENABLING REAL-TIME CONVERSATIONAL INTERACTION WITH AN EMBODIED LARGE-SCALE PERSONIFIED COLLECTIVE INTELLIGENCE

CROSS-REFERENCE TO RELATED APPLICATION

This application claims the benefit of U.S. Provisional Application No. 63/538,833, filed Sep. 17, 2023, for METHOD AND SYSTEM FOR ENABLING REAL-TIME CONVERSATIONAL INTERACTION WITH AN EMBODIED LARGE-SCALE PERSONIFIED COLLECTIVE INTELLIGENCE which is incorporated in its entirety herein by reference.

This application is a continuation-in-part of U.S. patent application Ser. No. 18/588,851 filed Feb. 27, 2024, for METHODS AND SYSTEMS FOR ENABLING CONVERSATIONAL DELIBERATION ACROSS LARGE NETWORKED POPULATIONS, which is a continuation of U.S. patent application Ser. No. 18/240,286, filed Aug. 30, 2023, for METHODS AND SYSTEMS FOR HYPERCHAT CONVERSATIONS AMONG LARGE NETWORKED POPULATIONS WITH COLLECTIVE INTELLIGENCE AMPLIFICATION, now U.S. Pat. No. 11,949,638, issued on Apr. 2, 2024, which claims the benefit of U.S. Provisional Application No. 63/449,986, filed Mar. 4, 2023, for METHOD AND SYSTEM FOR "HYPERCHAT" CONVERSATIONS AMONG LARGE NETWORKED POPULATIONS WITH COLLECTIVE INTELLIGENCE AMPLIFICATION, which are incorporated in their entirety herein by reference.

This application is a continuation-in-part of U.S. patent application Ser. No. 18/367,089 filed Sep. 12, 2023, for METHODS AND SYSTEMS FOR HYPERCHAT AND HYPERVIDEO CONVERSATIONS ACROSS NETWORKED HUMAN POPULATIONS WITH COLLECTIVE INTELLIGENCE AMPLIFICATION, which claims the benefit of U.S. Provisional Application No. 63/449,986, filed Mar. 4, 2023, for METHOD AND SYSTEM FOR "HYPERCHAT" CONVERSATIONS AMONG LARGE NETWORKED POPULATIONS WITH COLLECTIVE INTELLIGENCE AMPLIFICATION, U.S. Provisional Application No. 63/451,614, filed Mar. 12, 2023, for METHOD AND SYSTEM FOR HYPERCHAT CONVERSATIONS ACROSS NETWORKED HUMAN POPULATIONS WITH COLLECTIVE INTELLIGENCE AMPLIFICATION, and U.S. Provisional Application No. 63/456,483, filed Apr. 1, 2023, for METHOD AND SYSTEM FOR HYPERCHAT AND HYPERVIDEO CONVERSATIONS AMONG NETWORKED HUMAN POPULATIONS WITH COLLECTIVE INTELLIGENCE AMPLIFICATION, all of which are incorporated in their entirety herein by reference.

This application is a continuation-in-part of U.S. patent application Ser. No. 18/367,089 filed Sep. 12, 2023, for METHODS AND SYSTEMS FOR HYPERCHAT AND HYPERVIDEO CONVERSATIONS ACROSS NETWORKED HUMAN POPULATIONS WITH COLLECTIVE INTELLIGENCE AMPLIFICATION, which is a continuation-in-part of U.S. patent application Ser. No. 18/240,286, filed Aug. 30, 2023, for METHODS AND SYSTEMS FOR HYPERCHAT CONVERSATIONS AMONG LARGE NETWORKED POPULATIONS WITH COLLECTIVE INTELLIGENCE AMPLIFICATION, now U.S. Pat. No. 11,949,638, issued on Apr. 2, 2024, which claims the benefit of U.S. Provisional Application No. 63/449,986, filed Mar. 4, 2023, for METHOD AND SYSTEM FOR "HYPERCHAT" CONVERSATIONS AMONG LARGE NETWORKED POPULATIONS WITH COLLECTIVE INTELLIGENCE AMPLIFICATION, which are incorporated in their entirety herein by reference.

U.S. Pat. No. 10,551,999 filed on Oct. 28, 2015, U.S. Pat. No. 10,817,158 filed on Dec. 21, 2018, U.S. Pat. No. 11,360,656 filed on Sep. 17, 2020, and U.S. application Ser. No. 17/744,464 filed on May 13, 2022, the contents of are incorporated by reference herein in their entirety.

BACKGROUND OF THE INVENTION

1. Field of the Invention

The present invention relates generally to computer mediated interaction, and more specifically to real-time conversational interaction with collective intelligence (i.e., embodied large-scale personified collective intelligence).

2. Discussion of the Related Art

Interactive human dialog systems (e.g., whether enabled through text, video, or virtual reality (VR)) may enable networked teams and other distributed groups to hold real-time interactive coherent conversation. For example, interactive human dialog systems may enable deliberative conversations, debating issues and reaching decisions, setting priorities, or otherwise collaborating in real-time.

Unfortunately, real-time conversations become much less effective as the number of participants increases. Whether conducted through text, voice, video, or VR, it is very difficult to hold a coherent interactive conversation among groups that are larger than 12 to 15 people (e.g., with some experts/systems suggesting the ideal group size for interactive coherent conversation should be limited to between 5-7 people). This has created a barrier to harnessing the collective intelligence of large groups through real-time interactive coherent conversation.

SUMMARY

The present disclosure describes systems and methods that enable real-time conversational interaction with collective intelligence (e.g., with an embodied large-scale personified collective intelligence). In some embodiments, a user (e.g., an interviewer) may hold a real-time conversation (e.g., via text, voice, video, or virtual reality (VR) chat) with a personified collective intelligence comprised of a large number of human participants. In some aspects, the personified collective intelligence may include, or refer to, an artificial intelligence (AI) powered conversational agent based on aggregated input collected from the human participants.

In some embodiments, according to the techniques and systems described herein, a user (e.g., an interviewer) may ask questions to a real-time personified collective intelligence agent that responds, to inquiries received from the interviewer, based on real-time responses of a plurality of human participants. For instance, a plurality of human participants may respond to the interviewer inquiries, and a large language model may process (e.g., receive, analyze, and aggregate) the plurality of inquiry responses to determine a collective intelligence response that is expressed by the personified collective intelligence agent.

Accordingly, large populations of human participants may contribute sentiment, in real-time, to a collective intelligence (e.g., to a personified collective intelligence agent or to a collective superintelligence (CSI)), which may significantly enhance the intellectual capabilities of the conversational system (e.g., of the conversational interaction, of the individual participants, etc.).

An apparatus, system, and method for enabling real-time conversational interaction with an embodied large-scale personified collective intelligence are described. One or more aspects of the apparatus, system, and method include a collective intelligence server configured to receive inquiries from an interviewer and route a representation of the inquiries to a plurality of human participants; a plurality of computing devices, each associated with one of the plurality of human participants, configured to receive and display the inquiries and to receive and transmit a plurality of responses from the plurality of human participants to the collective intelligence server; a large language model configured to receive, analyze, and aggregate the plurality of responses to determine a collective intelligence response; and a personified collective intelligence agent configured to receive and express the collective intelligence response in a first-person conversational form.

A method, apparatus, non-transitory computer readable medium, and system for enabling real-time conversational interaction with an embodied large-scale personified collective intelligence are described. One or more aspects of the method, apparatus, non-transitory computer readable medium, and system include receiving inquiries from an interviewer at a collective intelligence server and routing a representation of the inquiries to a plurality of human participants; receiving and displaying the inquiries on a plurality of computing devices, each associated with one of the plurality of human participants; receiving from at least a portion of the plurality of human participants a plurality of responses; transmitting the plurality of responses from the at least a portion of the plurality of human participants to the collective intelligence server; receiving, analyzing, and aggregating the plurality of responses using a large language model to determine a collective intelligence response; transmitting the collective intelligence response from the collective intelligence server to a computing device used by the interviewer; and receiving and expressing the collective intelligence response in a first-person conversational form using a personified collective intelligence agent on the computing device used by the interviewer.

DETAILED DESCRIPTION

Figure 1:
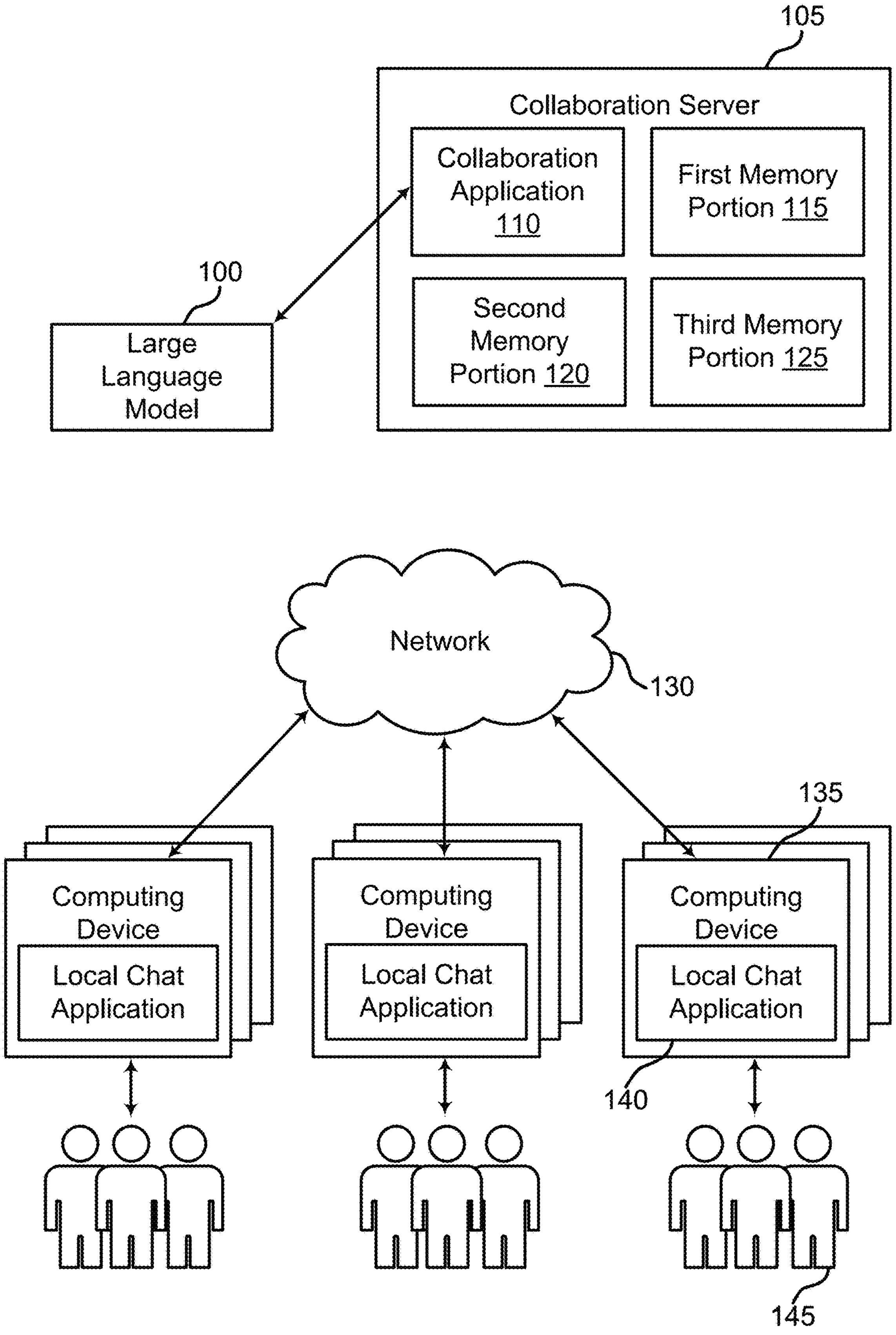
FIG. 1 shows an example of a collaboration system according to aspects of the present disclosure.

Computer networking technologies enable groups of distributed individuals to hold conversations online through text chat, voice chat, video chat, or in 3D immersive meeting environments via avatars that convey voice information as well as facial expression information and body gestural information. In some cases, real-time text-based chat rooms, real-time video conferencing platforms (e.g., Zoom, etc.) to real-time virtual worlds (e.g., Horizon World from Meta, etc.) may be used for distributed groups meet and to hold conversations, enabling teams to reach decisions, make plans, or converge on solutions. In some cases, the real-time communication technologies may be used for conversations among small, distributed groups.

However, such real-time technologies may be increasingly difficult to use as the number of participants increases. In some examples, the real-time group dialog may be conducted via text, voice, video, or an immersive avatar. As a result, a real-time conversation among groups that are larger than 5 to 7 people may be difficult and the conversation quality may degrade rapidly beyond groups of 10 to 12 people. Therefore, there is a need in the art to enable distributed conversations among very large groups of networked users via text, voice, video, or immersive avatars. For example, the methods and systems of the present disclosure may enable groups as large as 50, 500, 5000, or even 50,000 distributed users to engage in conversational interactions that can lead to a unified and coherent result.

The present disclosure describes systems and methods for amplifying the collective intelligence of networked human groups engaged in a real-time conversational interaction session. Embodiments of the present disclosure include a user which may be referred to as an interviewer that may hold a real-time conversation (i.e., interview) via text, voice, video, or VR chat with a personified collective intelligence (PCI) agent. For example, the personified collective intelligence may comprise a large number of human participants referred to as CI members (or members). One or more embodiments of the present disclosure may enable very large populations of human participants (e.g., thousands or tens of thousands) to contribute in real-time, potentially enabling conversations with a collective superintelligence (CSI) that significantly enhances the intellectual capabilities of individual participants.

In some embodiments the "interviewer" is a real-time collective intelligence comprised of a plurality of human participants that formulates questions to ask based on aggregated input derived from deliberative interactions among themselves using the methods disclosed herein. In such embodiments, the "interviewer" is a collective intelligence that holds a conversation with an "interviewee" which is also a collective intelligence, as described herein. In this way, the systems and methods described herein can be used to enable two large groups of human participants to be organized into two real-time collective intelligence entities and can hold a real-time group to group conversation. In some such embodiments, the two groups are entirely separate populations of human users. In other embodiments, the two groups can include members who are common to both.

According to one or more embodiments, the PCI may be an AI-powered chatbot based on a large language model that may respond to one or more chat-based inquiries. In some examples, the PCI may respond based on the chat-based input collected from a plurality of human participants (referred to as members) in response to the participants being presented with a text representation of the one or more dialog-based inquiries.

An embodiment of the present disclosure may include a conversational first-person response from the PCI. Accordingly, the PCI may be able to implement a personified identity of the collective intelligence. An embodiment of the present disclosure may be configured to receive text as input and control an animated avatar in real-time. In some cases, the avatar may visually and acoustically express the text input as verbal output. An embodiment of the present disclosure may be configured to convert real-time human voice chat (e.g., captured by a microphone associated with a given user) into a text representation.

According to one or more embodiments, an interviewer refers to one or more human participants that may be connected to the system via a one-to-many chat application. For example, a one-to-many chat application may support text, voice, video, or VR chat on a computing device associated with the interviewer (such as the computer of the interviewer).

One or more embodiments of the present disclosure may be configured to provide for the interviewer(s) to enter and send one or more inquiries to a collective intelligence server. In some cases, the one or more inquiries may be sent in a conversational form to the collective intelligence server. In some cases, the collective intelligence server may receive and process the inquiry and route a representation of said inquiries to a plurality of human participants. For example, the routing may be performed in real-time for display on a local many-to-one chat application associated with the human participant.

One or more embodiments of the present disclosure include CI Member(s) that may refer to a plurality of human participants that receive the inquiry from the interviewer via the collective intelligence server. For example, the CI member(s) may refer to a group of 50, 500, or 5000 participants who are each connected to the system via a many-to-one chat application. In some cases, the many-to-one chat application may support text, voice, video, or VR chat on a computing device (e.g., a computer) of the human participant.

According to an embodiment, a central server (herein referred to as a Collective Intelligence Server or CI server) may be configured to enable real-time interactions among human participants. In some cases, the human participants may include two different types of participants (i.e., interviewers and collective intelligence members). In some cases, each interviewer participant may be enabled to use a One-to-Many Chat Application on a local computing device to send information to and receive information from the CI Server. In some cases, each CI Member may be enabled to use a Many-to-One Chat Application to send information to and receive information from the CI Server. Accordingly, the Collective Intelligence Server may work in combination with the one-to-many chat applications running on the local computing devices of the interviewer(s) and the many-to-one chat applications running on the local computing devices of the plurality of CI Members.

Therefore, the present disclosure describes systems and methods that may enable one or more interviewers to ask questions to a real-time personified collective intelligence via text, voice, video, or VR chat. Additionally, one or more embodiments of the present disclosure may enable the real-time personified collective intelligence to respond via text, voice, video, or VR chat. In some cases, the response of the real-time personified collective intelligence agent may be based on the real-time responses of a plurality of human participants. For example, the plurality of human participants may be referred to as CI members or members.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

A Collaboration System

As disclosed herein, the HyperChat system may enable a large population of distributed users to engage in real-time textual, audio, or video conversations. According to some aspects of the present disclosure, individual users may engage with a small number of other participants (e.g., referred to herein as a sub-group), thereby enabling coherent and manageable conversations in online environments. Moreover, aspects of the present disclosure enable exchange of conversational information between subgroups using AI agents (e.g., and thus may propagate conversational information efficiently across the population). Accordingly, members of individual subgroups can benefit from the knowledge, wisdom, insights, and intuitions of other sub-groups and the entire population is enabled to gradually converge on collaborative insights that leverage the collective intelligence of the large population. Additionally, methods and systems are disclosed for discussing the divergent viewpoints that are surfaced globally (i.e., insights of the entire population), thereby presenting the most divisive narratives to subgroups to foster global discussion around key points of disagreement.

FIG. 1 shows an example of a collaboration system according to aspects of the present disclosure. The example shown includes large language model 100, collaboration server 105, network 130, a plurality of computing devices 135, and a plurality of individual users 145.

In an example, a large group of users 145 enter the collaboration system. In the example shown in FIG. 1, nine users may enter the system. However, embodiments are not limited thereto, and large groups of users (e.g., 100 users, 500 users, 5000 users, etc.) may enter the system. In some examples, the collaboration server 105 divides 100 users into sub-groups (e.g., 20 sub-groups of 5 users each for 100 users). User 145 is an example of, or includes aspects of, the corresponding element described with reference to FIGS. 2-6.

In some examples, each user 145 may experience a traditional chat room with four other users 145. The user 145 sees the names of the four other users 145 in the sub-group. The collaboration server 105 mediates a conversation with the five users and ensures that the users see the comments from each other. Thus, each user participates in a real-time conversation with the remaining four users in the chat room (i.e., sub-group). According to the example, the collaboration server 105 performs the process in parallel with the 19 other sub-groups. However, the users 145 are not able to see the conversations happening in the 19 other chat rooms.

According to some aspects, collaboration server 105 performs a collaboration application 110, i.e., the collaboration server 105 uses collaboration application 110 for communication with the set of the networked computing devices 135, and each computing device 135 is associated with one member of the population of human participants (e.g., a user 145). Additionally, the collaboration server 105 defines a set of sub-groups of the population of human participants.

In some cases, the collaboration server 105 keeps track of the chat conversations separately in a memory. The memory in the collaboration server 105 includes a first memory portion 115, a second memory portion 120, and a third memory portion 125. First memory portion 115, second memory portion 120, and third memory portion 125 are examples of, or include aspects of, the corresponding element described with reference to FIG. 10.

Collaboration server 105 keeps track of the chat conversations separately so that the chat conversations can be separated from each other. The collaboration server 105 periodically sends chunks of each separate chat conversation to a Large Language Model 100 (e.g., an LLM, AI system, such as ChatGPT from OpenAI) via an Application Programming Interface (API) for processing and receives a summary from the LLM 100 that is associated with the particular sub-group. The collaboration server 105 keeps track of each conversation (via the software observer agent) and generates summaries using the LLM (via API calls).

Collaboration server 105 provides one or more functions to users 145 linked by way of one or more of the various networks 130. In some cases, the collaboration server 105 includes a single microprocessor board, which includes a microprocessor responsible for controlling aspects of the collaboration server 105. In some cases, a collaboration server 105 uses a microprocessor and protocols to exchange data with other devices/users 145 on one or more of the networks 130 via hypertext transfer protocol (HTTP), and simple mail transfer protocol (SMTP), although other protocols such as file transfer protocol (FTP), and simple network 130 management protocol (SNMP) may also be used. In some cases, a collaboration server 105 is configured to send and receive hypertext markup language (HTML) formatted files (e.g., for displaying web pages). In various embodiments, a collaboration server 105 comprises a general purpose computing device 135, a personal computer, a laptop computer, a mainframe computer, a super computer, or any other suitable processing apparatus.

In some examples, collaboration application 110 (e.g., and/or large language model 100) may implement natural language processing (NLP) techniques. NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks 130 or statistical models which make soft, probabilistic decisions based on attaching real-valued weights to input features. These models can express the relative probability of multiple answers.

In some examples, large language model 100 (e.g., and/or implementation of large language model 100 via collaboration application 110) may be an example of, or implement aspects of, a neural processing unit (NPU). A NPU is a microprocessor that specializes in the acceleration of machine learning algorithms. For example, an NPU may operate on predictive models such as artificial neural networks 130 (ANNs) or random forests (RFs). In some cases, an NPU is designed in a way that makes it unsuitable for general purpose computing such as that performed by a Central Processing Unit (CPU). Additionally, or alternatively, the software support for an NPU may not be developed for general purpose computing. Large language model 100 is an example of, or includes aspects of, the corresponding element described with reference to FIG. 2.

According to some aspects, large language model 100 processes the first conversational summary, the second conversational summary, and the third conversational summary using the large language model 100 to generate a global conversational summary expressed in conversational form. In some examples, large language model 100 sends the global conversational summary expressed in conversational form to each of the members of the first sub-group, the second sub-group, and the third sub-group. In some examples, large language model 100 may include aspects of an artificial neural network 130 (ANN). Large language model 100 is an example of, or includes aspects of, the corresponding element described with reference to FIG. 2.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting a max, or local max, from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, a computing device 135 is a personal computer, laptop computer, mainframe computer, palmtop computer, personal assistant, mobile device, or any other suitable processing apparatus. Computing device 135 is an example of, or includes aspects of, the corresponding element described with reference to FIGS. 2, 5, and 11. In certain aspects, computing device 135 includes local chat application 140. According to some aspects, a local chat application 140 is provided on each networked computing device 135.

The local chat application 140 may be configured for displaying a conversational prompt received from the collaboration server 105 (vai network 130 and computing device 135), and for enabling real-time chat communication of a user with other users in a sub-group assigned by the collaboration server 105, the real-time chat communication including sending chat input collected from the one user associated with the networked computing device 135 and other users of the assigned sub-group. Local chat application 140 is an example of, or includes aspects of, the corresponding element described with reference to FIGS. 2 and 11.

Network 130 facilitates the transfer of information between computing device 135 and collaboration server 105. Network 130 may be referred to as a "cloud". Network 130 (e.g., cloud) is a computer network configured to provide on-demand availability of computer system resources, such as data storage and computing power. In some examples, the network 130 provides resources without active management by the user 145. The term network 130 (e.g., or cloud) is sometimes used to describe data centers available to many users 145 over the Internet. Some large networks 130 have functions distributed over multiple locations from central servers. A server is designated an edge server if it has a direct or close connection to a user 145. In some cases, a network 130 (e.g., or cloud) is limited to a single organization. In other examples, the network 130 (e.g., or cloud) is available to many organizations. In one example, a network 130 includes a multi-layer communications network 130 comprising multiple edge routers and core routers. In another example, a network 130 is based on a local collection of switches in a single physical location.

In some aspects, one or more components of FIG. 1 (e.g., collaboration server 105, network 130, computing device 135, etc.) may implement or include a database to perform one or more of the operations and functions described herein. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user 145 interacts with database controller. In other cases, database controller may operate automatically without user 145 interaction.

Figure 2:
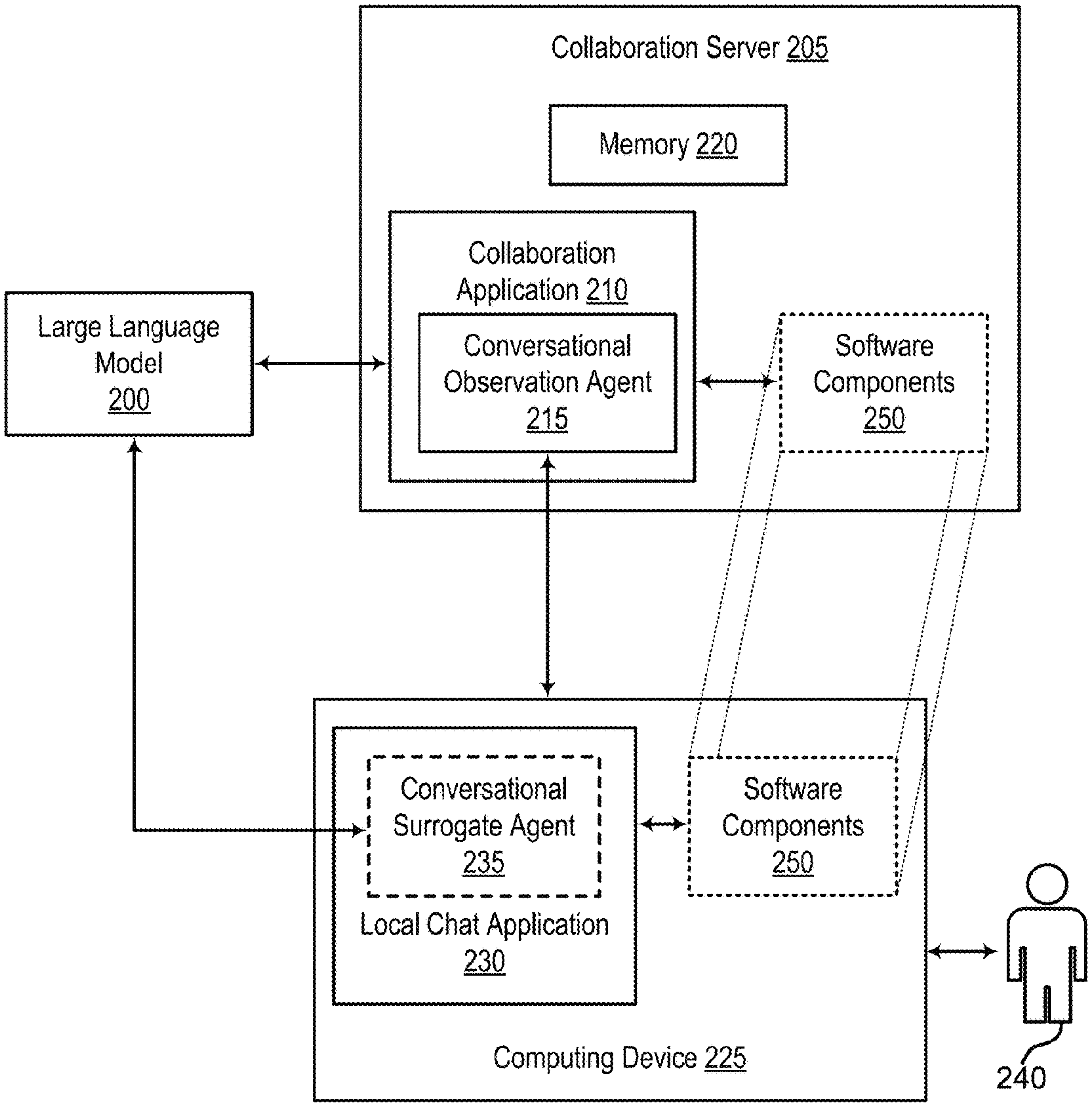
FIG. 2 shows an example of a collaboration process according to aspects of the present disclosure.

FIG. 2 shows an example of a collaboration process according to aspects of the present disclosure. The example shown includes large language model 200, collaboration server 205, computing device 225, user 240, and software components 250.

In some cases, large language model (LLM) 200 is able to identify unique chat messages within complex blocks of dialog while assessing or identifying responses that refer to a particular point. In some cases, LLM 200 can capture the flow of the conversation (e.g., the speakers, content of the conversation, other speakers who disagreed, agreed, or argued, etc.) from the block dialog. In some cases, LLM 200 can provide the conversational context, e.g., blocks of dialog that capture the order and timing in which the chat responses flow. Large language model 200 is an example of, or includes aspects of, the corresponding element described with reference to FIG. 1.

According to some aspects, collaboration server 205 runs a collaboration application 210, and the collaboration server 205 is in communication with the set of the networked computing devices 225 (e.g., where each computing device 225 is associated with one member of the population of human participants, the collaboration server 205 defining a set of sub-groups of the population of human participants). Collaboration server 205 is an example of, or includes aspects of, the corresponding element described with reference to FIGS. 1 and 10. In certain aspects, collaboration server 205 includes collaboration application 210 and memory 220.

In certain aspects, collaboration application 210 includes conversational observation agent 215. In certain aspects, collaboration application 210 includes (e.g., or implements) software components 250. In some cases, conversational observation agent 215 is an artificial intelligence (AI)-based model that observes the real-time conversational content within one or more of the sub-groups and passes a representation of the information between the sub-groups to not lose the benefit of the broad knowledge and insight across the full population. In some cases, conversational observation agent 215 keeps track of each conversation separately and sends chat conversation chunks (via an API) to LLM 200 for processing (e.g., summarization). Collaboration application 210 is an example of, or includes aspects of, the corresponding element described with reference to FIGS. 1 and 10. Conversational observation agent 215 is an example of, or includes aspects of, the corresponding element described with reference to FIGS. 3, 4, 6, 9, and 10.

Examples of memory 220 (e.g., first memory portion, second memory portion, third memory portion as described in FIG. 1) may include random access memory 220 (RAM), read-only memory 220 (ROM), or a hard disk. Examples of memory 220 devices include solid state memory and a hard disk drive. In some examples, memory 220 (e.g., first memory portion, second memory portion, third memory portion) is used to store computer-readable, computer-executable software including instructions that, when executed, cause a processor to perform various functions described herein. In some cases, the memory 220 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 220 store information in the form of a logical state.

Computing device 225 is a networked computing device that facilitates the transfer of information between local chat application 230 and collaboration server 205. Computing device 225 is an example of, or includes aspects of, the corresponding element described with reference to FIGS. 1, 5, and 11. In certain aspects, computing device 225 includes local chat application 230.

According to some aspects, local chat application 230 is provided on each networked computing device 225, the local chat application 230 may be configured for displaying a conversational prompt received from the collaboration server 205, and for enabling real-time chat communication with other members of a sub-group assigned by the collaboration server 205, the real-time chat communication including sending chat input collected from the one member associated with the networked computing device 225 to other members of the assigned sub-group. Local chat application 230 is an example of, or includes aspects of, the corresponding element described with reference to FIGS. 1 and 11. In certain aspects, local chat application 230 includes conversational surrogate agent 235. In certain aspects, local chat application 230 includes (e.g., or implements) software components 250.

In some aspects, conversational surrogate agent 235 is a simulated (i.e., fake) user in each sub-group that conversationally expresses a representation of the information contained in the summary from a different sub-group. Conversational surrogate agent 235 is an example of, or includes aspects of, the corresponding element described with reference to FIGS. 6, 8, 9, and 11.

In certain aspects, local chat application 230 includes a conversational instigator agent and a global surrogate agent. In some aspects, conversational instigator agent is a fake user in each sub-group that is designed to stoke conversation within subgroups in which members are not being sufficiently detailed in their rationale for the supported positions. In some aspects, a global surrogate agent is a fake user in each sub-group that selectively represents the views, arguments, and narratives that have been observed across the full population during a recent time period (e.g., custom tailor representation for the subgroup based on the subgroup's interactive dialog among members). Conversational instigator agent and Global surrogate agent are examples of, or include aspects of, the corresponding element described with reference to FIG. 4.

As described herein, software components 250 may be executed by the collaboration server 205 and the local chat application 230 for enabling operations and functions described herein, through communication between the collaboration application 210 (running on the collaboration server 205) and the local chat applications 230 running on each of the plurality of networked computing devices 225. For instance, collaboration server 205 and computing device 225 may include software components 225 that perform one or more of the operations and functions described herein. Generally, software components may include software executed via collaboration server 205, software components may include software executed via computing device 225, and/or software executed via both collaboration server 205 and computing device 225. In some aspects, collaboration application 210 and local chat application 230 may each be examples of software components 250. Generally, software components 250 may be executed to enable methods 1200-1800 described in more detail herein.

For instance, software components 250 enable, through communication between the collaboration application 210 running on the collaboration server 205 and the local chat applications 230 running on each of the set of networked computing devices 225, the following steps: (a) sending the conversational prompt to the set of networked computing devices 225, the conversational prompt including a question to be collaboratively discussed by the population of human participants, (b) presenting, substantially simultaneously, a representation of the conversational prompt to each member of the population of human participants on a display of the computing device 225 associated with that member, (c) dividing the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants, (d) collecting and storing a first conversational dialogue in a first memory portion at the collaboration server 205 from members of the population of human participants in the first sub-group during an interval via a user 240 interface on the computing device 225 associated with each member of the population of human participants in the first sub-group, (e) collecting and storing a second conversational dialogue in a second memory portion at the collaboration server 205 from members of the population of human participants in the second sub-group during the interval via a user 240 interface on the computing device 225 associated with each member of the population of human participants in the second sub-group, (f) collecting and storing a third conversational dialogue in a third memory portion at the collaboration server 205 from members of the population of human participants in the third sub-group during the interval via a user 240 interface on the computing device 225 associated with each member of the population of human participants in the third sub-group, (g) processing the first conversational dialogue at the collaboration server 205 using a large language model 200 to identify and express a first conversational argument in conversational form, where the identifying of the first conversational argument includes identifying at least one viewpoint, position or claim in the first conversational dialogue supported by evidence or reasoning, (h) processing the second conversational dialogue at the collaboration server 205 using the large language model 200 to identify and express a second conversational argument in conversational form, where the identifying of the second conversational argument includes identifying at least one viewpoint, position or claim in the second conversational dialogue supported by evidence or reasoning, (i) processing the third conversational dialogue at the collaboration server 205 using the large language model 200 to identify and express a third conversational argument in conversational form, where the identifying of the third conversational argument includes identifying at least one viewpoint, position or claim in the third conversational dialogue supported by evidence or reasoning, (j) sending the first conversational argument expressed in conversational form to each of the members of a first different sub-group, where the first different sub-group is not the first sub-group, (k) sending the second conversational argument expressed in conversational form to each of the members of a second different sub-group, where the second different sub-group is not the second sub-group, (l) sending the third conversational argument expressed in conversational form to each of the members of a third different sub-group, where the third different sub-group is not the third sub-group, and (m) repeating steps (d) through (l) at least one time. In some embodiments, step (c), which involves dividing the population into a plurality of subgroups can be performed before steps (a) and (b).

In some examples, software components 250 send, in step (j), the first conversational argument expressed in conversational form to each of the members of a first different sub-group expressed in first person as if the first conversational argument were coming from a member of the first different sub-group of the population of human participants. In some examples, software components 250 send, in step (k), the second conversational argument expressed in conversational form to each of the members of a second different sub-group expressed in first person as if the second conversational argument were coming from a member of the second different sub-group of the population of human participants. In some examples, software components 250 send, in step (l), the third conversational argument expressed in conversational form to each of the members of a third different sub-group expressed in first person as if the third conversational argument were coming from a member of the third different sub-group of the population of human participants. In some such embodiment, the additional simulated member is assigned a unique username that appears similarly in the Local Chat Application as the usernames of the human members of the sub-group. In this way, the users within a sub-group are made to feel like they are holding a natural real-time conversation among participants in their sub-group, that subset including a simulated member that express in the first person, unique points that represents conversational information captured from another sub-group. With every sub-group having such a simulated member, information propagates smoothly across the population, linking all the subgroups into a single unified conversation. In some examples, software components 250 process, in step (n), the first conversational argument, the second conversational argument, and the third conversational argument using the large language model 200 to generate a global conversational argument expressed in conversational form. In some examples, software components 250 sends, in step (o), the global conversational argument expressed in conversational form to each of the members of the first sub-group, the second sub-group, and the third sub-group. In some aspects, a final global conversational argument is generated by weighting more recent ones of the global conversational arguments more heavily than less recent ones of the global conversational arguments. In some aspects, the first conversational dialogue, the second conversational dialogue and the third conversational dialogue each include a set of ordered chat messages including text. In some aspects, the first conversational dialogue, the second conversational dialogue and the third conversational dialogue each further include a respective member identifier for the member of the population of human participants who entered each chat message. In some aspects, the first conversational dialogue, the second conversational dialogue and the third conversational dialogue each further includes a respective timestamp identifier for a time of day when each chat message is entered. In some aspects, the processing the first conversational dialogue in step (g) further includes determining a respective response target indicator for each chat message entered by the first sub-group, where the respective response target indicator provides an indication of a prior chat message to which each chat message is responding; the processing the second conversational dialogue in step (h) further includes determining a respective response target indicator for each chat message entered by the second sub-group, where the respective response target indicator provides an indication of a prior chat message to which each chat message is responding; and the processing the third conversational dialogue in step (i) further includes determining a respective response target indicator for each chat message entered by the third sub-group, where the respective response target indicator provides an indication of a prior chat message to which each chat message is responding. In some aspects, the processing the first conversational dialogue in step (g) further includes determining a respective sentiment indicator for each chat message entered by the first sub-group, where the respective sentiment indicator provides an indication of whether each chat message is in agreement or disagreement with prior chat messages; the processing the second conversational dialogue in step (h) further includes determining a respective sentiment indicator for each chat message entered by the second sub-group, where the respective sentiment indicator provides an indication of whether each chat message is in agreement or disagreement with prior chat messages; and the processing the third conversational dialogue in step (i) further includes determining a respective sentiment indicator for each chat message entered by the third sub-group, where the respective sentiment indicator provides an indication of whether each chat message is in agreement or disagreement with prior chat messages. In some aspects, the processing the first conversational dialogue in step (g) further includes determining a respective conviction indicator for each chat message entered by the first sub-group, where the respective conviction indicator provides an indication of conviction for each chat message; the processing the second conversational dialogue in step (h) further includes determining a respective conviction indicator for each chat message entered by the second sub-group, where the respective conviction indicator provides an indication of conviction for each chat message; and the processing the third conversational dialogue in step (i) further includes determining a respective conviction indicator for each chat message entered by the third sub-group, where the respective conviction indicator provides an indication of conviction each chat message is in the expressions of the chat message. In some aspects, the first unique portion of the population (i.e., a first sub-group) consists of no more than ten members of the population of human participants, the second unique portion consists of no more than ten members of the population of human participants, and the third unique portion consists of no more than ten members of the population of human participants. In some aspects, the first conversational dialogue includes chat messages including voice. In some aspects, the voice includes words spoken, and at least one spoken language component selected from the group of spoken language components consisting of tone, pitch, rhythm, volume and pauses. Such spoken language components are common ways in which emotional value can be assessed or indicated in vocal inflection. In some aspects, the first conversational dialogue includes chat messages including video. In some aspects, the video includes words spoken, and at least one language component selected from the group of language components consisting of tone, pitch, rhythm, volume, pauses, facial expressions, gestures, and body language. In some aspects, each of the repeating steps occurs after expiration of an interval. In some aspects, the interval is a time interval. In some aspects, the interval is a number of conversational interactions. In some aspects, the first different sub-group is the second sub-group, and the second different sub-group is the third sub-group. In some aspects, the first different sub-group is a first randomly selected sub-group, the second different sub-group is a second randomly selected subgroup, and the third different sub-group is a third randomly selected sub-group, where the first randomly selected sub-group, the second randomly selected sub-group and the third randomly selected sub-group are not the same sub-group. In some examples, software components 250 process, in step (g), the first conversational dialogue at the collaboration server 205 using the large language model 200 to identify and express the first conversational argument in conversational form, where the identifying of the first conversational argument includes identifying at least one viewpoint, position or claim in the first conversational dialogue supported by evidence or reasoning, where the first conversational argument is not identified in the first different sub-group. In some examples, software components 250 process, in step (h), the second conversational dialogue at the collaboration server 205 using the large language model 200 to identify and express the second conversational argument in conversational form, where the identifying of the second conversational argument includes identifying at least one viewpoint, position or claim in the second conversational dialogue supported by evidence or reasoning, where the second conversational argument is not identified in the second different sub-group. In some examples, software components 250 process, in step (i), the third conversational dialogue at the collaboration server 205 using the large language model 200 to identify and express the third conversational argument in conversational form, where the identifying of the third conversational argument includes identifying at least one viewpoint, position or claim in the third conversational dialogue supported by evidence or reasoning, where the third conversational argument is not identified in the third different sub-group.

According to some aspects, software components 250 send, in step (a), the conversational prompt to the set of networked computing devices 225, the conversational prompt including a question to be collaboratively discussed by the population of human participants. In some examples, software components 250 present, in step (b), substantially simultaneously, a representation of the conversational prompt to each member of the population of human participants on a display of the computing device 225 associated with that member. In some examples, software components 250 divide, in step (c), the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants, including dividing the population of human participants as a function of user 240 initial responses to the conversational prompt. In some examples, software components 250 collects and stores, in step (d), a first conversational dialogue in a first memory portion at the collaboration server 205 from members of the population of human participants in the first sub-group during an interval via a user 240 interface on the computing device 225 associated with each member of the population of human participants in the first sub-group. In some examples, software components 250 collect and store, in step (e), a second conversational dialogue in a second memory portion at the collaboration server 205 from members of the population of human participants in the second sub-group during the interval via a user 240 interface on the computing device 225 associated with each member of the population of human participants in the second sub-group. In some examples, software components 250 collect and store, in step (f), a third conversational dialogue in a third memory portion at the collaboration server 205 from members of the population of human participants in the third sub-group during the interval via a user 240 interface on the computing device 225 associated with each member of the population of human participants in the third sub-group. In some examples, software components 250 process, in step (g), the first conversational dialogue at the collaboration server 205 using a large language model 200 to express a first conversational summary in conversational form. In some examples, software components 250 process, in step (h), the second conversational dialogue at the collaboration server 205 using the large language model 200 to express a second conversational summary in conversational form. In some examples, software components 250 process, in step (i), the third conversational dialogue at the collaboration server 205 using the large language model 200 to express a third conversational summary in conversational form. In some examples, software components 250 send, in step (j), the first conversational summary expressed in conversational form to each of the members of a first different sub-group, where the first different sub-group is not the first sub-group. In some examples, software components 250 send, in step (k), the second conversational summary expressed in conversational form to each of the members of a second different sub-group, where the second different sub-group is not the second sub-group. In some examples, software components 250 send, in step (l), the third conversational summary expressed in conversational form to each of the members of a third different sub-group, where the third different sub-group is not the third sub-group. In some examples, software components 250 repeat, in step (m), steps (d) through (l) at least one time. In some examples, software components 250 send, in step (j), the first conversational summary expressed in conversational form to each of the members of a first different sub-group expressed in first person as if the first conversational summary were coming from an additional member (simulated) of the first different sub-group of the population of human participants. In some examples, software components 250 send, in step (k), the second conversational summary expressed in conversational form to each of the members of a second different sub-group expressed in first person as if the as if the second conversational summary were coming from an additional member (simulated) of the second different sub-group of the population of human participants. In some examples, software components 250 send, in step (l), the third conversational summary expressed in conversational form to each of the members of a third different sub-group expressed in first person as if the third conversational summary were coming from an additional member (simulated) of the third different sub-group of the population of human participants. In some examples, software components 250 process, in step (n), the first conversational summary, the second conversational summary, and the third conversational summary using the large language model 200 to generate a global conversational summary expressed in conversational form. In some examples, software components 250 send, in step (o), the global conversational summary expressed in conversational form to each of the members of the first sub-group, the second sub-group, and the third sub-group. In some aspects, a final global conversational summary is generated by weighting more recent ones of the global conversational summaries more heavily than less recent ones of the global conversational summaries. In some aspects, the dividing the population of human participants, in step (c), includes: assessing the initial responses to determine the most popular user 240 perspectives and dividing the population to distribute the most popular user 240 perspectives amongst the first sub-group, the second sub-group and the third sub-group. In some examples, software components 250 presents, substantially simultaneously, in step (b), a representation of the conversational prompt to each member of the population of human participants on a display of the computing device 225 associated with that member, where the presenting further includes providing a set of alternatives, options or controls for initially responding to the conversational prompt. In some aspects, the dividing the population of human participants, in step (c), includes: assessing the initial responses to determine the most popular user 240 perspectives and dividing the population to group users 240 having the first most popular user 240 perspective together in the first sub-group, users 240 having the second most popular user 240 perspective together in the second sub-group, and users 240 having the third most popular user 240 perspective together in the third sub-group.

According to some aspects, software components 250 monitor, in step (n), the first conversational dialogue for a first viewpoint, position or claim not supported by first reasoning or evidence. In some examples, software components 250 send, in step (o), in response to monitoring the first conversational dialogue, a first conversational question to the first sub-group requesting first reasoning or evidence in support of the first viewpoint, position or claim. In some examples, software components 250 monitor, in step (p), the second conversational dialogue for a second viewpoint, position or claim not supported by second reasoning or evidence. In some examples, software components 250 send, in step (q), in response to monitoring the second conversational dialogue, a second conversational question to the second sub-group requesting second reasoning or evidence in support of the second viewpoint, position or claim. In some examples, software components 250 monitor, in step (r), the third conversational dialogue for a third viewpoint, position or claim not supported by third reasoning or evidence. In some examples, software components 250 send, in step (s), in response to monitoring the third conversational dialogue, a third conversational question to the third sub-group requesting third reasoning or evidence in support of the third viewpoint, position or claim.

According to some aspects, software components 250 monitor, in step (n), the first conversational dialogue for a first viewpoint, position or claim supported by first reasoning or evidence. In some examples, software components 250 send, in step (o), in response to monitoring the first conversational dialogue, a first conversational challenge to the first sub-group questioning the first reasoning or evidence in support of the first viewpoint, position or claim. In some examples, software components 250 monitor, in step (p), the second conversational dialogue for a second viewpoint, position or claim supported by second reasoning or evidence. In some examples, software components 250 send, in step (q), in response to monitoring the second conversational dialogue, a second conversational challenge to the second sub-group questioning second reasoning or evidence in support of the second viewpoint, position or claim. In some examples, software components 250 monitor, in step (r), the third conversational dialogue for a third viewpoint, position or claim supported by third reasoning or evidence. In some examples, software components 250 send, in step (s), in response to monitoring the third conversational dialogue, a third conversational challenge to the third sub-group questioning third reasoning or evidence in support of the third viewpoint, position or claim. In some examples, software components 250 send, in step (o), the first conversational challenge to the first sub-group questioning the first reasoning or evidence in support of the first viewpoint, position, or claim, where the questioning the first reasoning or evidence includes a viewpoint, position, or claim collected from the second different sub-group or the third different sub-group.

According to some aspects, software components 250 process, in step (n), the first conversational summary, the second conversational summary, and the third conversational summary using the large language model 200 to generate a list of positions, reasons, themes or concerns from across the first sub-group, the second sub-group, and the third sub-group. In some examples, software components 250 display, in step (o), to the human moderator using the collaboration server 205 the list of positions, reasons, themes or concerns from across the first sub-group, the second sub-group, and the third sub-group. In some examples, software components 250 receive, in step (p), a selection of at least one of the positions, reasons, themes or concerns from the human moderator via the collaboration server 205. In some examples, software components 250 generate, in step (q), a global conversational summary expressed in conversational form as a function of the selection of the at least one of the positions, reasons, themes or concerns. In some aspects, the providing the local moderation application on at least one networked computing device 225, the local moderation application configured to allow the human moderator to observe the first conversational dialogue, the second conversational dialogue, and the third conversational dialogue. In some aspects, the providing the local moderation application on at least one networked computing device 225, the local moderation application configured to allow the human moderator to selectively and collectively send communications to members of the first sub-group, send communications to members of the second sub-group, and send communications to members of the third sub-group. In some examples, software components 250 sends, in step (r), the global conversational summary expressed in conversational form to each of the members of the first sub-group, the second sub-group, and the third sub-group.

According to some aspects, software components 250 process, in step (g), the first conversational dialogue at the collaboration server 205 using a large language model 200 to express a first conversational summary in conversational form. In some examples, software components 250 process, in step (h), the second conversational dialogue at the collaboration server 205 using the large language model 200 to express a second conversational summary in conversational form. In some examples, software components 250 process, in step (i), the third conversational dialogue at the collaboration server 205 using the large language model 200 to express a third conversational summary in conversational form. In some examples, software components 250 send, in step (j), the first conversational summary expressed in conversational form to each of the members of a first different sub-group, where the first different sub-group is not the first sub-group. In some examples, software components 250 send, in step (k), the second conversational summary expressed in conversational form to each of the members of a second different sub-group, where the second different sub-group is not the second sub-group. In some examples, software components 250 send, in step (l), the third conversational summary expressed in conversational form to each of the members of a third different sub-group, where the third different sub-group is not the third sub-group. In some examples, software components 250 repeat, in step (m), steps (d) through (l) at least one time. In some examples, software components 250 process, in step (n), the first conversational summary, the second conversational summary, and the third conversational summary using the large language model 200 to generate a global conversational summary expressed in conversational form. In some examples, software components 250 process, in step (n), the first conversational summary, the second conversational summary, and the third conversational summary using the large language model 200 to generate a first global conversational summary expressed in conversational form, where the first global conversational summary is tailored to the first sub-group, generate a second global conversational summary, where the second global conversational summary is tailored to the second sub-group, and generate a third global conversational summary, where the third global conversational summary is tailored to the third sub-group. In some examples, software components 250 send, in step (o), the first global conversational summary expressed in conversational form to each of the members of the first sub-group, send the second global conversational summary expressed in conversational form to the each of the members of the second sub-group, and send the third global conversational summary expressed in conversational form to each of the members of the third sub-group. In some examples, software components 250 process, in step (n), the first conversational summary, the second conversational summary, and the third conversational summary using the large language model 200 to generate a first global conversational summary expressed in conversational form, where the first global conversational summary is tailored to the first sub-group by including a viewpoint, position, or claim not expressed in the first sub-group, generate a second global conversational summary, where the second global conversational summary is tailored to the second sub-group by including a viewpoint, position, or claim not expressed in the second sub-group, and generate a third global conversational summary, where the third global conversational summary is tailored to the third sub-group by including a viewpoint, position, or claim not expressed in the third sub-group. In some examples, software components 250 process, in step (n), the first conversational summary, the second conversational summary, and the third conversational summary using the large language model 200 to generate a first global conversational summary expressed in conversational form, where the first global conversational summary is tailored to the first sub-group by including a viewpoint, position, or claim not expressed in the first sub-group, where the viewpoint, position, or claim not expressed in the first sub-group is collected from the first different subgroup, where the second global conversational summary is tailored to the second sub-group by including a viewpoint, position, or claim not expressed in the second sub-group, where the viewpoint, position, or claim not expressed in the second sub-group is collected from the second different subgroup, where the third global conversational summary is tailored to the third sub-group by including a viewpoint, position, or claim not expressed in the third sub-group, where the viewpoint, position, or claim not expressed in the third sub-group is collected from the third different subgroup.

According to some aspects, software components 250 send, in step (a), the conversational prompt to the set of networked computing devices 225, the conversational prompt including a question to be collaboratively discussed by the population of human participants. In some examples, software components 250 present, in step (b), substantially simultaneously, a representation of the conversational prompt to each member of the population of human participants on a display of the computing device 225 associated with that member. In some examples, software components 250 divide, in step (c), the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants. In some examples, software components 250 collect and store, in step (d), a first conversational dialogue in a first memory 220 portion at the collaboration server 205 from members of the population of human participants in the first sub-group during an interval via a user 240 interface on the computing device 225 associated with each member of the population of human participants in the first sub-group, where the first conversational dialogue includes chat messages including a first segment of video including at least one member of the first sub-group. In some examples, software components 250 collect and store, in step (e), a second conversational dialogue in a second memory 220 portion at the collaboration server 205 from members of the population of human participants in the second sub-group during the interval via a user 240 interface on the computing device 225 associated with each member of the population of human participants in the second sub-group, where the first conversational dialogue includes chat messages including a second segment of video including at least one member of the second sub-group. In some examples, software components 250 collect and store, in step (f), a third conversational dialogue in a third memory 220 portion at the collaboration server 205 from members of the population of human participants in the third sub-group during the interval via a user 240 interface on the computing device 225 associated with each member of the population of human participants in the third sub-group, where the first conversational dialogue includes chat messages including a second segment of video including at least one member of the third sub-group. In some examples, software components 250 process, in step (g), the first conversational dialogue at the collaboration server 205 using a large language model 200 to express a first conversational summary in conversational form. In some examples, software components 250 process, in step (h), the second conversational dialogue at the collaboration server 205 using the large language model 200 to express a second conversational summary in conversational form. In some examples, software components 250 process, in step (i), the third conversational dialogue at the collaboration server 205 using the large language model 200 to express a third conversational summary in conversational form. In some examples, software components 250 send, in step (j), the first conversational summary expressed in conversational form to each of the members of a first different sub-group, where the first different sub-group is not the first sub-group. In some examples, software components 250 send, in step (k), the second conversational summary expressed in conversational form to each of the members of a second different sub-group, where the second different sub-group is not the second sub-group. In some examples, software components 250 send, in step (l), the third conversational summary expressed in conversational form to each of the members of a third different sub-group, where the third different sub-group is not the third sub-group. In some examples, software components 250 repeat, in step (m), steps (d) through (l) at least one time. In some examples, software components 250 sends, in step (j), the first conversational summary expressed in conversational form to each of the members of a first different sub-group expressed in first person as if the first conversational summary were coming from an additional member (simulated) of the first different sub-group of the population of human participants. In some examples, software components 250 send, in step (k), the second conversational summary expressed in conversational form to each of the members of a second different sub-group expressed in first person as if the as if the second conversational summary were coming from an additional member (simulated) of the second different sub-group of the population of human participants. In some examples, software components 250 send, in step (l), the third conversational summary expressed in conversational form to each of the members of a third different sub-group expressed in first person as if the third conversational summary were coming from an additional member (simulated) of the third different sub-group of the population of human participants. In some examples, software components 250 send, in step (j), the first conversational summary expressed in conversational form to each of the members of a first different sub-group expressed in first person as if the first conversational summary were coming from an additional member (simulated) of the first different sub-group of the population of human participants, including sending the first conversational summary in a first video segment including a graphical character representation expressing the first conversational summary through movement and voice. In some examples, software components 250 send, in step (k), the second conversational summary expressed in conversational form to each of the members of a second different sub-group expressed in first person as if the as if the second conversational summary were coming from an additional member (simulated) of the second different sub-group of the population of human participants, including sending the second conversational summary in a second video segment including a graphical character representation expressing the second conversational summary through movement and voice. In some examples, software components 250 send, in step (l), the third conversational summary expressed in conversational form to each of the members of a third different sub-group expressed in first person as if the third conversational summary were coming from an additional member (simulated) of the third different sub-group of the population of human participants, including sending the second conversational summary in a second video segment including a graphical character representation expressing the second conversational summary through movement and voice. In some examples, software components 250 send, in step (j), the first conversational summary expressed in conversational form to each of the members of a first additional different sub-group. In some examples, software components 250 send, in step (k), the second conversational summary expressed in conversational form to each of the members of a second additional different sub-group. In some examples, software components 250 send, in step (l), the third conversational summary expressed in conversational form to each of the members of a third additional different sub-group. In some examples, software components 250 process, in step (g), the first conversational dialogue at the collaboration server 205 using a large language model 200 to express a first conversational summary in conversational form, where the first conversational summary includes a first graphical representation of a first artificial agent. In some examples, software components 250 process, in step (h), the second conversational dialogue at the collaboration server 205 using the large language model 200 to express a second conversational summary in conversational form, where the second conversational summary includes a second graphical representation of a second artificial agent. In some examples, software components 250 process, in step (i), the third conversational dialogue at the collaboration server 205 using the large language model 200 to express a third conversational summary in conversational form, where the third conversational summary includes a third graphical representation of a third artificial agent.

A HyperChat Process

Embodiments of the present disclosure include a collaboration server that can divide a large group of people into small sub-groups. In some examples, the server can divide a large population (72 people) into 12 sub-groups of 6 people each, thereby enabling each sub-group's users to chat among themselves. The server can inject conversational prompts into the sub-groups in parallel such that the members are talking about the same issue, topic or question. At various intervals, the server captures blocks of dialog from each sub-group, sends it to a Large Language Model (LLM) via an API that summarizes and analyzes the blocks (using an Observer Agent for each sub-group), and then sends a representation of the summaries into other sub-groups. In some cases, the server expresses the summary blocks as first person dialogue that is part of the naturally flowing conversation (e.g., using a surrogate agent for each sub-group). Accordingly, the server enables 72 people to hold a real-time conversation on the same topic while providing for each person to be part of a small sub-group that can communicate conveniently and simultaneously has conversational information passed between sub-groups in the form of the summarized blocks of dialogue. Hence, conversational content propagates across the large population (i.e., each of the sub-groups) that provides for the large population to converge on conversational conclusions.

A global conversational summary is optionally generated after the sub-groups hold parallel conversations for some time with informational summaries passed between sub-groups. A representation of the global conversational summary is optionally injected into the sub-groups via the surrogate AI agent associated with that sub-group. As a consequence of the propagation of local conversational content across sub-groups and the optional injection of global conversational content into all sub-groups, the large population is enabled to hold a single unified deliberative conversation and converge over time towards unified conclusions or sentiments. With respect to global conversational summaries, when the server detects convergence in conclusions or sentiments (using, for example, the LLM via an API), the server can send the dialogue blocks that are stored for each of the parallel rooms to the Large Language Model and, using API calls, ask the LLM for processing. The processing includes generating a conversational summary across sub-groups, including an indication of the central points made among sub-groups, especially points that have strong support across sub-groups and arguments raised. In some cases, the processing assesses the strength of the sentiments associated with the points made and arguments raised. The global conversational summary is generated as a block of conversation expressed from the perspective of an observer who is watching each of the sub-groups. The global conversational summary can be expressed from the perspective of a global surrogate that expresses the summary inside each sub-group to inform the users of the outcome of the parallel conversations in other sub-groups, i.e., the conclusions of the large population (or a sub-population divided into sub-groups).

In some embodiments, the system provides a global summary to a human moderator that the moderator sees at any time during the process. Accordingly, the moderator is provided with an overall view of the discussions in the sub-groups during the process.

In some embodiments, the system summarizes the discussion of the entire population and injects the representation into different subgroups as an interactive first-person dialog. The first-person dialog may be crafted to provide a summary of a central theme observed across groups and instigate discussion and elaboration, thereby encouraging the subgroup to discuss the issue among themselves and build a consensus. The consensus is built across the entire population by guiding subgroups towards central themes and providing for the opportunity to explore, elaborate, or reject the globally observed premise.

In other embodiments, the globally injected summary and query for elaboration could be based not on a common theme observed globally but based on an uncommon theme observed globally (i.e., a divergent viewpoint). By directing one or more subgroups to brainstorm and/or debate divergent viewpoints that are surfaced globally (i.e., but not in high frequency among subgroups), the method effectively ensures that many subgroups consider the divergent viewpoint and potentially reject, accept, modify, or qualify the divergent viewpoint.

Figure 3:
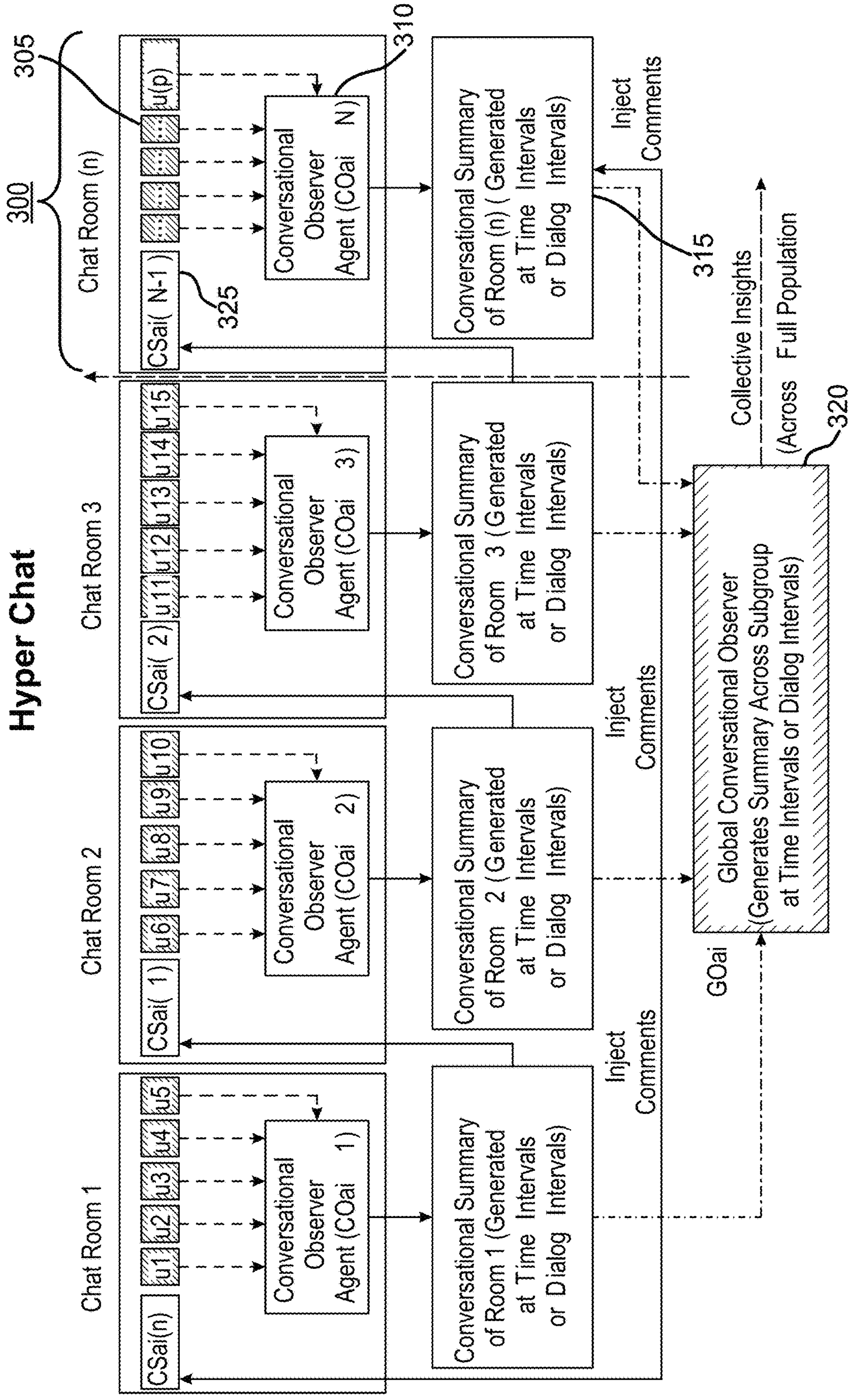
FIGS. 3 through 4 show examples of a HyperChat process according to aspects of the present disclosure.

FIG. 3 shows an example of a HyperChat process according to aspects of the present disclosure. The example shown includes chat room 300, conversational dialogue 315, and global conversation observer 320.

According to the exemplary HyperChat process shown in FIG. 3, a plurality of chat rooms 300 (*n*) include 5 users each. The number of users is used for instructional purposes. However, most implementations of HyperChat can employ different populations of users in each chat room. In some embodiments, the full population (p) is divided into a sufficient number of chat rooms (n) such that the number of users in each room is appropriately sized for coherent deliberative real-time conversations. According to some experts, the ideal size for human groups to hold deliberative conversations ranges from 4 to 7 users, with significant degradation occurring in group sizes over 10 users. Thus, the collaboration server of the present embodiment can be configured in software to automatically divide a full population (p) of users into a sufficient number of sub-groups and associated chat rooms (n) so as to ensure the deliberating sup-groups fall within a target size range such as 4 to 7 users or to ensure the sub-group size does not go above a defined threshold size such as 10 users.

The users in the full population (p) are each using a computer (desktop, laptop, tablet, phone, etc.) running a HyperChat application to interact with the HyperChat server over a communication network in a client-server architecture. In the case of HyperChat, the client application enables users to interact with other users through real-time dialog via text chat and/or voice chat and/or video chat and/or avatar-based VR chat.

As shown in FIG. 3, the HyperChat system divides the population of users into smaller subgroups referred to herein as chat room 300 which can be text-based, voice-based, video-based and/or avatar-based. The term "room" is a structural matter and does not imply the sub-groups need to be in an environment that looks, feels, or is called a room. In some cases, the rooms are defined by the fact that a member of a given room can communicate conversationally in real-time with other members of the room by exchanging real-time text and/or by exchanging real-time voice and/or by exchanging real-time video and/or by exchanging real-time information that represents avatars associated with the respective users. Chat room 300 is an example of, or includes aspects of, the corresponding element described with reference to FIGS. 4-6, 8, and 9.

In certain aspects, chat room 300 includes user 305, conversational observation agent 310, and conversational surrogate agent 325. As an example shown in FIG. 3, there are 'n' sub-groups labeled Chat Room 1, Chat Room 2, Chat Room 3, and up to Chat Room (n) respectively. The (n) sub-groups or chat rooms each have five users assigned to them (for illustration purposes, as the number of users in each sub-group may vary). According to the example, Sub-Group 1 has users (u1) to (u5), Sub-Group 2 has users (u6) to (u10), Sub-Group 3 has users (u11) to (u15), which would continue in this pattern up to Sub-Group (n) which has users up to (u(p)). User 305 is an example of, or includes aspects of, the corresponding element described with reference to FIGS. 1, 2, 4-6, 8, and 9.

Additionally, each sub-group is assigned an AI Agent (i.e., conversational observer agent 310) that monitors that real-time dialog among the users of that subgroup. The real-time AI monitor can be implemented using an API to interface with a Foundational Model such as GPT-3 or ChatGPT from OpenAI or LaMDA from Google or from another provider of a Large Language Model system. Conversational observer agent 310 monitors the conversational interactions among the users of that sub-group and generates informational summaries 315 that assess, compress, and represent the informational content expressed by one or more users of the group (and optionally the conviction levels associated with different elements of informational content expressed by one or more users of the group). The informational summaries 315 are generated at various intervals, which can be based on elapsed time (e.g., at three minute intervals) or can be based on conversational interactions (for example, after a certain number of individuals speak via text or voice in that room).

In case of both, a time-based interval or a conversational-content-based interval, conversational observer agent 310 extracts a set of key points expressed by members of the group, summarizing the points in a compressed manner (using LLM), optionally assigning a conviction level to each of the points made based on the level of agreement (or disagreement) among participants and/or the level of conviction expressed in the language used by participants and/or the level of conviction inferred from facial expressions, vocal inflections, body posture and/or body gestures of participants (in embodiments that use microphones, cameras or other sensors to capture that information). The conversational observer agent 310 then transfers the summary to other modules in the system (e.g., global conversational observer 320 and conversational surrogate agent 325). Conversational observation agent 310 is an example of, or includes aspects of, the corresponding element described with reference to FIGS. 2, 4, 6, 9, and 10. Global conversational observer 320 is an example of, or includes aspects of, the corresponding element described with reference to FIGS. 4-6, and 9.

Conversational surrogate agent 325 in each of the chat rooms receives informational summaries or conversational dialog 315 from one or more conversational observer agents 310 and expresses the conversational dialog in first person to users 305 of each subgroup during real-time conversations. According to the example shown in FIG. 3, CSai(N−1) 325 is a conversational surrogate agent that receives conversational dialog from Subgroup (n−1) (i.e., based on the real-time conversations among humans in Chat Room (n−1)) and expresses a representation of the conversational dialog in natural language form (text and/or voice and/or expressive avatar) to users of another subgroup. For example, CSai(N−1) 325 is assigned to sub-group (n) (i.e., Chat room (n)) which indicates that it receives conversational dialog 315 from sub-group (n−1) and express a representation of the conversational dialog (in natural language) to the users of subgroup (n). Conversational dialogue 315 is an example of, or includes aspects of, the corresponding element described with reference to FIG. 4. Hereinafter, conversational dialog may be referred to as informational summary and the two terms may be used interchangeably.

Additionally, FIG. 3 indicates that conversational surrogate agent (CSai-2) receives an informational summary from sub-group 2 and expresses a representation of the summary (as natural language) to the users of sub-group 3. Likewise, conversational surrogate agent CSai(1) receives informational summaries from sub-group 1 and expresses a representation of those summaries (as natural language) to the users of sub-group 2. In this way, subgroups shown in FIG. 3 may receive informational summaries from at least one other sub-group. This ensures informational propagation across the population (e.g., the full population) (p) of users and individual participants may communicate directly (i.e., hold direct conversations) with few (e.g., 4) other individuals.

Here, 'n' can be extended to any number of users, for example 1000 users could be broken into 200 subgroups, each with 5 users, enabling coherent and meaningful conversations within subgroups with a manageable number of participants while also enabling natural and efficient propagation of conversational information between subgroups, thereby providing for knowledge, wisdom, insights, and intuition to propagate from subgroup to subgroup and ultimately across the full population.

Accordingly, a large population (for example 1000 networked users) can engage in a single conversation such that each participant feels like they are communicating with a small subgroup of other users, and yet informational content is shared between subgroups.

The content that is shared between subgroups is injected by the conversational surrogate agent 325 as conversational content presented as text chat from a surrogate member of the group or voice chat from a surrogate member of the group or video chat from a simulated video of a human expressing verbal content or VR-based Avatar Chat from a 3D simulated avatar of a human expressing verbal content.

Conversational surrogate agent 325 can be identified as an AI agent that expresses a summary of the views, opinions, perspectives, and insights from another subgroup. For example, the CSai agent in a given room, can express verbally—"I am here to represent another group of participants. Over the last three minutes, they expressed the following points for consideration." In some cases, the CSai expresses the summarized points generated by conversational observer agent 310.

Additionally, conversational observer agent 310 may generate summarized points at regular time intervals or intervals related to dialogue flow. For example, if a three-minute interval is used, the conversational observer agent generates a conversational dialogue 315 of the key points expressed in a given room over the previous three minutes. It would then pass the conversational dialogue 315 to a conversational surrogate agent 325 associated with a different subgroup. The surrogate agent may be designed to wait for a pause in the conversation in the subgroup (i.e., buffer the content for a short period of time) and then inject the conversational dialogue 315. The summary, for example, can be textually or verbally conveyed as—"Over the last three minutes, the participants in Subgroup 22 expressed that Global Warming is likely to create generational resentment as younger generations blame older generations for not having taken action sooner. A counterpoint was raised that younger generations have not shown sufficient urgency themselves."

In a more natural implementation, the conversational surrogate agent may be designed to speak in the first person, representing the views of a subgroup the way an individual human might. In this case, the same informational summary quoted in the paragraph above could be verbalized by the conversational surrogate agent as follows—"Having listened to some other users, I would argue Global Warming is likely to create generational resentment as younger generations blame older generations for not acting sooner. On the other hand, we must also consider that younger generations have not shown sufficient urgency themselves."

"First person" in English refers to the use of pronouns such as "I," "me," "we," and "us," which allows the speaker or writer, e.g., the conversational surrogate, to express thoughts, feelings, experiences, and opinions directly. When a sentence or a piece of writing is in the first person, it is written from the perspective of the person speaking or writing. An example of a sentence written in the first person is "I believe that the outcome of the Super Bowl is significantly dependent upon the Chief's quarterback Mahomes, who has been inconsistent in recent weeks."

In an even more natural implementation, the conversational surrogate agent might not identify that it is summarizing the views of another subgroup, but simply offer opinions as if it was a human member of the subgroup—"It's also important to consider that Global Warming is likely to create generational resentment as younger generations blame older generations for not acting sooner. On the other hand, we must also consider that younger generations have not shown sufficient urgency themselves."

In the three examples, a block of informational content is generated by one subgroup, summarized to extract the key points, and then expressed into another subgroup. This provides for information propagation such that the receiving subgroup can consider the points in an ongoing conversation. The points may be discounted, adopted, or modified by the receiving subgroup. Since such information transfer is happening in each subgroup parallelly, a substantial amount of information transfer occurs.

As shown in FIG. 3, the amplification of collective intelligence (across the full population) can be overseen by a third artificial agent, i.e., global conversational observer agent (GOai) 320. Global conversational observer 320 takes informational summaries as input from each of the conversational observer agents 310 (which include an extraction of key points and optionally include confidence and conviction assessments associated with each of the key points) across a plurality of the subgroups and produces a global informational summary at various intervals, i.e., based on elapsed time (e.g., based on five minute elapsed time and/or five minute intervals) or can be based on conversational interactions (for example, after a certain amount of dialogue has been generated across groups).

In case of each, a time-based interval or a conversational content-based interval, global conversational observer 320 extracts a set of key points expressed across subgroups, summarizes the points in a compressed manner, optionally assigning a conviction level to each of the points made based on the conviction identified within particular subgroups and/or based on the level of agreement across subgroups. Global conversational observer 320 documents and stores informational summaries 315 at regular intervals, thereby documenting a record of the changing sentiments of the full population over time and is also designed to output a final summary at the end of the conversation based on some or all of the stored global records. In some embodiments, when generating an updated or a Final Conversation Summary, the global conversational observer 320 weights the informational summaries 315 generated towards the end of the conversation substantially higher than those generated at the beginning of the conversation, as is generally assumed each group (and the networked of groups) gradually converges on the collective insights over time. Global conversational observer 320 is an example of, or includes aspects of, the corresponding element described with reference to FIGS. 4 and 5.

According to an exemplary embodiment, the collaborative system may be implemented among 800 people ((p) =800) to forecast the team that will win the Super Bowl next week. The conversational prompt in the example can be as follows—"The Kansas City Chiefs are scheduled to play the Philadelphia Eagles in the Super Bowl this Sunday. Who is going to win the game and why? Please discuss."

The prompt is entered by a moderator and is distributed by the HyperChat server (e.g., collaboration server as described with reference to FIGS. 1-2) to each of the HyperChat clients over communication networks (e.g., 800 users on the networked computing device described in FIGS. 1-2). The local HyperChat client application (e.g., local chat application described in FIGS. 1-2) that is running on the computer associated with each user displays the conversational prompt to the user. Thus, the prompt is sent from the collaboration server to 800 computing devices (e.g., desktops, laptops, phones, tablets, or other suitable devices with processing, input, and display capabilities). The prompt is shown to 800 users by the computing device associated with each user. The prompt can be displayed as text or as verbal content using a simulated voice. In some cases, the prompt can be provided by a visual representation of a human moderator (i.e., either a simulated flat video image or a 3D avatar). Thus, the 800 users who participate in the collaborative discussion and forecasting effort each receive the prompt: "The Kansas City Chiefs are scheduled to play the Philadelphia Eagles in the Super Bowl this Sunday. Who is going to win the game and why? Please discuss." In some embodiments, this happens at substantially the same time coordinated by the server, thus ensuring that all participants (across the plurality of sub-groups) kick off the discussion together.

The HyperChat server (i.e., collaboration server as described in FIGS. 1-2) performs a computational task that divides the 800 users into 80 subgroups (i.e., n=80) of 10 users each. The 80 subgroups can be considered as "Chat Room 1", "Chat Room 2", to "Chat Room 80". Thus, each of the 800 users are uniquely assigned to one of the 80 chat rooms. In some cases, the chat rooms can appear to the user as traditional text chat rooms in which each user is represented by a unique username in text with 10 such unique usernames in each room. In some cases, the chat rooms can appear to the user as a video conference call (e.g., Zoom) in which each user is represented by a webcam video feed with 10 video feeds in each room. The chat rooms can appear to the user as a 3D virtual conference room (e.g., Horizon Workroom) in which each of the 10 users appear as 3D avatars sitting around a virtual conference table to hold a conversation. The creation and display of AI-powered avatars with real-time voice and animated facial features (generated from text) can be enabled using off-the-shelf software modules with API interaction from companies such as Heygen and Synthesia.

Accordingly, the HyperChat server creates 80 unique conversational spaces and assigns 10 unique users to each of the spaces and enables the 10 users in each space to hold a real-time conversation with the other users in the space. Each of the users are aware that the topic to be discussed, as injected into the rooms by the HyperChat Server, is "The Kansas City Chiefs are scheduled to play the Philadelphia Eagles in the Super Bowl this Sunday. Who is going to win the game and why? Please discuss." According to some embodiments, a timer appears in each room, giving each subgroup six minutes to discuss the issue, surfacing the perspectives and opinions of various members of each group. As the users engage in real-time dialog (by text, voice, video, and/or 3D avatar), the conversational observer agent associated with each room monitors the dialogue. At one-minute intervals during the six minute discussion, the conversational observer agent associated with each room may be configured to automatically generate an informational summary for that room for that one-minute interval. In some embodiments, the informational summary can refer to storing the one-minute interval of dialogue (e.g., either captured as text directly or converted to text through known speech to text methods) and then sending the one minute of text to a foundational AI model (e.g., ChatGPT) via an API with a request that the Large Language Model summarize the one minute of text, extracting the most important points and ordering the points from most important to least important based on the conviction of the subgroup with regard to each point. Conviction may be assessed based on the strength of the sentiment assessing each point by individual members and/or based on the level of agreement among members on each point. The ChatGPT engine produces an informational summary for each conversational observer agent (i.e., an informational summary for each group). In some aspects, this process of generating a conversational summary of the one-minute interval of conversation may happen multiple times (e.g., during a full six-minute discussion).

Each time a conversational summary is generated for a sub-group by an observer agent, a representation of the informational content is then sent to a conversational surrogate agent in another room. As shown in FIG. 3, each room is associated with another room in a ring structure where the conversational observer agent of the last room in the list is associated with a conversational surrogate agent associated with the first room. While a ring structure is a viable way to have information propagate across all rooms, other network structures are possible for connecting conversational observer agent from one room to conversational surrogate agent in other rooms. In some examples, the network structures can include a ring structure with jumper cables across the ring to drive faster propagation of information. The network structure can also include randomized connections and/or small world connections.

Assuming the ring network structure shown in FIG. 3, at the end of each one-minute interval, an informational summary about the prior one minute of conversation held in Chat Room 1 will be injected into Chat Room 2 (via a conversational surrogate agent). At substantially the same time, an informational summary about the prior one-minute conversation held in Chat Room 2 will be injected into Chat Room 3 (via a conversational surrogate agent). The same thing happens between Chat Rooms 3 and 4, to the remaining pairs of rooms until an informational summary about the conversation held in Chat Room 80 will be injected into Chat Room 1 (via a conversational surrogate agent). Accordingly, each chat room is exposed to a conversational summary from another chat room. And this repeats over time, for multiple intervals, thereby enabling conversations in parallel chat rooms to remain independent but coordinated over time by the novel use of information propagation.

For example, a conversational surrogate agent in Chat Room 22 may express the informational summary received from Chat Room 21 as follows—"Having listened to another group of users, I would argue that the Kansas City Chiefs are more likely to win the Super Bowl because they have a more reliable quarterback, a superior defense, and have better special teams. On the other hand, recent injuries to the Chiefs could mean they don't play up to their full capacity while the Eagles are healthier all around. Still, considering all the issues the Chiefs are more likely to win."

The human participants in Chat Room 22 are thus exposed to the above information, either via text (in case of a text-based implementation) or by live voice (in case of a voice chat, video chat, or avatar-based implementation). A similar process is performed in each room, i.e., with different information summaries.

In parallel to each of the informational summaries being injected into an associated subgroups for consideration by the user of the subgroup, the informational summaries for the 80 subgroups are routed to the global conversational observer agent which summarizes the key points across the 80 subgroups and assesses conviction and/or confidence based on the level of agreement among subgroups. For example, if 65 of the 80 subgroups were leaning towards the Chiefs as the likely Super Bowl winner, a higher conviction score would be assigned to that sentiment as compared to a situation where, for example, as few as 45 of the 80 subgroups were leaning towards the Chiefs as the likely Superbowl Winner.

Additionally, when the users receive the informational summary from another room into their room, an optional updated prompt may be sent to each room and displayed, asking the members of each group to have an additional conversational period in light of the updated prompt, thus continuing the discussion in consideration of their prior discussion and the information received from another subgroup and the updated prompt. Into this example, the second conversational period can be another six-minute period. However, in practice the system may be configured to provide a slightly shorter time period. For example, a four-minute timer is generated in each subgroup.

In some cases, the users engage in real-time dialogue (by text, voice, video, and/or 3D avatar) for the allocated time period (e.g., four minutes). At the end of four minutes, the conversational observer agent associated with each room is tasked with generating a new informational summary for the room for the prior four minutes using similar techniques. In some embodiments, the summary includes the prior six-minute time period, but is weighted less in importance. In some cases, conviction may be assessed based on the strength of the sentiment assessing each point by individual members and/or based on the level of agreement among members on each point. Additionally, agreement of sentiments in the second time period with the first time period may also be used as an indication of higher conviction.

The informational summary from each conversational observer agent is then sent to a conversational surrogate agent in another room. Assuming the ring network structure shown in FIG. 3, an informational summary about the prior four-minute conversation held in Chat Room 1 is injected into Chat Room 2 (via a conversational surrogate agent). At substantially the same time, an informational summary about the prior four-minute conversation held in Chat Room 2 is injected into Chat Room 3 (via a conversational surrogate agent). The same process is performed between Chat Rooms 3 and 4, till the 79 pairs of rooms, etc. until an informational summary about the conversation held in Chat Room 80 is injected into Chat Room 1 (via a conversational surrogate agent). Accordingly, each chat room is exposed to a second conversational summary from another chat room.

Regardless of the specific time periods used as the interval for conversational summaries, each room is generally exposed to a multiple conversational summaries over the duration of a conversation. In the simplest case of a first time period and a second time period, it is important to clarify that in the second time period, each room is exposed to a second conversational summary from the second time period reflecting the sentiments of the same subgroup it received a summary from in the first time period. In other embodiments, the order of the ring structure can be randomized between time periods, such that in the second time period, each of the 80 different subgroups is associated with a different subgroup than it was associated with in the first time period. In some cases, such randomization increases the informational propagation across the population.

In case of a same network structure or an updated network structure used between time periods, the users consider the informational summary in the room and then continue the conversation about who will win the super bowl for the allocated four-minute period. At the end of the four-minute period, the process may repeat with another round (e.g., for another time period, for example of two minutes, with another optionally updated prompt). In some cases, the process can conclude if the group has sufficiently converged on a collective intelligence prediction, solution, or insight.

At the end of various conversational intervals (by elapsed time or by elapsed content), the Collaboration Server can be configured to optionally route the informational summaries for that interval to the global conversational observer agent which summarizes the key points across the (n) subgroups and assesses conviction and/or confidence based on the level of agreement among subgroups to assess if the group has sufficiently converged. For example, the Collaboration Server can be configured to assess if the level of agreement across subgroups is above a threshold metric. If so, the process is considered to reach a conversational consensus. Conversely, if the level of agreement across subgroups has not reached a threshold metric, the process may demand (e.g., and include) further deliberation. In this way, the Collaboration Server can intelligently guide the population to continue deliberation until a threshold level of agreement is reached, at which point the Collaboration Server ends the deliberation.

In case of further deliberation, an additional time period is automatically provided and the subgroups are tasked with considering the latest informational summary from another group along with their own conversations and discuss the issues further. In the case of the threshold being met, the Conversation Server can optionally send a Final Global Conversational Summary to all the sub-groups, informing all participants of the final consensus reached.

Accordingly, embodiments of the present disclosure include a HyperChat process with multiple rounds. Before the rounds start, the population is split into a set of (n) subgroups, each with (u) users. In some cases, before the rounds start, a network structure is established that identifies the method of feeding information between subgroups. As shown in FIG. 3, a ring structure is used such that each subgroup is numbered from 1 to N and wherein an informational summary from each subgroup X is generated by a Conversational Observer Agent (e.g., using a Foundational Al model such as ChatGPT) and is fed into subgroup X+1 and expressed conversationally within that subgroup by a Conversational Surrogate Agent (e.g., using a Foundational Al model such as ChatGPT). The Informational Summary of Subgroup N is fed back to the beginning of the list, injected into Subgroup 1 because this is a ring structure. In addition, at the end of each round the Global Conversational Observer Agent generates an Informational Summary across subgroups N. Rounds repeat one after another, stopping when the Informational Summary across subgroups N has reached a sufficient threshold of agreement and/or conviction in an outcome. In some embodiments, a threshold number (e.g., a maximum number) of rounds is defined, and if the group reaches the threshold number of rounds (e.g., the maximum number of rounds) without reaching sufficient threshold of agreement and/or conviction, an output is delivered along with an indication that the group could not find sufficient consensus.

In some embodiments, the informational summary fed into each subgroup is based on a progressively larger number of subgroups. For example, in the first round, each subgroup gets an informational summary based on the dialog in one other subgroup. In the second round, each subgroup gets an informational summary based on the dialog within two subgroups. In the third round, each subgroup gets an informational summary based on the dialog within four subgroups. In this way, the system helps drive the population towards increasing consensus.

In some embodiments, there are no discrete rounds but instead a continuously flowing process in which subgroups continuously receive Informational Summaries from other subgroups, e.g., based on new points being made within the other subgroup (i.e., not based on time periods).

According to some embodiments, the Conversational Surrogate agents selectively insert arguments into the subgroup based on arguments provided in other subgroups (based on the information received using the Conversational Observer agents). For example, the arguments may be counterpoints to the subgroup's arguments based on counterpoints identified by other Conversational Observers, or the arguments may be new arguments that were not considered in the subgroup that were identified by other Conversational Observers watching other subgroups.

In some cases, a functionality is defined to enable selective argument insertion by a Conversational Surrogate agent that receives conversational summary information from a subgroup X and inserts selective arguments into its associated subgroup Y. For example, a specialized Conversational Surrogate associated with subgroup Y performs additional functions. In some examples, the functions may include monitoring the conversation within subgroup Y and identifying the distinct arguments made by users during deliberation, maintaining a listing of the distinct arguments made in subgroup y, optionally ordered by assessed importance of the arguments to the conversing group, and when receiving a conversational summary from a Conversational Observer agent of subgroup X, comparing the arguments made in the conversational summary from subgroup X with the arguments that have already been made by participants in subgroup Y, identifying any arguments made in the conversational summary from subgroup x that were not already made by participants in the dialog within subgroup Y. Additionally, the functions may include expressing to the participants of subgroup Y as dialog via text or voice, one or more arguments extracted from the conversational summary from subgroup x that was identified as having not already been raised within subgroup x.

The present disclosure describes systems and methods that can enable large, networked groups to engage in real-time conversations with informational flow throughout the population without the drawbacks of individuals needing to communicate directly within unmanageable group sizes. Accordingly, multiple individuals (thousands or even millions) can engage in a unified conversation that aims to converge upon a singular prediction, decision, evaluation, forecast, assessment, diagnosis, or recommendation while leveraging the full population and the associated inherent collective intelligence.

Figure 4:
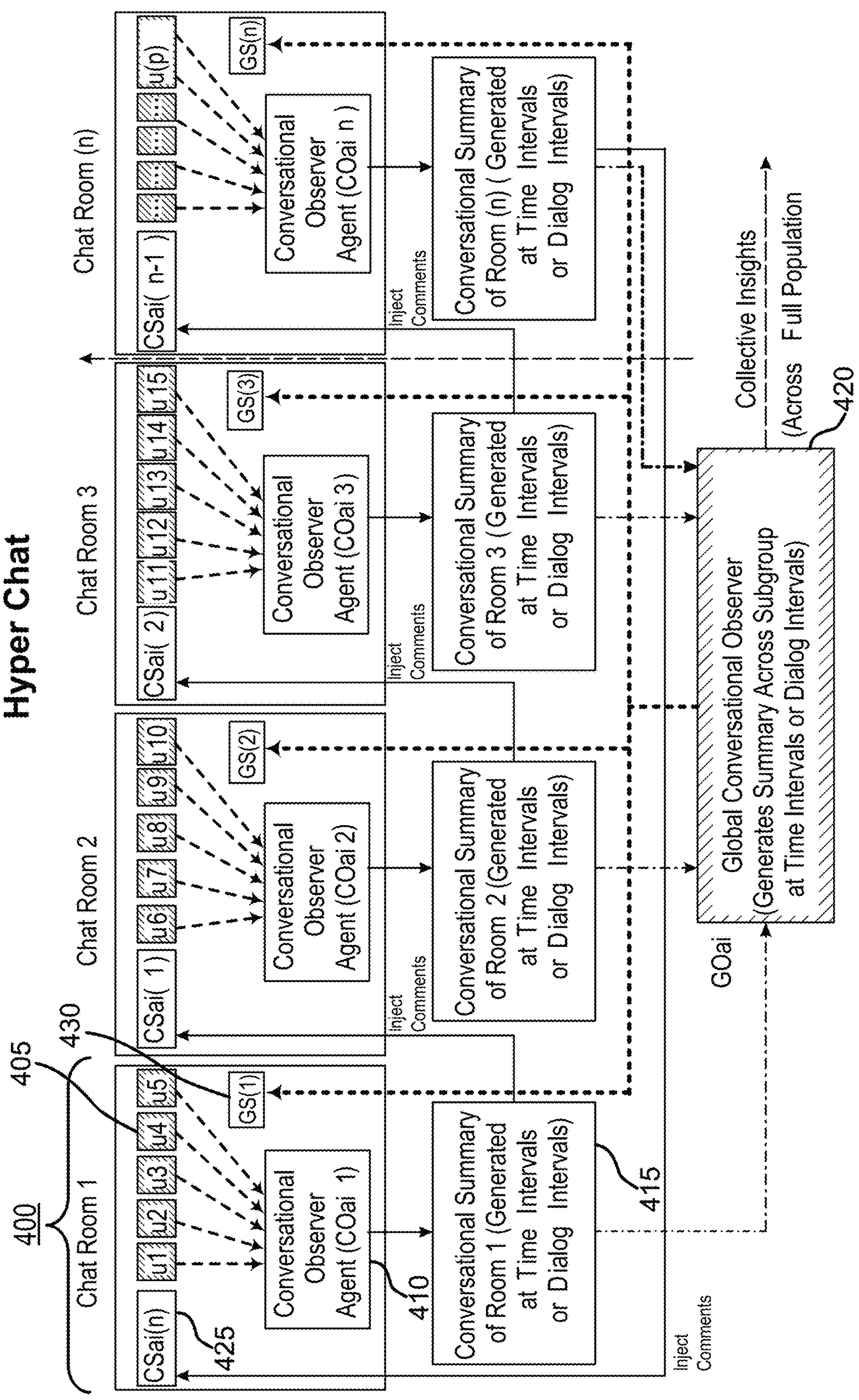

FIG. 4 shows an example of a HyperChat process according to aspects of the present disclosure. The example shown includes chat room 400, conversational dialogue 415, and global conversation observer 420. The HyperChat process of FIG. 4 is substantially the same as described with reference to FIG. 3 and hence repeated descriptions are omitted for brevity.

Chat room 400 is an example of, or includes aspects of, the corresponding element described with reference to FIGS. 3, 5, 6, 8, and 9. In certain aspects, chat room 400 includes user 405, conversational observation agent 410, conversational surrogate agent 425, and global surrogate agent 430.

As shown with reference to FIG. 4, a Global Surrogate Agent (GS) 430 can be added to each subgroup to selectively represent the views, arguments, and narratives that have been observed across the full population during a recent time period. For example, GS(n) in FIG. 4 represents the Global Surrogate agent present in chat room n. The Global Surrogate agent 430 in each room (n) is configured to impart conversational content (as text, voice, video, and/or 3D avatar) into a single subgroup (chat room) based on the Global Conversational Summary generated by the Global Conversational Observer 420 (as described with reference to FIG. 3). The views represented by each GS (n) agent 430 into each subgroup (n) may be identical. Global surrogate agent 430 is an example of, or includes aspects of, the corresponding element described with reference to FIG. 11. Global conversation observer 420 is an example of, or includes aspects of, the corresponding element described with reference to FIGS. 3, 5, 6, and 9.

In some embodiments, the views represented by each GS (n) agent 430 into each subgroup (n) can be custom tailored for the subgroup based on the subgroup's interactive dialog (among users 405), as analyzed by the subgroup's Conversational Observer (i.e., conversational observation agent 410) and/or can be based on the analysis of pre-session data that is optionally collected from participants and used in the formation of subgroups. User 405 is an example of, or includes aspects of, the corresponding element described with reference to FIGS. 1-3, 5, 6, 8, and 9. Conversational observation agent 410 is an example of, or includes aspects of, the corresponding element described with reference to FIGS. 2, 3, 6, 9, and 10.

For example, a GS agent 430 may summarize the population's discussion and inject a representation of the summary as interactive dialog into subgroups. For example, considering the Super Bowl prediction, the GS agent may be configured to inject a summary into subgroups and ask for elaboration based on a central theme that was observed. For example, the analysis across subgroups (by the Global Conversational Observer Agent) may indicate that most groups agree the outcome of the Super Bowl depends on whether the Chief's quarterback Mahomes, who has been playing hot and cold, plays well on Super Bowl day. Based on the observed theme, the injected dialog by the GS agent may be—"I've been watching the conversation across the many subgroups and a common theme has appeared. It seems many groups believe that the outcome of the Super Bowl is significantly dependent upon the Chief's quarterback Mahomes, who has been inconsistent in recent weeks. What could affect Mahomes' performance this Sunday and do we think Mahomes is likely to have a good day?". Such a first-person dialog may be crafted (e.g., via ChatGPT API) to provide a summary of a central theme observed across groups and then ask for discussion and elaboration, thereby encouraging the subgroup to discuss the issue. Accordingly, a consensus is built across the entire population by guiding subgroups towards central themes and providing for the opportunity to explore, elaborate, or reject the globally observed premise.

In some embodiments, the phrasing of the dialog from the GS agent may be crafted from the perspective of an ordinary member of the subgroup, not highlighting the fact that the agent is an artificial observer. For example, the dialog above could be phrased as "I was thinking, the outcome of the Super Bowl is significantly dependent upon the Chief's quarterback Mahomes, who has been inconsistent in recent weeks. What could affect Mahomes' performance this Sunday and do we think Mahomes is likely to have a good day?" This phrasing expresses the same content, but optionally presents it in a more natural conversational manner.

In some embodiments, the globally injected summary and query for elaboration could be based not on a common theme observed globally but based on an uncommon theme observed globally (i.e., a divergent viewpoint). By directing one or more subgroups to brainstorm and/or debate divergent viewpoints that are surfaced globally (i.e., but not in high frequency among subgroups), this software mediated method can be configured to ensures that many subgroups consider the divergent viewpoint and potentially reject, accept, modify, or qualify the divergent viewpoint. This has the potential to amplify the collective intelligence of the group, by propagating infrequent viewpoints and conversationally evoking levels of conviction in favor of, or against, those viewpoints for use in analysis. In an embodiment, the Global Surrogate Agents present the most divisive narratives to subgroups to foster global discussion around key points of disagreement.

One or more embodiments of the present disclosure further include a method for challenging the views and/or biases of individual subgroups based on the creation of a Conversational Instigator Agent that is designed to intelligently stoke conversation within subgroups in which members are not being sufficiently detailed in expressing the rationale for the supported positions or rejected positions. In such cases, a Conversational Instigator Agent can be configured to monitor and process the conversational dialog within a subgroup and identify when positions are expressed (for example, the Chiefs will win the Super Bowl) without expressing detailed reasons for supporting that position. In some cases, when the Conversational Instigator Agent identifies a position that is not associated with one or more reasons for the position, it can inject a question aimed at the human member who expressed the unsupported position. For example, "But why do you think the Chiefs will win?" In other cases, it can inject a question aimed at the subgroup as a whole. For example, "But why do we think the Chiefs will win?"

In addition, the Conversational Instigator Agent can be configured to challenge the expressed reasons that support a particular position or reject a particular position. For example, a human member may express that the Chiefs will win the Super Bowl "because they have a better offense." The Conversational Instigator Agent can be configured to identify the expressed position (i.e., the Chiefs will win) and identify the supporting reason (i.e., they have a better offense) and can be further configured to challenge the reason by injecting a follow-up question, "But why do you think they have a better offense?". Such a challenge then instigates one or more human members in the subgroup to surface reasons that support the position that the Chiefs have a better offense, which further supports the position that the Chiefs will win the Super Bowl. In some embodiments, the Conversational Instigator Agent is designed to probe for details using specific phraseology, for example, responding to unsupported or weakly supported positions by asking "But why do you support" the position, or asking "Can you elaborate" on the position. Such phraseologies provide an automated method for the AI agents to stoke the conversation and evoke additional detail in a very natural and flowing way. Accordingly, the users do not feel the conversation has been interrupted, stalled, mediated, or manipulated.

According to some embodiments, one or more designated human moderators are enabled to interface with the Global Conversational Agent and directly observe a breakdown of the most common positions, reasons, themes, or concerns raised across subgroups and provide input to the system to help guide the population-wide conversation. In some cases, the Human Moderator can indicate (through a standard user interface) that certain positions, reasons, themes, or concerns be overweighted when shared among or across subgroups. This can be achieved, for example, by enabling the Human Moderator to view a displayed listing of expressed reasons and the associated level of support for each, within a subgroup and/or across subgroups and clicking on one or more to be overweighted. In other cases, the Human Moderator can indicate that certain positions, reasons, themes, or concerns be underweighted when shared among or across subgroups. For example, Human Moderators are enabled to indicate that certain positions, reasons, themes, concerns be barred from sharing among and across subgroups, for example to mitigate offensive or inappropriate content, inaccurate information, or threads that are deemed off-topic. In this way, the Human Moderator can provide real-time input that influences the automated sharing of content by the Conversational Instigator Agent, either increasing or decreasing the amount of sharing of certain positions, reasons, themes, or concerns among subgroups.

The loudest person in a room can greatly sway the other participants in that room. In some cases, such effects may be attenuated using small rooms, thereby containing the impact of the loudest person to a small subset of the full participants, and only passing information between the rooms that gain support from multiple participants in that room. In some embodiments, for example, each room may include only three users and information only gets propagated if a majority (i.e., two users) express support for that piece of information. In other embodiments, different threshold levels of support may be used other than majority. In this way, the system may attenuate the impact of a single loud user in a given room, requiring a threshold support level to propagate their impact beyond that room.

Figure 5:
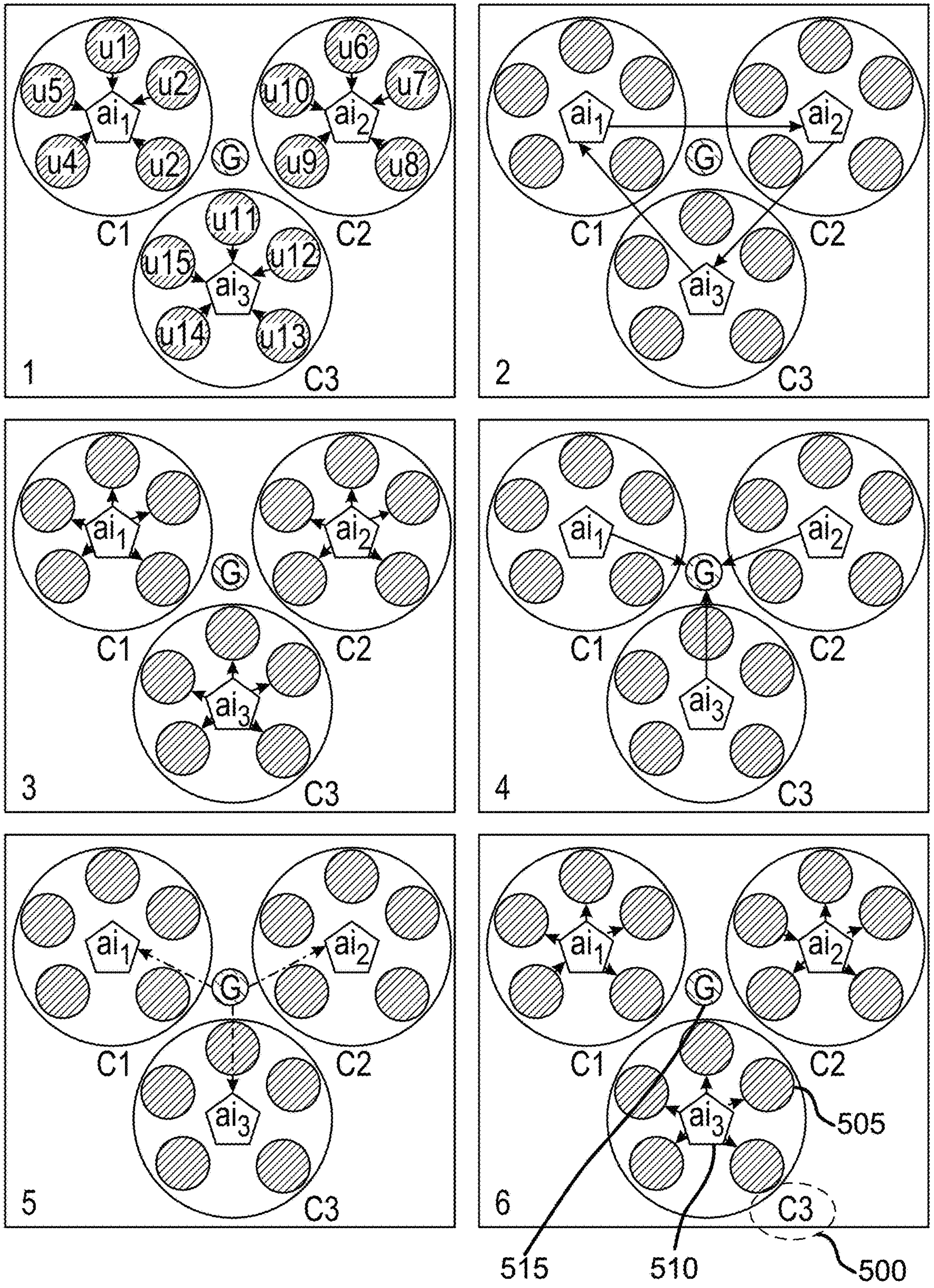
FIGS. 5 through 6 show examples of an interaction process according to aspects of the present disclosure.

FIG. 5 shows an example of an interaction process according to aspects of the present disclosure. The example shown includes chat room 500 and global conversation observer 515.

Chat room 500 is an example of, or includes aspects of, the corresponding element described with reference to FIGS. 3, 4, 6, 8, and 9. In certain aspects, chat room 500 includes user 505 and computing device 510. User 505 is an example of, or includes aspects of, the corresponding element described with reference to FIGS. 1-4, 6, 8, and 9.

In certain aspects, computing device 510 may include a conversational observer agent and a conversational surrogate agent. Computing device 510 is an example of, or includes aspects of, the corresponding element described with reference to FIGS. 1, 2, and 11. Conversational observer agent and conversational surrogate agent are examples of, or includes aspects of, the corresponding elements described with reference to FIGS. 1, 2, 3, 6, and 11. Global conversation observer 515 is an example of, or includes aspects of, the corresponding element described with reference to FIGS. 3, 4, 6, and 9.

As an example shown in FIG. 5, the interactive process for a collaboration system is shown as a 6 step process (indicated by numbers 1-6). For example, in a first step (indicated in 1), users u1 to u15 in chat rooms C1, C2, and C3 perform parallel chat conversations that are captured by AI-based computing device 510 represented as ai1, ai2, and ai3 in chat rooms C1, C2, and C3 respectively. Details regarding the functions of the computing device are provided in FIGS. 1-4.

Each computing device 510 uses a LLM to generate an informational summary of the conversation of the chat rooms C1, C2, and C3. A representation of the informational summary thus generated is sent to the conversational agent of the next chat room in a ring structure as the second step (indicated in 2). For example, the computing device ai1 of chat room C1 sends the summary of chat room C1 to the computing device a2 of chat room C2. Similarly, the computing device ai2 of chat room C2 sends the summary of chat room C2 to the computing device ai3 of chat room C3 and the computing device ai3 of chat room C3 sends the summary of chat room C3 to the computing device ai1 of chat room C1. Further details regarding transferring the summary to other chat rooms is provided with reference to FIG. 3.

Each computing device 510 of a chat room shares the informational summary received from the other chat room to the users of the respective chat room (as a third step indicated by 3). As an example shown in FIG. 5, the computing device ai1 of chat room C1 shares the summary of chat room C3 with the users of chat room C1. Similarly, the computing device ai2 of chat room C2 shares the summary of chat room C1 with the users of chat room C2 and the computing device ai3 of chat room C3 shares the summary of chat room C2 with the users of chat room C3. Further description regarding this step is provided with reference to FIG. 3.

Steps 1, 2 and 3 may optionally repeat a number of times, enabling users to hold deliberative conversations in the three parallel chat rooms for multiple intervals after which conversational information propagates across rooms as shown.

In step four, the Computing device 510 corresponding to each chat room sends the informational summary to global conversation observer (G) 515 (fourth step indicated by 4). The global conversation observer 515 generates a global conversation summary after the each of the chat rooms hold parallel conversations for some time while incorporating content from the informational summaries passed between chat rooms. For example, the global conversation summary is generated based on the informational summaries from each chat room over one or more conversational intervals.

In the fifth and sixth steps (indicated in 5 and 6), the global conversation summary is provided to computing device 510 of each chat room C1, C2, and C3, which in turn share the global conversation summary with the users in the chat room. Details regarding this step are provided with reference to FIG. 3.

Figure 6:
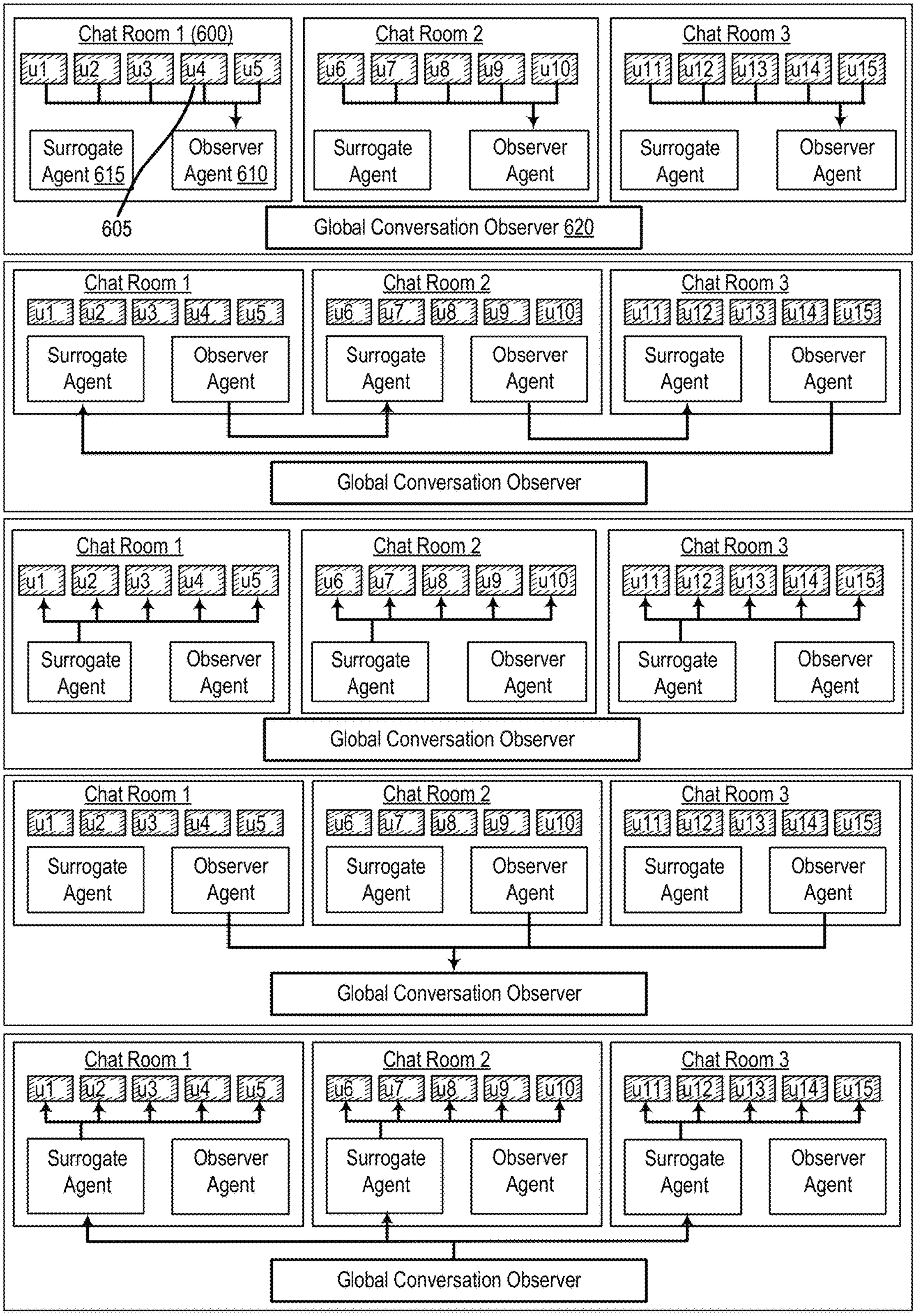

FIG. 6 shows an example of an interaction process according to aspects of the present disclosure. The example shown includes chat room 600 and global conversation observer 620.

Chat room 600 is an example of, or includes aspects of, the corresponding element described with reference to FIGS. 3-5, 8, and 9. In certain aspects, chat room 600 includes user 605, conversational observer agent 610, and conversational surrogate agent 615. User 605 is an example of, or includes aspects of, the corresponding element described with reference to FIGS. 1-5, 8, and 9.

Conversational observer agent 610 is an example of, or includes aspects of, the corresponding element described with reference to FIGS. 2-4, 9, and 10. Conversational surrogate agent 615 is an example of, or includes aspects of, the corresponding element described with reference to FIGS. 2-4, 8, 9, and 11. Global conversation observer 620 is an example of, or includes aspects of, the corresponding element described with reference to FIGS. 3-5, and 9.

FIG. 6 shows an interaction process for collaborative conversations as a 5-step process. In the first step, a large population engages in a single conversation such that each participant is associated with one of a plurality of small subgroups of users and is enabled to directly communicate with the other users in that unique subgroup of users. Conversational observer agent 610 (e.g., conversational observer agent as described with reference to FIGS. 1-3) keeps track of the conversation among each subgroup and generates summaries using the LLM (as described with reference to FIGS. 1-3).

In the second step, the collaboration server (described with reference to FIGS. 1-2) uses the conversational observer agent to coordinate information exchange between the separate chat rooms (i.e., between the separate conversations happening in parallel among separate subgroups). The information exchange is performed when the conversational observer agent generates a conversational representation of the summary (e.g., using LLM) for a given chat room of a given sub-group and sends the summary representation to conversational surrogate agent 615 of another chat room for another sub-group.

In some cases, conversational observer agent 610 may generate summarized points to be sent at regular time intervals or intervals related to dialogue flow. The content that is shared between subgroups is injected by the conversational surrogate agent 615 (in the third step) as conversational content and presented as text chat or voice chat or video chat from a simulated video to the users of the respective sub-group by a surrogate member (i.e., conversational surrogate agent 615) of the group. Accordingly, a block of informational content is generated by one subgroup, summarized to extract the key points, and then expressed into another subgroup.

In a third step, the plurality of subgroups continue their parallel deliberative conversations, now with the benefits of the informational content received in the second step. In this way, the participants in each subgroup can consider, accept, reject or otherwise discuss ideas and information from another subgroup, thereby enabling conversational content to gradually propagate across the full population in a thoughtful and proactive manner.

In some embodiments, the second and third steps are repeated multiple times (at intervals) enabling information to continually propagate across subgroups during the real-time conversation. By enabling local real-time conversations in small deliberative subgroups, while simultaneously enabling real-time conversational content to propagate across the subgroups, the collective intelligence is amplified as the full population is enabled to converge on unified solutions.

According to some embodiments, in a fourth step, a global conversation observer 620 takes as input, the informational summaries that were generated by each of the conversational observer agents 610, and processes that information which includes an extraction of key points across a plurality of the subgroups and produces a global informational summary.

Global conversational observer 620 documents and stores informational summaries at regular intervals, thereby documenting a record of the changing sentiments of the full population and outputs a final summary at the end of the conversation based on the stored global records. Global conversational observer 620, in a fifth step, provides the final summary to each surrogate agent 615, which in turn provides the final summary to each user in the collaborative system. In this way, all participants are made aware of the solution or consensus reached across the full population of participants.

In some embodiments, a global surrogate agent is provided in each subgroup to selectively represent the views, arguments, and narratives that have been observed across the entire population. In some embodiments, the views represented by each global surrogate agent into each subgroup (n) can be custom tailored for the subgroup based on the subgroup's interaction. For example, a global surrogate agent may summarize the population's discussion and inject a representation of the summary as interactive dialog into subgroups.

Dynamic Grouping

One or more embodiments of the present disclosure include a method for engineering subgroups to have deliberate bias. Accordingly, in some embodiments of the present invention, the discussion prompt is sent (by the central server) to the population of users before the initial subgroups are defined. The users provide a response to the initial prompt via text, voice, video, and/or avatar interface that is sent to the central server. In some embodiments, the user can provide an initial response in a graphical user interface that provides a set of alternatives, options, or other graphically accessed controls (including a graphic swarm interface or graphical slider interface as disclosed in the aforementioned patent applications incorporated by reference herein). The responses from the population are then routed to a Global Pre-Conversation Observer Agent that performs a rapid assessment. In some embodiments, the assessment is a classification process performed by an LLM on the set of initial responses, determining a set of Most Popular User Perspectives based on the frequency of expressed answers from within the population.

Using the classifications, a Subgroup Formation Agent is defined to subdivide the population into a set of small subgroups, i.e., to evenly distribute the frequency of Most Popular User Perspectives (as expressed by users) across the subgroups.

For example, a group of 1000 users may be engaged in a HyperChat session. An initial prompt is sent to the full population of users by the centralized server. In some examples, the initial conversational prompt may be—"What team is going to win the Super Bowl next year and why?"

Each user u(n) of the 1000 users provides a textual or verbal response to the local computer, the responses routed to the central server as described with reference to FIGS. 3-4. The Global Pre-Conversation Observer Agent then performs a Classification Process, identifying a set of most popular answers to the prompt. In some examples, the most popular answers are a set of teams that the 1000 users most commonly believe will win the Super Bowl Next year. The most popular set may be the following seven teams—"Chiefs, 49ers, Cowboys, Eagles, Patriots, Rams, Packers,!"

The Subgroup Formation Agent then divides the population into subgroups, working to create the distribution (e.g., the maximum distribution) of user perspectives across subgroups, such that each subgroup comprises a diverse set of perspectives (i.e., avoid having some groups overweighted by users who prefer the chiefs while other groups are overweighted by users who prefer the Eagles). Accordingly, subgroups being formed are not biased towards a particular team, and may have a healthy debate for and against the various teams.

In some embodiments, a distribution of bias is deliberately engineered across subgroups by algorithms running on the central server to have a statistical sampling of groups that lean towards certain beliefs, outcomes, or demographics. Accordingly, the system can collect and evaluate the different views that emerge from demographically biased groups and assess the reaction of the biased groups when Conversational Surrogate Agents that represent groups with alternative biases inject comments into that group.

An embodiment includes collection of preliminary data from each individual entering the HyperChat system (prior to assignment to subgroups) to create "bias engineered subgroups" on the central server. The data may be collected with a pre-session inquiry via survey, poll, questionnaire, text interview, verbal interview, a swarm interface, or another known tool. Using the collected pre-session data, users are allocated into groups based on demographic characteristics and/or expressed leanings. In some embodiments, users with similar characteristics in the pre-session data are grouped together to create a set of similar groups (e.g., maximally similar groups). In some embodiments, a blend of biased groups is created with some groups containing more diverse perspectives than others.

The HyperChat system begins collecting the discussion from each subgroup once the biased subgroups are created. After the first round (before Conversational Surrogate agents inject sentiments into groups), the Global Observer agent can be configured to assess what narratives (i.e., reasons, counterarguments, prevailing methods of thought) are most common in each subgroup that is biased in specific ways and the degree to which the biases and demographics impact the narratives that emerge. For example, subgroups that are composed of more Kansas City Chiefs fans might express different rationale for Super Bowl outcomes than subgroups that are composed of fewer Chiefs fans or may be less likely to highlight the recent performance of the Chiefs quarterback to justify the likelihood of the Chiefs winning the Super Bowl next year. The Global Observer agent quantifies and collates the differences to generate a single report describing the differences at a high level.

Then, the Conversation Surrogate agents can be configured to inject views from groups with specific biases into groups with alternate biases, provide for the group to deliberate when confronted with alternate viewpoints, and measure the degree to which the alternate views influence the discussion in each subgroup. Accordingly, the HyperChat system can be algorithmically designed to increase (e.g., and/or maximize) the sharing of opposing views across subgroups that lean in different directions.

In an alternate embodiment, the Ring Structure that defines information flow between subgroups is changed between rounds, such that most subgroups receive informational summaries from different subgroups in each round. Accordingly, information flow is increased. In some embodiments, the Ring Structure can be replaced by a randomized network structure or a small world network structure. In some embodiments, users are shuffled between rounds with some users being moved to other subgroups by the HyperSwarm server.

HyperChat for Rounded and Roundless Structures

One or more embodiments of the present disclosure are structured in formalized "rounds" that are defined by the passage of a certain amount of time or other quantifiable metrics. Thus, rounds can be synchronous across subgroups (i.e., rounds start and end at substantially the same time across subgroups), rounds can be asynchronous across subgroups (i.e., rounds start and end independently of the round timing in other subgroups), and rounds can be invisible to users within each subgroup (i.e., rounds may be tracked by the central server to mediate when a block of conversational information is injected into a given subgroup, but the participants in that subgroup may perceive the event as nothing more than an artificial agent injecting a natural comment into the conversation in the subgroup).

For example, a system can be structured with 200 subgroups (n=1 to n=200) of 10 participants each for a total population of 2000 individuals (u=1 to u=1000). A particular first subgroup (n=78) may be observed by a Conversational Observer Agent (COai 78) process and linked to a second subgroup (n=89) for passage of conversational information via Conversational Summary Agent (CSai 89). When a certain threshold of back-and-forth dialog exceeds in the first subgroup, as determined by process (COai 78), a summary is generated and passed to process (CSai 89) which then expresses the summary, as a first person interjection (as text, voice, video, and or avatar) to the members of the second subgroup (in a ring structure of 200 subgroups). The members of Subgroup 89 that hear and/or see the expression of the summary from Subgroup 78 may perceive the summary as an organic injection into the conversation (i.e., not necessarily as part of a formalized round structured by the central server).

In some examples, a first group of participants may be asked to discuss a number of issues related to NBA basketball in a text-based chat environment. After a certain amount of time, the chat dialog is sent (for example, API-based by an automated process) to a LLM model that summarizes the dialog that had elapsed during the time period, extracting the important points while avoiding unnecessary information. The summary is then passed to the LLM (for example, by API-based automated process) to convert it into a first person expression and to inject the expression into another chat group. A dialog produced by the LLM model (e.g., ChatGPT) may be:

"I observed a group of sports fans discussing the Lakers vs. Grizzlies game, where the absence of Ja Morant was a common reason why they picked the Lakers to win. They also discussed the Eastern conference finals contenders, with the Milwaukee Bucks being the most popular choice due to their consistency and balanced team. Some expressed confidence in the Bucks, while others had conflicting views due to recent losses and player absences. The Boston Celtics and Philadelphia 76ers were also mentioned as potential contenders, but doubts were raised over their consistency and playoff performance."

Accordingly, members of the second group can read a summary of conversational information, including central arguments, from a first subgroup. In some cases, the expression is in the first person and thus feels like a natural part of the conversation in the second subgroup.

A Collaboration Process

Figure 7:
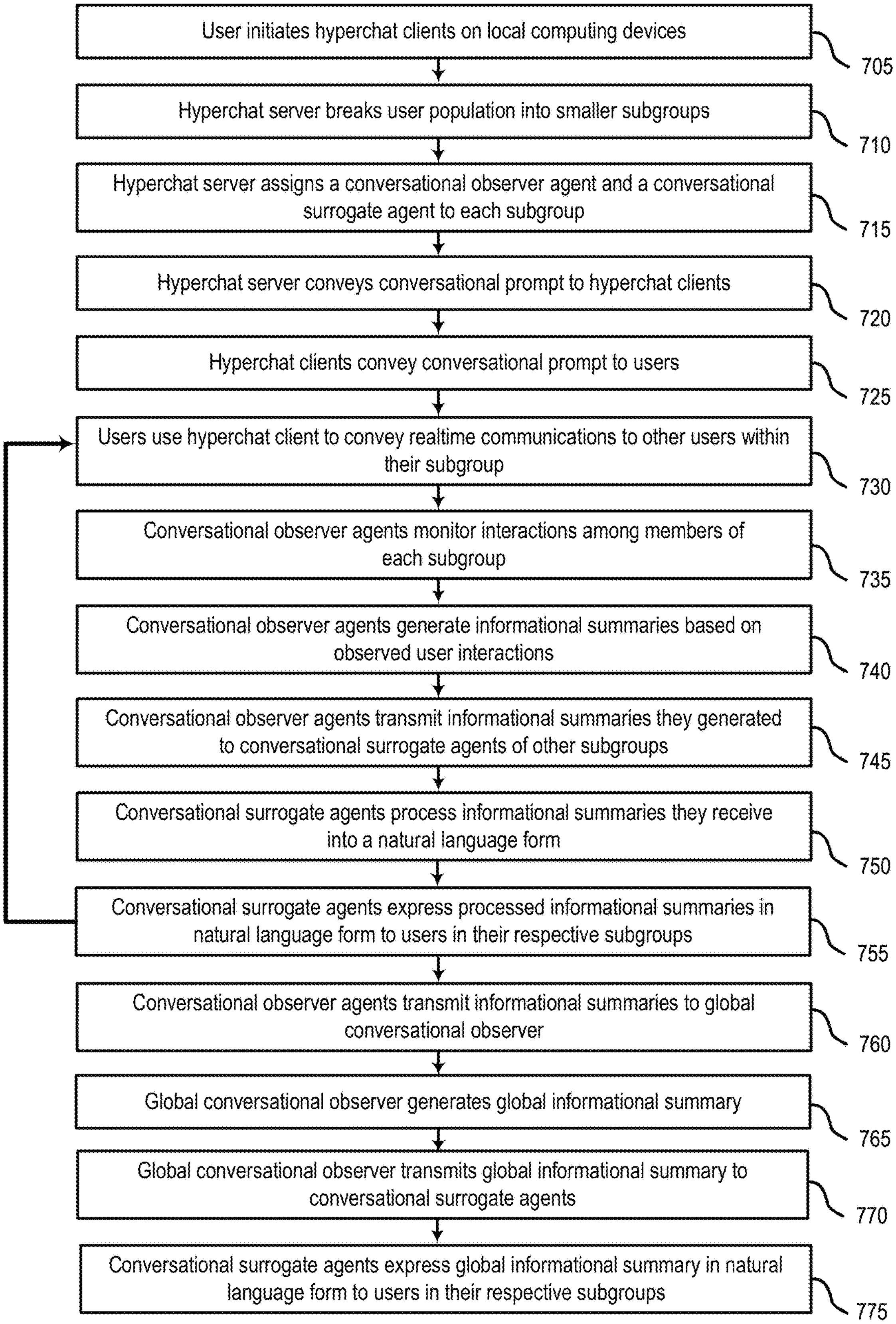
FIG. 7 shows an example of a flowchart for computer mediated collaboration according to aspects of the present disclosure.

FIG. 7 shows an example of a flowchart for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system users initiate HyperChat clients (i.e., local chat application) on local computing devices. In some cases, the operations of this step refer to, or may be performed by, the user as described with reference to FIGS. 1-5.

At operation 710, the system breaks user population into smaller subgroups. In some cases, the operations of this step refer to, or may be performed by, the HyperChat server. According to some embodiments, the HyperChat server may be a collaboration server (described with reference to FIGS. 1-3).

At operation 715, the system assigns a conversational observer agent and a conversational surrogate agent to each subgroup. In some cases, the operations of this step refer to, or may be performed by, the HyperChat server or collaboration server as described with reference to FIGS. 1-3. In some cases, the observer agent and the surrogate agent are performed by the same software process and may be considered a single dual-purpose AI agent.

At operation 720, the system conveys conversational prompt to HyperChat clients. In some cases, the operations of this step refer to, or may be performed by, the HyperChat server or collaboration server as described with reference to FIGS. 1-3.

At operation 725, the system conveys conversational prompt to users within each subgroup. In some cases, the operations of this step refer to, or may be performed by, the HyperChat server or collaboration server as described with reference to FIGS. 1-3. In some embodiments the system expresses the prompt using different wording or style in different subgroups depending on the configuration of the surrogate agent with respect to that subgroup.

At operation 730, the system uses HyperChat client to convey real time communications to and from other users within their subgroup. In some embodiments, this real-time communication is routed through the collaboration server, which mediates message passage among members of each subgroup via the hyperchat client. In some cases, the operations of this step refer to, or may be performed by, the user as described with reference to FIGS. 1-5.

At operation 735, the system monitors interactions among members of each subgroup. In some cases, the operations of this step refer to, or may be performed by, the conversational observer agent as described with reference to FIGS. 1-5.

At operation 740, the system generates informational summaries based on observed user interactions. In some cases, the operations of this step refer to, or may be performed by, the conversational observer agent as described with reference to FIGS. 1-5.

At operation 745, the system transmits informational summaries they generated to conversational surrogate agents of other subgroups. In some cases, the operations of this step refer to, or may be performed by, the conversational observer agent as described with reference to FIGS. 1-5.

At operation 750, the system processes informational summaries they receive into a natural language form. In some cases, the operations of this step refer to, or may be performed by, the conversational surrogate agent as described with reference to FIGS. 1-5.

At operation 755, the system expresses processed informational summaries in natural language form to users in their respective subgroups. In some cases, the operations of this step refer to, or may be performed by, the conversational surrogate agent as described with reference to FIGS. 1-5.

At operation 755, the process optionally repeats by jumping back to operation 730, thus enabling the members within each subgroup to continue their real-time dialog, their deliberations now influenced by the conversational content that was injected into their room. In this way, steps 730 to 755 can be performed at repeated intervals during which subgroups deliberate, their conversations are observed, processed, and summarized, and a representation of the summary is passed into other groups. The number of iterations can be pre-planned in software, or can be based on pre-defined time limits, or can be dependent on the level of conversational agreement within or across subgroups. In all cases, the system will eventually cease repeating steps 730 to 755.

At operation 760, the system transmits informational summaries to global conversational observer. In some cases, the operations of this step refer to, or may be performed by, the conversational observer agent as described with reference to FIGS. 1-5. According to some embodiments, operation 760 is performed after operations 730 to 755 are performed parallelly for a certain time.

At operation 765, the system generates global informational summary. In some cases, the operations of this step refer to, or may be performed by, the global conversational observer as described with reference to FIGS. 1-5.

At operation 770, the system transmits global informational summary to conversational surrogate agents. In some cases, the operations of this step refer to, or may be performed by, the global conversational observer as described with reference to FIGS. 1-5.

At operation 775, the system expresses global informational summary in natural language form to users in their respective subgroups. In some cases, the operations of this step refer to, or may be performed by, the conversational surrogate agent as described with reference to FIGS. 1-5.

In some embodiments, the process at 775 optionally jumps back to operation 730, thus enabling the members within each subgroup to continue their real-time dialog, their deliberations now influenced by the global information summary that was injected into their room. The number of iterations (jumping back to 730) can be pre-planned in software, or can be based on pre-defined time limits, or can be dependent on the level of conversational agreement within or across subgroups.

In all examples, the system will eventually cease jumping back to operation 730. At that point, the system expresses a final global informational summary in natural language form to the users in their respective subgroups.

Video HyperChat Process

Video conferencing is a special case for the HyperChat technology since it is very challenging for groups of networked users above a certain size (i.e., number of users) to hold a coherent and flowing conversation that converges on meaningful decisions, predictions, insights, prioritization, assessments or other group-wise conversational outcomes. In some examples, when groups are larger than 12 to 15 participants in a video conferencing setting, it is increasingly difficult to hold a true group-wise conversation. In some cases, video conferencing for large groups may be used for one-to-many presentations and Q&A sessions (however, such presentations and sessions are not true conversations).

Current video conferencing systems are not equipped to enable large groups to hold conversations while enabling the amplification of the collective intelligence. Embodiments of the present disclosure describe systems and methods for video conferencing that are equipped to enable large groups to hold conversations while enabling the amplification of collective intelligence and significant new capabilities.

Embodiments of the present disclosure can be deployed across a wide range of networked conversational environment (e.g., text chatrooms (deployed using textual dialog), video conference rooms (deployed using verbal dialog and live video), immersive "metaverse" conference rooms (deployed using verbal dialog and simulated avatars), etc.). One or more embodiments include a video conferencing HyperChat process.

Figure 8:
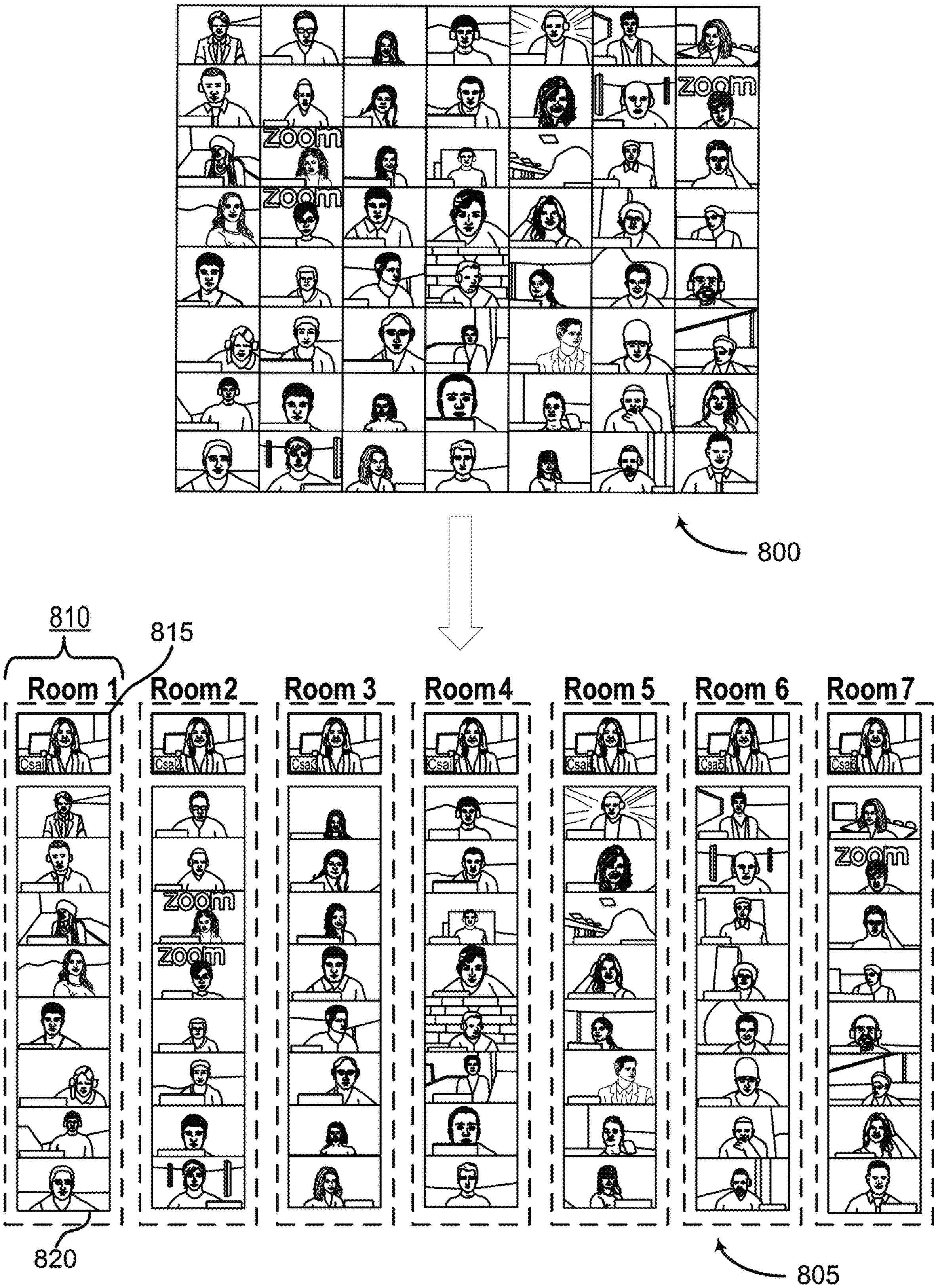
FIGS. 8 through 9 show examples of a video based HyperChat process according to aspects of the present disclosure.

FIG. 8 shows an example of a video based HyperChat process according to aspects of the present disclosure. The example shown includes conventional video conferencing environment 800 with 56 real-time human participants who are communicating through video chat. For convenience we refer to this environment as "chat room" 800 despite the fact that the communication is primarily video based. Similarly, FIG. 8 also includes video based chat room 810.

Chat room 810 is an example of, or includes aspects of, the corresponding element described with reference to FIGS. 3-6, and 9. In certain aspects, chat room 810 includes conversational surrogate agent 815 and user 820. Conversational surrogate agent 815 is an example of, or includes aspects of, the corresponding element described with reference to FIGS. 2, 6, 9, and 11. User 820 is an example of, or includes aspects of, the corresponding element described with reference to FIGS. 1-6, and 9.

Referring to FIG. 8, a conventional video conferencing application 800 (i.e., Zoom) is being used by 56 networked human members in a single conversational room. As shown, the number of users is high, making it challenging (i.e., nearly impossible) for members to clearly identify users in the room or enable a meaningful groupwise conversation. Due to the high number of human members, it may be very difficult for a single individual to have much of an opportunity to speak. In fact, communication research shows that deliberative conversations degrade substantially with group sizes greater than 5 to 7 members, as turn-taking dynamics collapse and participation per users drop greatly. In case a meeting is scheduled for an hour, on an average, a conversation of 56 members would enable few individuals to speak for more than one minute on average. Such a situation/setting is not conducive to user contribution and does not provide for a healthy back and forth among participants on issues of consequence. Accordingly, there is no mechanism to leverage the ability of large groups to amplify the collective intelligence of the networked participants through real-time deliberative conversation.

Referring again to FIG. 8, a structure and method for a hyper video chat 805 is shown for the example of 56 networked human users 820, according to embodiments of the present disclosure. As shown, the 56 users are split into 7 separable sub-rooms (i.e., Room 1 to Room 7) each populated by 8 participants. In each sub-room, the participants can see and hear the other 7 participants in the room which is a size that is convenient for meaningful human conversations that can reach groupwise decisions, assessments, prioritizations, evaluations, rating, rankings, and other groupwise outcomes.

The example shows 8 participants per room. However, embodiments are not limited thereto and fewer or greater number of participants within reason can be used. The example shows equal numbers of participants per sub-room. However, embodiments are not limited thereto, and other embodiments can include (e.g., use, implement, etc.) varying numbers of participants per sub-room. As shown in hyper video chat 805 is a Conversational Surrogate Agent (CSai) 815 that is uniquely assigned, maintained, and deployed for use in each of the parallel rooms.

The CSai agent 815 is shown in this example at the top of each column of video feeds and is a real-time graphical representation of an artificial agent that emulates what a human user may look like in the video box of the video conferencing system. In some cases, technologies enable simulated video of artificial human characters that can naturally verbalize dialog and depict natural facial expressions and vocal inflections. For example, the "Digital Human Video Generator" technology from Delaware company D-ID is an example technology module that can be used for creating real-time animated artificial characters. Other technologies are available from other companies.

Using APIs from large language models (e.g., AI systems, such as ChatGPT), unique and natural dialog can be generated for the Conversational Surrogate Agent in each sub-room which is conveyed verbally to the other members of the room through simulated video of a human speaker, thereby enabling the injection of content from other sub-rooms in a natural and flowing method that does not significantly disrupt the conversational flow in each sub-room. One or more exemplary embodiments evaluate hyper-chat and indicate that conversational flow is maintained.

Figure 9:
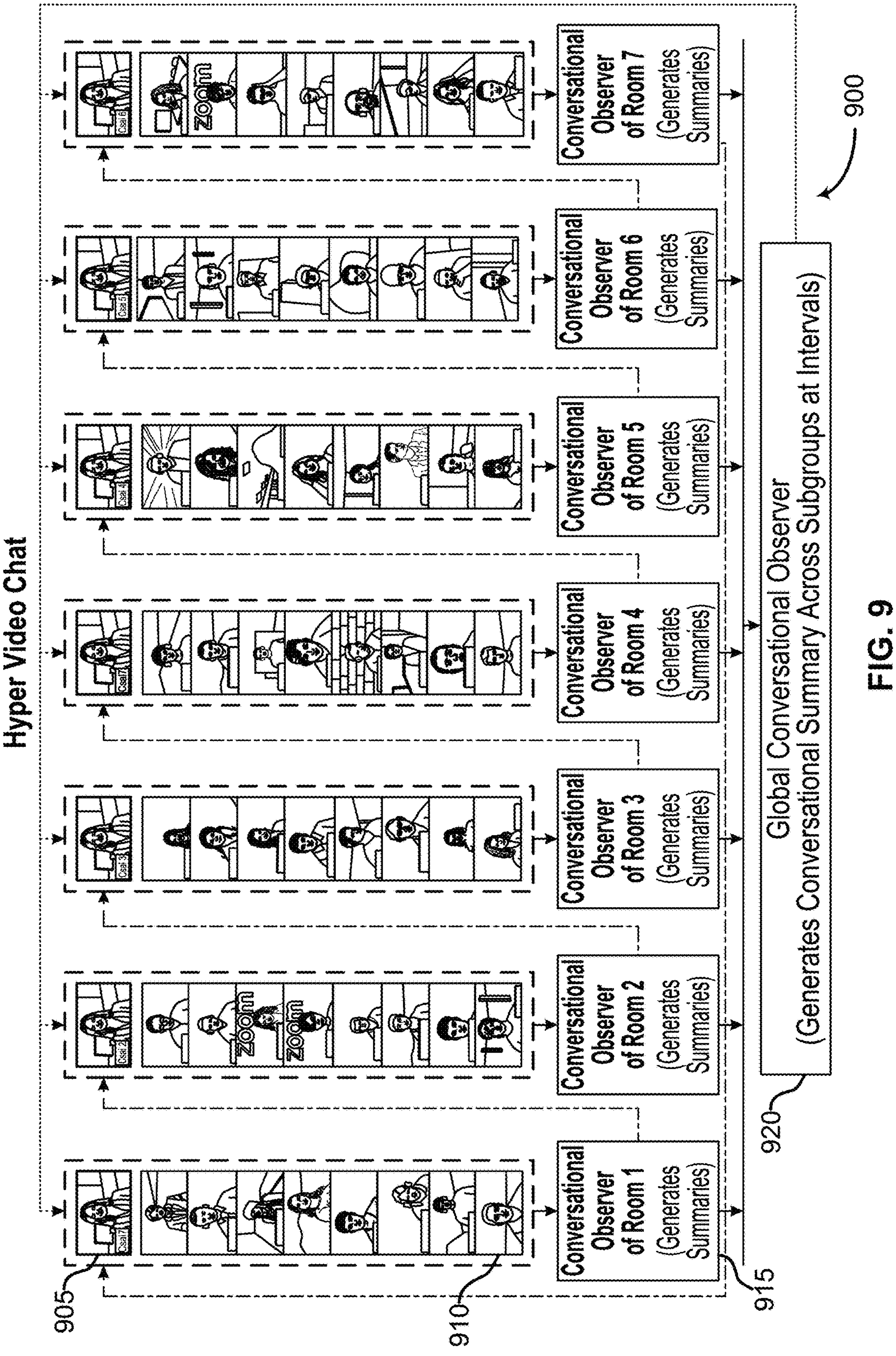

FIG. 9 shows an example of a video based HyperChat process according to aspects of the present disclosure. The example shown includes chat room 900 and global conversation observer 920.

Chat room 900 is an example of, or includes aspects of, the corresponding element described with reference to FIGS. 3-6, and 8. In certain aspects, chat room 900 includes conversational surrogate agent 905, user 910, and conversational observation agent 915. Conversational surrogate agent 905 is an example of, or includes aspects of, the corresponding element described with reference to FIGS. 2, 6, 8, and 11. User 910 is an example of, or includes aspects of, the corresponding element described with reference to FIGS. 1-6, and 8. Conversational observation agent 915 is an example of, or includes aspects of, the corresponding element described with reference to FIGS. 2-4, 6, and 10. Global conversation observer 920 is an example of, or includes aspects of, the corresponding element described with reference to FIGS. 3-6.

FIG. 9 shows mapping of a plurality of information pathways (e.g., pathways shown with reference to FIGS. 3-4). As shown in FIG. 9, there are two critical processes that involve Large Language Models accessed in real-time by API. In some cases, a process (performed by a Conversational Observer Agent 915) monitors the conversation in each sub-room (either by text or voice chat) and generates conversational summaries at various intervals. In some cases, a process injects conversational summaries from one sub-room into one or more other sub-rooms, thereby propagating conversational information across the large population.

As shown in FIG. 9, the human dialog generated within each sub-room is captured in real-time (or near real-time), stored for periods of time, converted to text, and intermittently input to an LLM engine via an API process. The LLM is directed to perform assessments and/or summarizations of the captured dialog as described with reference to FIGS. 3-4. In some cases, the LLM can be directed to summarize the interval of dialog, indicating the most significant points made and the conviction (or lack thereof) expressed by the sub-group in each of the significant points made. In some cases, the Conversational Summary generated in each sub-room is fed to the Conversational Surrogate Agent 905 in an alternate sub-room to enable the Hyper Video process with information propagation. Accordingly, the human participants are enabled to engage in real-time conversation within the respective sub-rooms and to receive (via a simulated human surrogate 905) critical points that were expressed among the participants (users 910) in another sub-room.

The process is conducted among some, many, or each of the subgroups at regular intervals, thereby propagating information in a highly efficient manner. In some examples, sub-rooms are arranged in a ring network structure as shown in FIG. 9. Each sub-room is monitored by a single observer agent 915 which provides informational summaries to a single alternate sub-room at intervals and each sub-room is populated with a single Conversational Surrogate Agent 905 that receives information summaries from a single alternate-subgroup at certain intervals.

One or more exemplary embodiments of the disclosure evaluate the HyperChat text process and enable significant information propagation. According to some embodiments, alternate network structures (i.e., other than a ring structure) can be used. Additionally, embodiments may enable multiple Conversational Surrogate Agents in each sub-room, each of which may optionally represent informational summaries from other alternate sub-rooms. Or, in other embodiments, a single Conversational Surrogate Agent in a given sub-room may optionally represent informational summaries from multiple alternative sub-rooms. The representations can be conveyed as a first-person dialog.

Networking structures other than a ring network become increasingly valuable at larger and larger group sizes. For example, an implementation in which 2000 users engage in a single real-time conversation may involve connecting 400 sub-groups of 5 members each according to the methods of the present invention. In such an embodiment, a small world network or other efficient topology may be more effective at propagating information across the population.

Referring again to FIG. 9, an optional Global Observer Agent 920 is enabled by an LLM engine and is configured to receive conversational summaries (via API calls) from two or more of the Conversational Observer Agents 915. The Global Observer Agent 920 receives conversational summaries from the active sub-rooms (Sub-room 1 to Sub-room 7) and assesses and summarizes the salient points made across sub-groups at various intervals. For example, the Global Observer Agent 920 may assess and summarize the key points made across the seven sub-rooms shown at regular time intervals, estimating the relative conviction expressed across sub-groups on various points made.

As shown in FIG. 9, the Global Observer Agent 920 can inject the assessments and summaries performed at various intervals back into each sub-room (i.e., to each sub-group of participants) via the simulated video Conversation Surrogate Agent 905 in the sub-room. Accordingly, the groups can receive global information (i.e., with key points from each group). According to embodiments described herein, the injection of global summary information into sub-groups occurs less frequently than the injection of local information from other sub-groups and occurs later in the conversational process. That is, the process enabled herein is an interactive system in which the entire population gradually converges on solutions. Thus, in some aspects, more time may elapse for global sentiments to converge than local sentiments within individual sub-rooms (i.e., among sub-groups).

In some embodiments, the subgroups receive the same global summary injected into the sub-room via the Conversational Surrogate Agent 905 within the room. In some embodiments, the Global Observer Agent 920 is configured to inject customized summaries into each of the sub-rooms based on a comparison between the global summary made across groups and the individual summary made for particular groups. In some embodiments, the comparison may be performed to determine if the local sub-group has not sufficiently considered significant points raised across the set of sub-groups. For example, if most subgroups identified an important issue for consideration in a given groupwise conversation but one or more other sub-groups failed to discuss that important issue, the Global Observer Agent 920 can be configured to inject a summary of such an important issue.

As described, the injection of a summary can be presented in the first person. For example, if sub-group number 1 (i.e., the users holding a conversation in sub-room 1) fail to mention a certain issue that may impact the outcome, a decision, or forecast being discussed, but other sub-groups (i.e., sub-rooms 2 through 7) discuss the issue as significant, the Global Observer Agent identifies the fact by comparing the global summary with each local summary, and in response injects a representation of the certain issue into room 1.

In some embodiments, the representation is presented in the first person by the Conversational Surrogate Agent 905 in sub-room 1, for example with dialog such as—"I've been watching the conversation in all of the other rooms, and I noticed that they have raised an issue of importance that has not come up in our room.!" The Conversational Surrogate Agent 905 will then describe the issue of importance as summarized across rooms. Accordingly, information propagation is enabled across the population while providing for subgroup 1 to continue the naturally flowing conversation. For example, subgroup 1 may consider the provided information but not necessarily agree or accept the issues raised.

In some embodiments, the phrasing of the dialog from the Conversational Surrogate Agent 905 may be crafted from the perspective of an ordinary member of the sub-room, not explicitly highlighting the fact that the agent is an artificial observer. For example, the dialog above could be phrased as "I was thinking, there's an issue of importance that we have not discussed yet in our room. The Conversational Surrogate Agent 905 will then describe the issue of importance as summarized across rooms as if it was their own first-person contribution to the conversation. This can enable a more natural and flowing dialog.

The video conferencing architecture (e.g., as described with reference to FIGS. 8-9) can be deployed using either the round-based methods or roundless methods. The present disclosure describes systems and methods for text-based conversations that can be applied to voice-based conversations deployed using video chat or avatar chat. Accordingly, large populations can be enabled to be split into a network of interconnected real-time subgroups that converge in conversational synchrony on collaborative solutions. In addition, the methods for amplifying collective intelligence are applicable to the video chat examples of FIGS. 8-9.

In some cases, the video-based solutions can be deployed with an additional sentiment analysis layer that assesses the level of conviction of each user's verbal statements based on the inflection in the voice, the facial expressions, and/or the hand and body gestures that correlate with verbal statements during the conversation. The sentiment analysis can be used to supplement the assessment of either confidence and/or conviction in the conversational points expressed by individual members and can be used in the assessment of overall confidence and conviction within subgroups and across subgroups. When sentiment analysis is used, embodiments described herein may employ anonymity filters to protect the privacy of individual participants.

Figure 10:
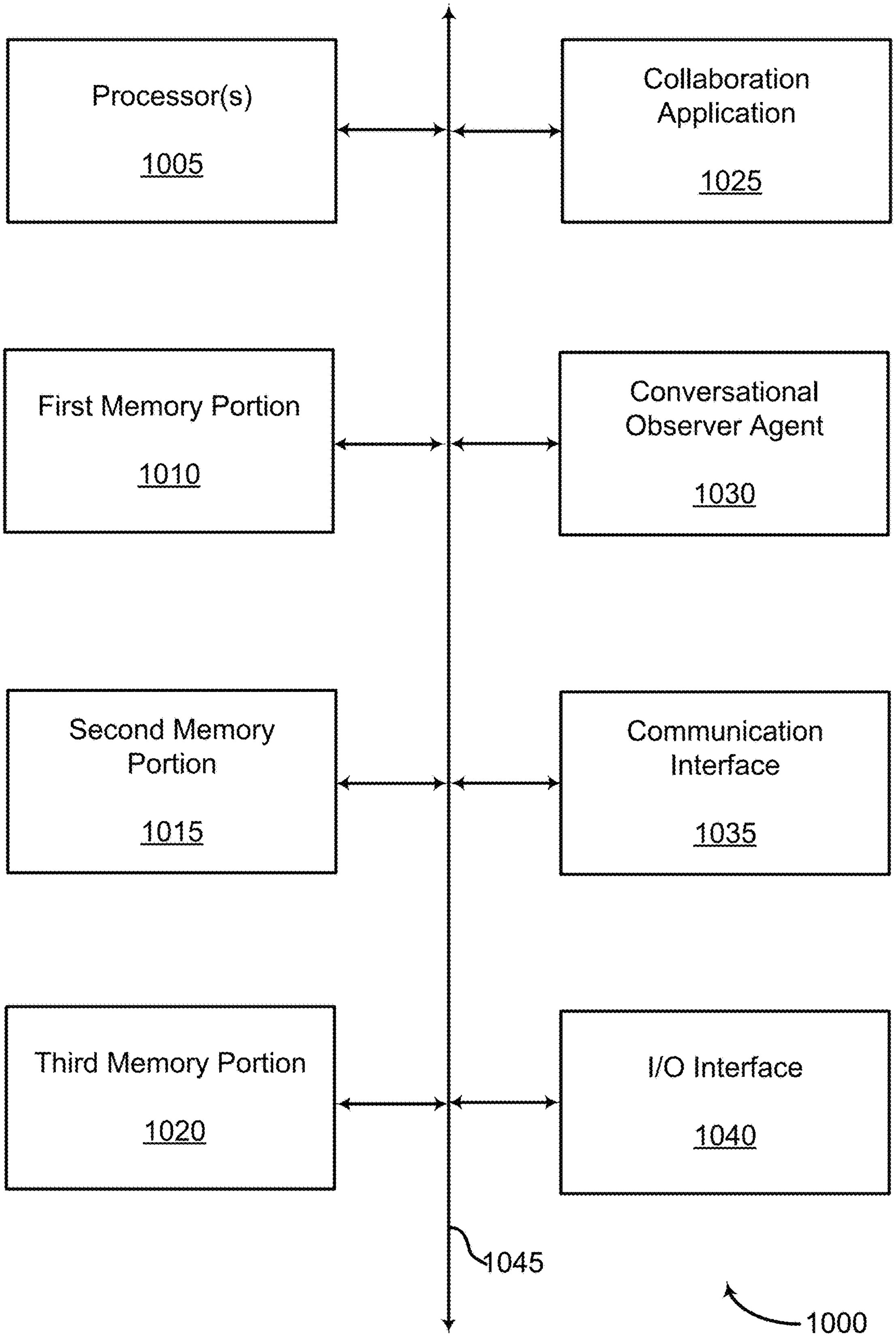
FIG. 10 shows an example of a collaboration server according to aspects of the present disclosure.

FIG. 10 shows an example of a collaboration server 1000 according to aspects of the present disclosure. In certain aspects, collaboration server 1000 includes processor(s) 1005, first memory portion 1010, second memory portion 1015, third memory portion 1020, collaboration application 1025, conversational observer agent 1030, communication interface 1035, I/O interface 1040, and channel 1045.

Collaboration server 1000 is an example of, or includes aspects of, the corresponding element described with reference to FIGS. 1-3. In some embodiments, collaboration server 1000 includes one or more processors 1105 that can execute instructions stored in first memory portion 1010, second memory portion 1015, and third memory portion 1020 to provide a collaboration server running a collaboration application, the collaboration server in communication with the plurality of the networked computing devices, each computing device associated with one member of the population of human participants, the collaboration server defining a plurality of sub-groups of the population of human participants; provide a local chat application on each networked computing device, the local chat application configured for displaying a conversational prompt received from the collaboration server, and for enabling real-time chat communication with other members of a sub-group assigned by the collaboration server, said real-time chat communication including sending chat input collected from the one member associated with the networked computing device to other members of the assigned sub-group; and enable through communication between the collaboration application running on the collaboration server and the local chat applications running on each of the plurality of networked computing devices.

According to some aspects, collaboration server 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof.) In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, each of first memory portion 1010, second memory portion 1015, and third memory portion 1020 include one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, collaboration application 1025 enables users to interact with other users through real-time dialog via text chat and/or voice chat and/or video chat and/or avatar-based VR chat. In some cases, collaboration application 1025 running on the device associated with each user displays the conversational prompt to the user. In some cases, collaboration application 1025 is stored in the memory (e.g., one of first memory portion 1010, second memory portion 1015, or third memory portion 1020) and is executed by one or more processors 1005.

According to some aspects, conversational observer agent 1030 is an AI-based agent that extracts conversational content from a sub-group, sends the content to a LLM to generate a summary, and shares the generated summary with each user on the collaboration server 1000. In some cases, conversational observer agent 1030 is stored in the memory (e.g., one of first memory portion 1010, second memory portion 1015, or third memory portion 1020) and is executed by one or more processors 1005.

According to some aspects, communication interface 1035 operates at a boundary between communicating entities (such as collaboration server 1000, one or more user devices, a cloud, and one or more databases) and channel 1045 and can record and process communications. In some cases, communication interface 1035 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1040 is controlled by an I/O controller to manage input and output signals for collaboration server 1000. In some cases, I/O interface 1040 manages peripherals not integrated into collaboration server 1000. In some cases, I/O interface 1040 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1040 or via hardware components controlled by the I/O controller.

Figure 11:
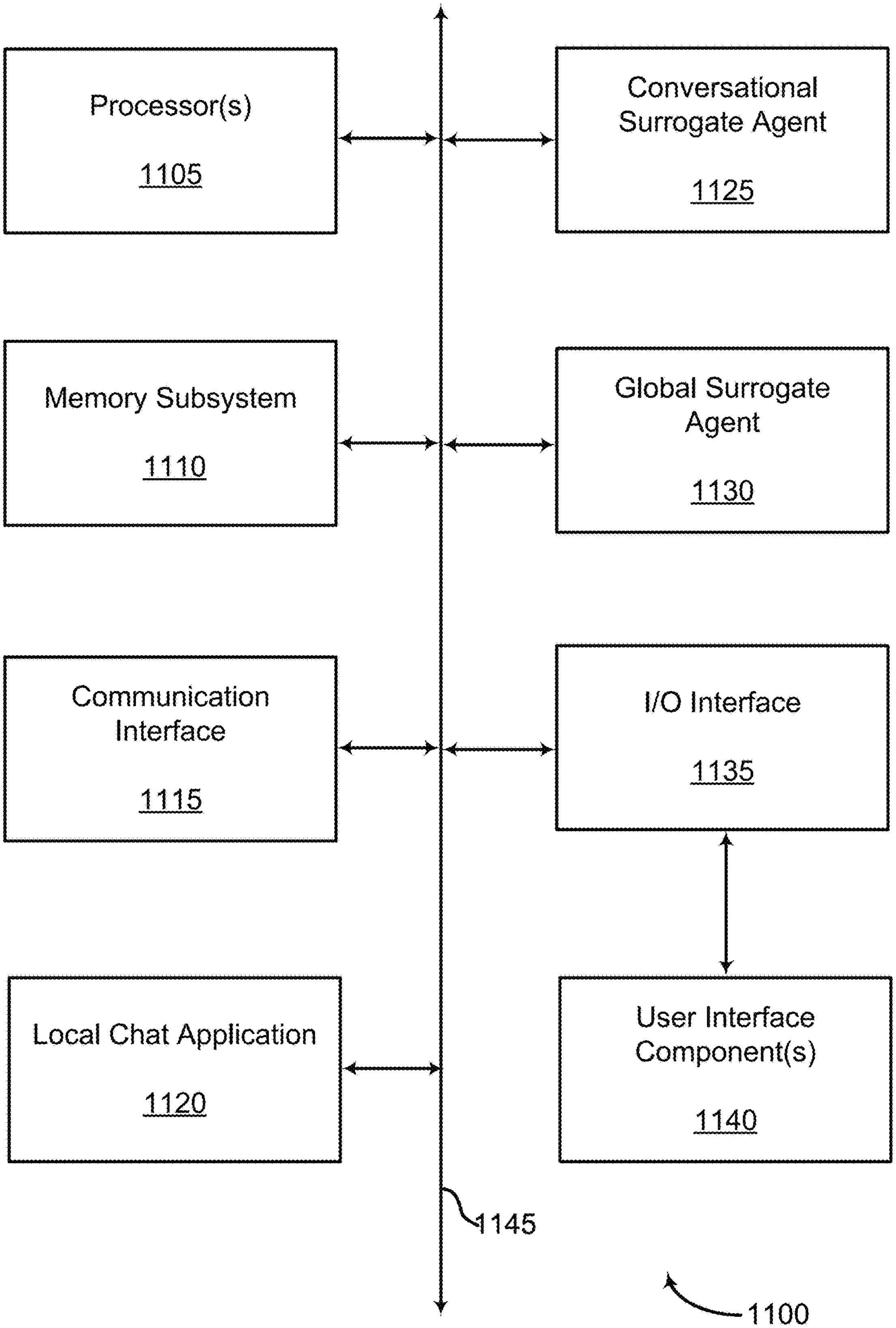
FIG. 11 shows an example of a computing device according to aspects of the present disclosure.

FIG. 11 shows an example of a computing device 1100 according to aspects of the present disclosure. In certain aspects, computing device 1100 includes processor(s) 1105, memory subsystem 1110, communication interface 1115, local chat application 1120, conversational surrogate agent 1125, global surrogate agent 1130, I/O interface 1135, user interface component 1140, and channel 1145.

In some aspects, computing device 1100 is an example of, or includes aspects of, the corresponding element described with reference to FIGS. 1, 2, 5, and 6. In some embodiments, computing device 1100 includes one or more processors 1105 that can execute instructions stored in memory subsystem 1110.

According to some aspects, computing device 1100 includes one or more processors 1105. Processor(s) 1105 is an example of, or includes aspects of, the corresponding element described with reference to FIG. 10.

According to some aspects, memory subsystem 1110 includes one or more memory devices. Memory subsystem 1110 is an example of, or includes aspects of, the memory and memory portions described with reference to FIGS. 1-2 and 10.

According to some aspects, communication interface 1115 operates at a boundary between communicating entities (such as computing device 1100, one or more user devices, a cloud, and one or more databases) and channel 1145 and can record and process communications. Communication interface 1115 is an example of, or includes aspects of, the corresponding element described with reference to FIG. 10.

According to some aspects, local chat application 1120 provides for a real-time conversation between the one user of a sub-group and the plurality of other members assigned to the same sub-group. Local chat application 1120 is an example of, or includes aspects of, the corresponding element described with reference to FIGS. 1 and 2. In some cases, local chat application 1120 is stored in the memory subsystem 1110 and is executed by the one or more processors 1105.

According to some aspects, conversational surrogate agent 1125 conversationally expresses a representation of the information contained in the summary from a different room. Conversational surrogate agent 1125 is an example of, or includes aspects of, the corresponding element described with reference to FIGS. 2-4. In some cases, conversational surrogate agent 1125 is stored in the memory subsystem 1110 and is executed by the one or more processors 1105.

According to some aspects, global surrogate agent 1130 selectively represents the views, arguments, and narratives that have been observed across the entire population. Global surrogate agent 1130 is an example of, or includes aspects of, the corresponding element described with reference to FIGS. 2-4. In some cases, global surrogate agent 1130 is stored in the memory subsystem 1110 and is executed by the one or more processors 1105.

According to some aspects, I/O interface 1135 is controlled by an I/O controller to manage input and output signals for computing device 1100. I/O interface 1130 is an example of, or includes aspects of, the corresponding element described with reference to FIG. 10.

According to some aspects, user interface component(s) 1140 enable a user to interact with computing device 1100. In some cases, user interface component(s) 1140 include an audio device, such as an external speaker system, an external display device such as a display screen, an input device (e.g., a remote control device interfaced with a user interface directly or through the I/O controller), or a combination thereof. In some cases, user interface component(s) 1135 include a GUI.

Figure 12:
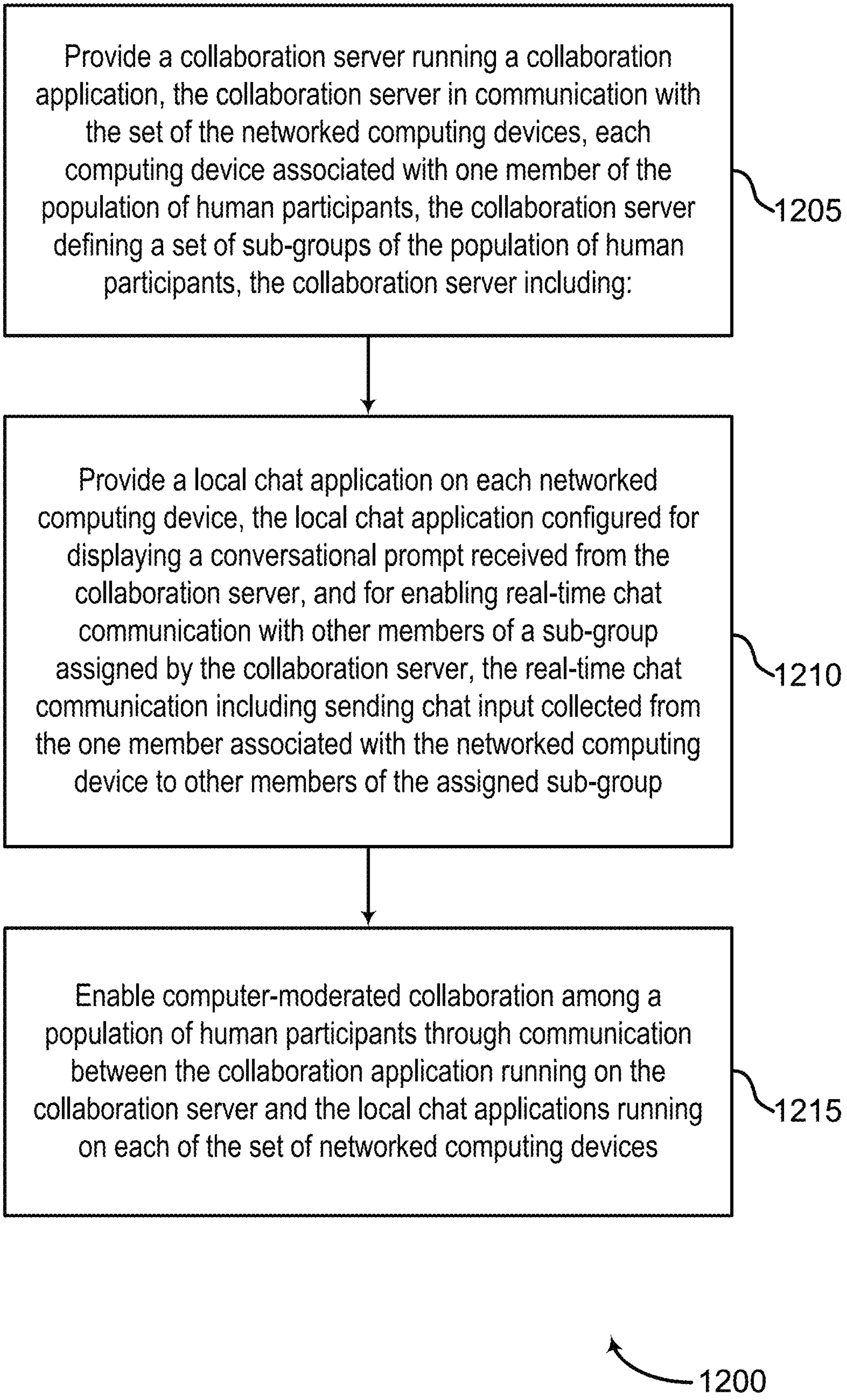
FIGS. 12 through 18 show examples of methods for computer mediated collaboration according to aspects of the present disclosure.

FIG. 12 shows an example of a method 1200 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system provides a collaboration server running a collaboration application, the collaboration server in communication with the set of the networked computing devices, each computing device associated with one member of the population of human participants, the collaboration server defining a set of sub-groups of the population of human participants, the collaboration server including: In some cases, the operations of this step refer to, or may be performed by, a collaboration server as described with reference to FIGS. 1, 2, and 10.

At operation 1210, the system provides a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device to other members of the assigned sub-group. In some cases, the operations of this step refer to, or may be performed by, a local chat application as described with reference to FIGS. 1, 2, and 11.

At operation 1215, the system enables computer-moderated collaboration among a population of human participants through communication between the collaboration application running on the collaboration server and the local chat applications running on each of the set of networked computing devices. For instance, at operation 1215 the system enables various steps through communication between the collaboration application running on the collaboration server and the local chat applications running on each of the set of networked computing devices (e.g., the enabled steps including one or more operations described with reference to methods 1300-1800). In some cases, the operations of this step refer to, or may be performed by, software components as described with reference to FIG. 2.

Figure 13:
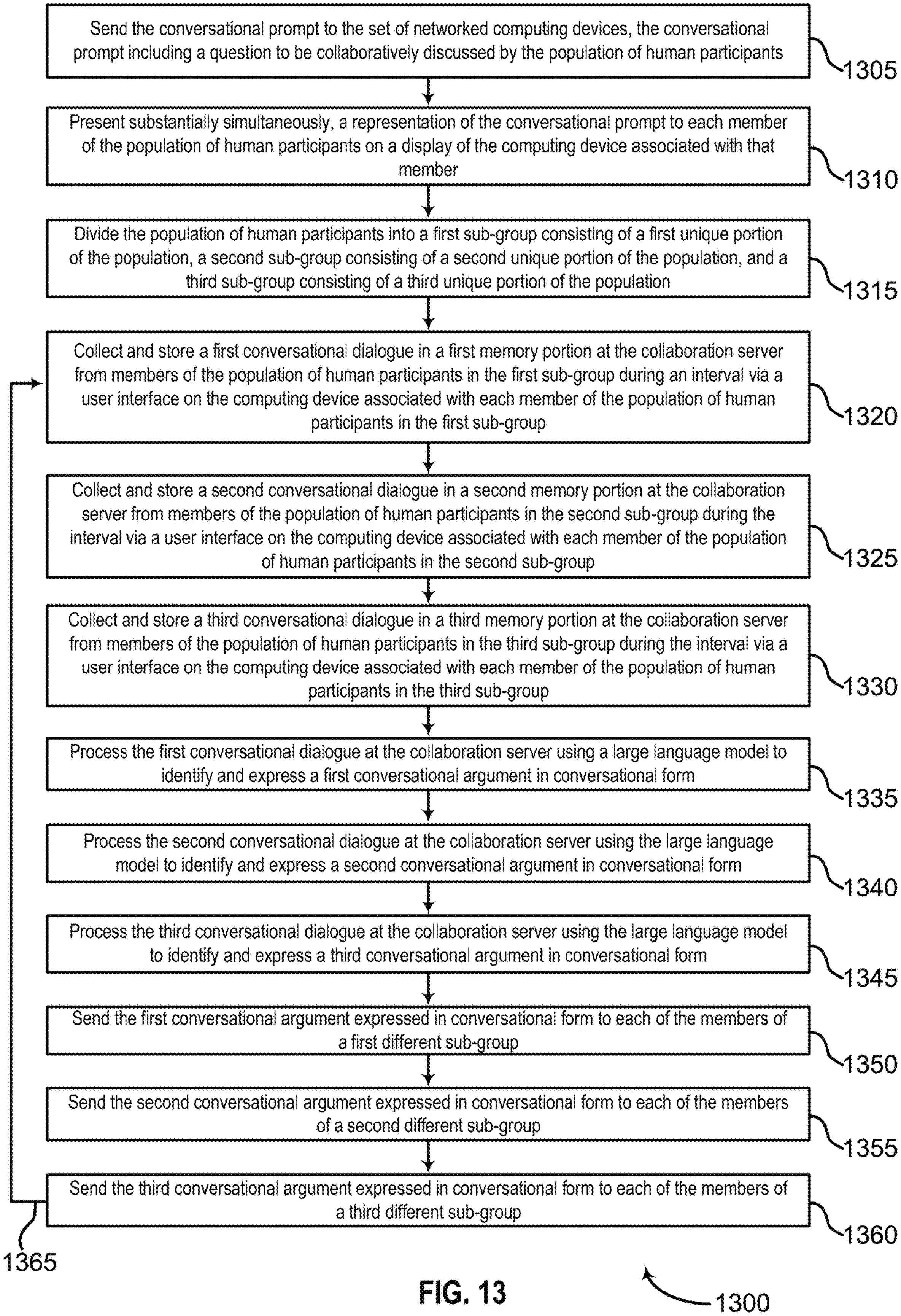

FIG. 13 shows an example of a series of operations for a method 1300 for computer mediated collaboration according to aspects of the present disclosure. Variations of the present example may include performing the series of operations in a different order than the order in which the series of operations is presented here. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305 (e.g., at step a), the system sends the conversational prompt to the set of networked computing devices, the conversational prompt including a question, issue or topic to be collaboratively discussed by the population of human participants. In some cases, the operations of this step refer to, or may be performed by, software components as described with reference to FIG. 2. In some cases, the conversational prompt could be entered into the system by a designated human moderator in advance or in real-time.

At operation 1310 (e.g., at step b), the system presents, substantially simultaneously, a representation of the conversational prompt to each member of the population of human participants on a display of the computing device associated with that member. In some cases, the operations of this step refer to, or may be performed by, software components as described with reference to FIG. 2. In some embodiments the prompt is displayed textually. In other embodiments, the prompt is expressed verbally by a conversational agent.

At operation 1315 (e.g., at step c), the system divides the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants. In some cases, the operations of this step refer to, or may be performed by, software components as described with reference to FIG. 2. In some examples, operation 1315 may be performed before operations 1305 and 1310. In some embodiments, the sub-groups are formed before some or all of the prior steps. In many embodiments, additional sub-groups (i.e., more than three) are formed following the same method.

At operation 1320 (e.g., at step d), the system collects and stores a first conversational dialogue in a first memory portion at the collaboration server from members of the population of human participants in the first sub-group during an interval via a user interface on the computing device associated with each member of the population of human participants in the first sub-group. In some cases, the operations of this step refer to, or may be performed by, software components as described with reference to FIG. 2.

At operation 1325 (e.g., at step e), the system collects and stores a second conversational dialogue in a second memory portion at the collaboration server from members of the population of human participants in the second sub-group during the interval via a user interface on the computing device associated with each member of the population of human participants in the second sub-group. In some cases, the operations of this step refer to, or may be performed by, software components as described with reference to FIG. 2.

At operation 1330 (e.g., at step f), the system collects and stores a third conversational dialogue in a third memory portion at the collaboration server from members of the population of human participants in the third sub-group during the interval via a user interface on the computing device associated with each member of the population of human participants in the third sub-group. In some cases, the operations of this step refer to, or may be performed by, software components as described with reference to FIG. 2.

For other embodiments, for example those in which more than three sub-groups are created, additional steps similar to 1320, 1325, and 1330 are performed on the conversational dialog associated with each of the additional sub-groups, collecting and storing dialog in additional memories.

At operation 1335 (e.g., at step g), the system processes the first conversational dialogue at the collaboration server using a large language model to identify and express a first conversational argument in conversational form, where the identifying of the first conversational argument includes identifying at least one assertion, viewpoint, position or claim in the first conversational dialogue supported by evidence or reasoning, expressed or implied. In some cases, the operations of this step refer to, or may be performed by, software components as described with reference to FIG. 2.

At operation 1340 (e.g., at step h), the system processes the second conversational dialogue at the collaboration server using the large language model to identify and express a second conversational argument in conversational form, where the identifying of the second conversational argument includes identifying at least one assertion, viewpoint, position or claim in the second conversational dialogue supported by evidence or reasoning, expressed or implied. In some cases, the operations of this step refer to, or may be performed by, software components as described with reference to FIG. 2.

At operation 1345 (e.g., at step i), the system processes the third conversational dialogue at the collaboration server using the large language model to identify and express a third conversational argument in conversational form, where the identifying of the third conversational argument includes identifying at least one assertion, viewpoint, position or claim in the third conversational dialogue supported by evidence or reasoning, expressed or implied. In some cases, the operations of this step refer to, or may be performed by, software components as described with reference to FIG. 2.

For other embodiments, for example those in which more than three sub-groups are created, additional steps similar to 1335, 1340, and 1345 are performed on the conversational dialog associated with each of the additional sub-groups.

At operation 1350 (e.g., at step j), the system sends the first conversational argument to be expressed in conversational form (via text or voice) to each of the members of a first different sub-group, where the first different sub-group is not the first sub-group. In some cases, the operations of this step refer to, or may be performed by, software components as described with reference to FIG. 2.

At operation 1355 (e.g., at step k), the system sends the second conversational argument to be expressed in conversational form (via text or voice) to each of the members of a second different sub-group, where the second different sub-group is not the second sub-group. In some cases, the operations of this step refer to, or may be performed by, software components as described with reference to FIG. 2.

At operation 1360 (e.g., at step 1), the system sends the third conversational argument to be expressed in conversational form (via text or voice) to each of the members of a third different sub-group, where the third different sub-group is not the third sub-group. In some cases, the operations of this step refer to, or may be performed by, software components as described with reference to FIG. 2.

For other embodiments, for example those in which more than three sub-groups are created, additional steps are performed that are similar to 1350, 1355, and 1360 in order to send additional conversational arguments from each of the additional sub-groups to be expressed in conversational form in other different sub-groups.

At operation 1365 (e.g., at step m), the system repeats operations 1320-1360 (e.g., steps (d) through (l)) at least one time. In some cases, the operations of this step refer to, or may be performed by, software components as described with reference to FIG. 2.

Figure 14:
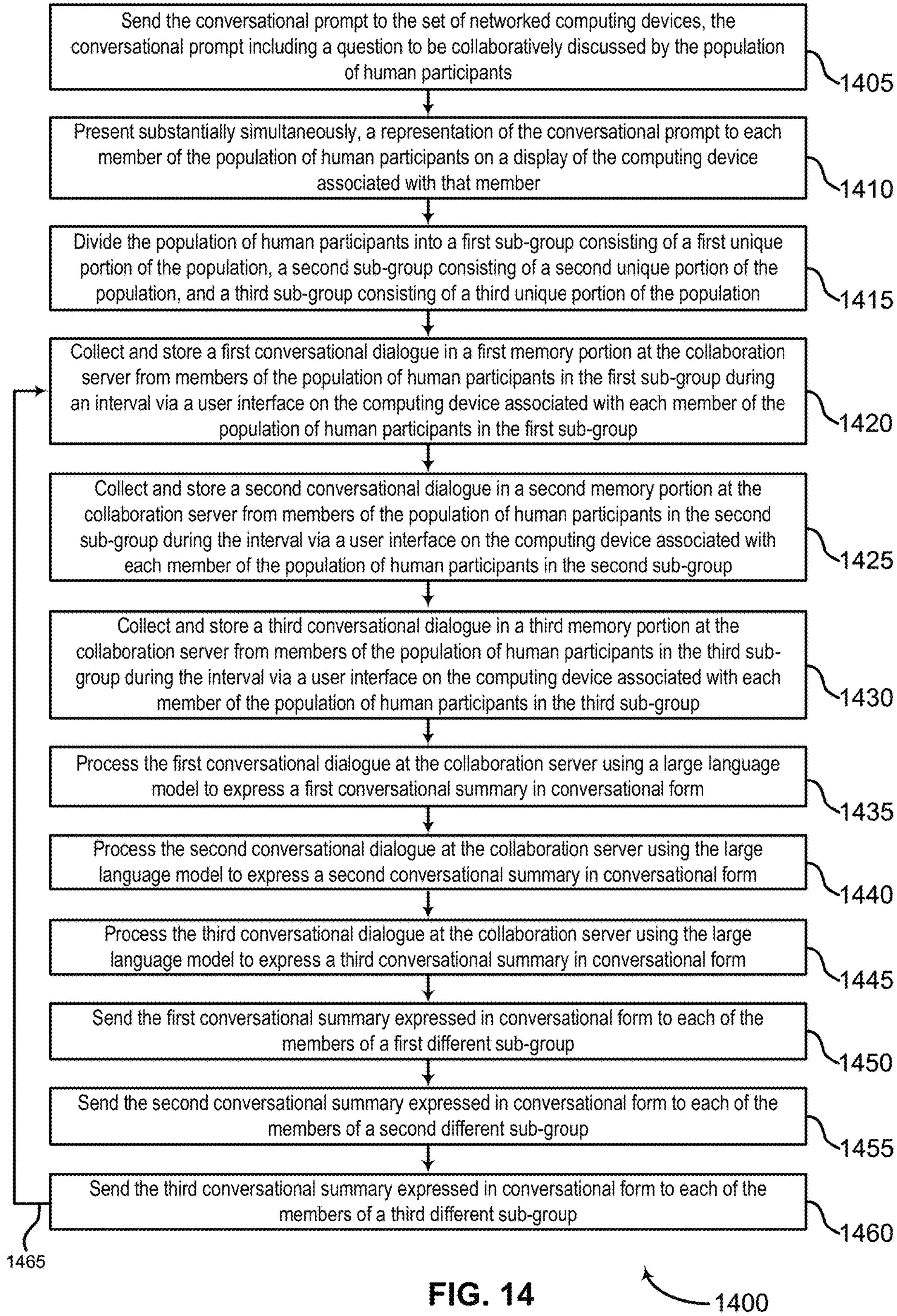

FIG. 14 shows an example of a method 1400 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405 (e.g., in step a), the system sends the conversational prompt to the set of networked computing devices, the conversational prompt including a question to be collaboratively discussed by the population of human participants. In some cases, the operations of this step refer to, or may be performed by, software components as described with reference to FIG. 2. In some cases, the conversational prompt could be entered into the system by a designated human moderator in advance or in real-time.

At operation 1410 (e.g., in step b), the system presents, substantially simultaneously, a representation of the conversational prompt to each member of the population of human participants on a display of the computing device associated with that member. In some cases, the operations of this step refer to, or may be performed by, software components as described with reference to FIG. 2. In some embodiments the prompt is displayed textually. In other embodiments, the prompt is expressed verbally by a conversational agent.

At operation 1415 (e.g., in step c), the system divides the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants, including dividing the population of human participants as a function of user initial responses to the conversational prompt. In some cases, the operations of this step refer to, or may be performed by, software components as described with reference to FIG. 2. In some embodiments, the sub-groups are formed before some or all of the prior steps. In many embodiments, additional sub-groups (i.e., more than three) are formed following the same method.

At operation 1420 (e.g., in step d), the system collects and stores a first conversational dialogue in a first memory portion at the collaboration server from members of the population of human participants in the first sub-group during an interval via a user interface on the computing device associated with each member of the population of human participants in the first sub-group. In some cases, the operations of this step refer to, or may be performed by, software components as described with reference to FIG. 2.

At operation 1425 (e.g., in step e), the system collects and stores a second conversational dialogue in a second memory portion at the collaboration server from members of the population of human participants in the second sub-group during the interval via a user interface on the computing device associated with each member of the population of human participants in the second sub-group. In some cases, the operations of this step refer to, or may be performed by, software components as described with reference to FIG. 2.

At operation 1430 (e.g., in step f), the system collects and stores a third conversational dialogue in a third memory portion at the collaboration server from members of the population of human participants in the third sub-group during the interval via a user interface on the computing device associated with each member of the population of human participants in the third sub-group. In some cases, the operations of this step refer to, or may be performed by, software components as described with reference to FIG. 2.

For other embodiments, for example, those in which more than three sub-groups are created, additional steps similar to 1420, 1425, and 1430 are performed on the conversational dialog associated with each of the additional sub-groups, collecting and storing dialog in additional memories.

At operation 1435 (e.g., in step g), the system processes the first conversational dialogue at the collaboration server using a large language model to express a first conversational summary in conversational form. In some cases, the operations of this step refer to, or may be performed by, software components as described with reference to FIG. 2.

At operation 1440 (e.g., in step h), the system processes the second conversational dialogue at the collaboration server using the large language model to express a second conversational summary in conversational form. In some cases, the operations of this step refer to, or may be performed by, software components as described with reference to FIG. 2.

At operation 1445 (e.g., in step i), the system processes the third conversational dialogue at the collaboration server using the large language model to express a third conversational summary in conversational form. In some cases, the operations of this step refer to, or may be performed by, software components as described with reference to FIG. 2.

For other embodiments, for example, those in which more than three sub-groups are created, additional steps similar to 1435, 1440, and 1445 are performed on the conversational dialog associated with each of the additional sub-groups.

At operation 1450 (e.g., in step j), the system sends the first conversational summary to be expressed in conversational form (via text or voice) to each of the members of a first different sub-group, where the first different sub-group is not the first sub-group. In some cases, the operations of this step refer to, or may be performed by, software components as described with reference to FIG. 2.

At operation 1455 (e.g., in step k), the system sends the second conversational summary to be expressed in conversational form (via text or voice) to each of the members of a second different sub-group, where the second different sub-group is not the second sub-group. In some cases, the operations of this step refer to, or may be performed by, software components as described with reference to FIG. 2.

At operation 1460 (e.g., in step 1), the system sends the third conversational summary to be expressed in conversational form (via text or voice) to each of the members of a third different sub-group, where the third different sub-group is not the third sub-group. In some cases, the operations of this step refer to, or may be performed by, software components as described with reference to FIG. 2.

For other embodiments, for example, those in which more than three sub-groups are created, additional steps are performed that are similar to 1450, 1455, and 1460 in order to send additional conversational summaries from each of the additional sub-groups to be expressed in conversational form in other different sub-groups.

At operation 1465 (e.g., in step m), the system repeats operations 1420-1460 (e.g., steps (d) through (l)) at least one time. In some cases, the operations of this step refer to, or may be performed by, software components as described with reference to FIG. 2.

Figure 15:
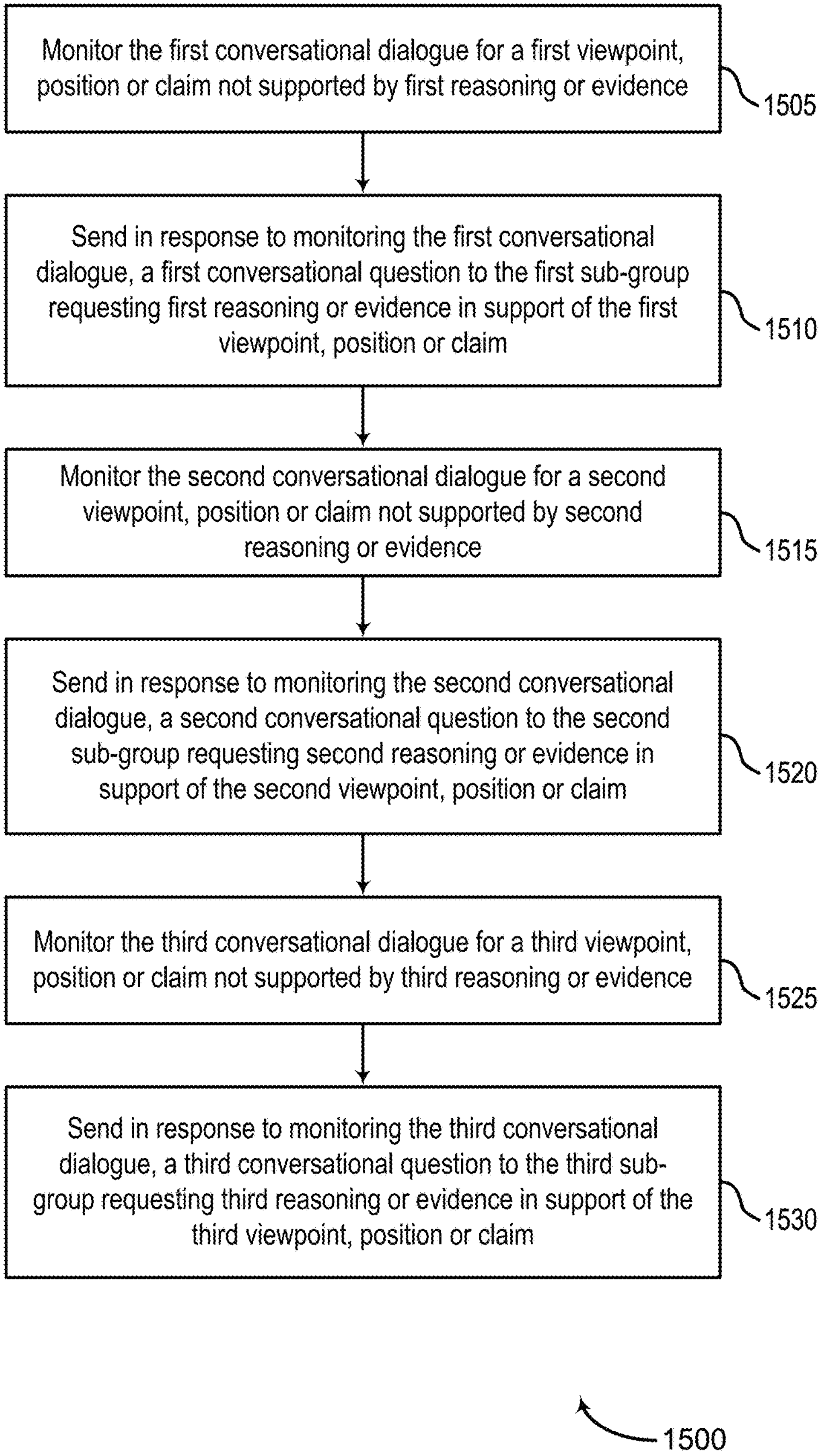

FIG. 15 shows an example of a method 1500 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505 (e.g., in step n), the system monitors the first conversational dialogue for a first assertion, viewpoint, position or claim not supported by first reasoning or evidence. In some cases, the operations of this step refer to, or may be performed by, software components as described with reference to FIG. 2.

At operation 1510 (e.g., in step o), the system sends, in response to monitoring the first conversational dialogue, a first conversational question to the first sub-group requesting first reasoning or evidence in support of the first assertion, viewpoint, position or claim. In some cases, the operations of this step refer to, or may be performed by, software components as described with reference to FIG. 2.

At operation 1515 (e.g., in step p), the system monitors the second conversational dialogue for a second assertion, viewpoint, position or claim not supported by second reasoning or evidence. In some cases, the operations of this step refer to, or may be performed by, software components as described with reference to FIG. 2.

At operation 1520 (e.g., in step q), the system sends in response to monitoring the second conversational dialogue, a second conversational question to the second sub-group requesting second reasoning or evidence in support of the second assertion, viewpoint, position or claim. In some cases, the operations of this step refer to, or may be performed by, software components as described with reference to FIG. 2.

At operation 1525 (e.g., in step r), the system monitors the third conversational dialogue for a third assertion, viewpoint, position or claim not supported by third reasoning or evidence. In some cases, the operations of this step refer to, or may be performed by, software components as described with reference to FIG. 2.

At operation 1530 (e.g., in step s), the system sends in response to monitoring the third conversational dialogue, a third conversational question to the third sub-group requesting third reasoning or evidence in support of the third assertion, viewpoint, position or claim. In some cases, the operations of this step refer to, or may be performed by, software components as described with reference to FIG. 2.

Figure 16:
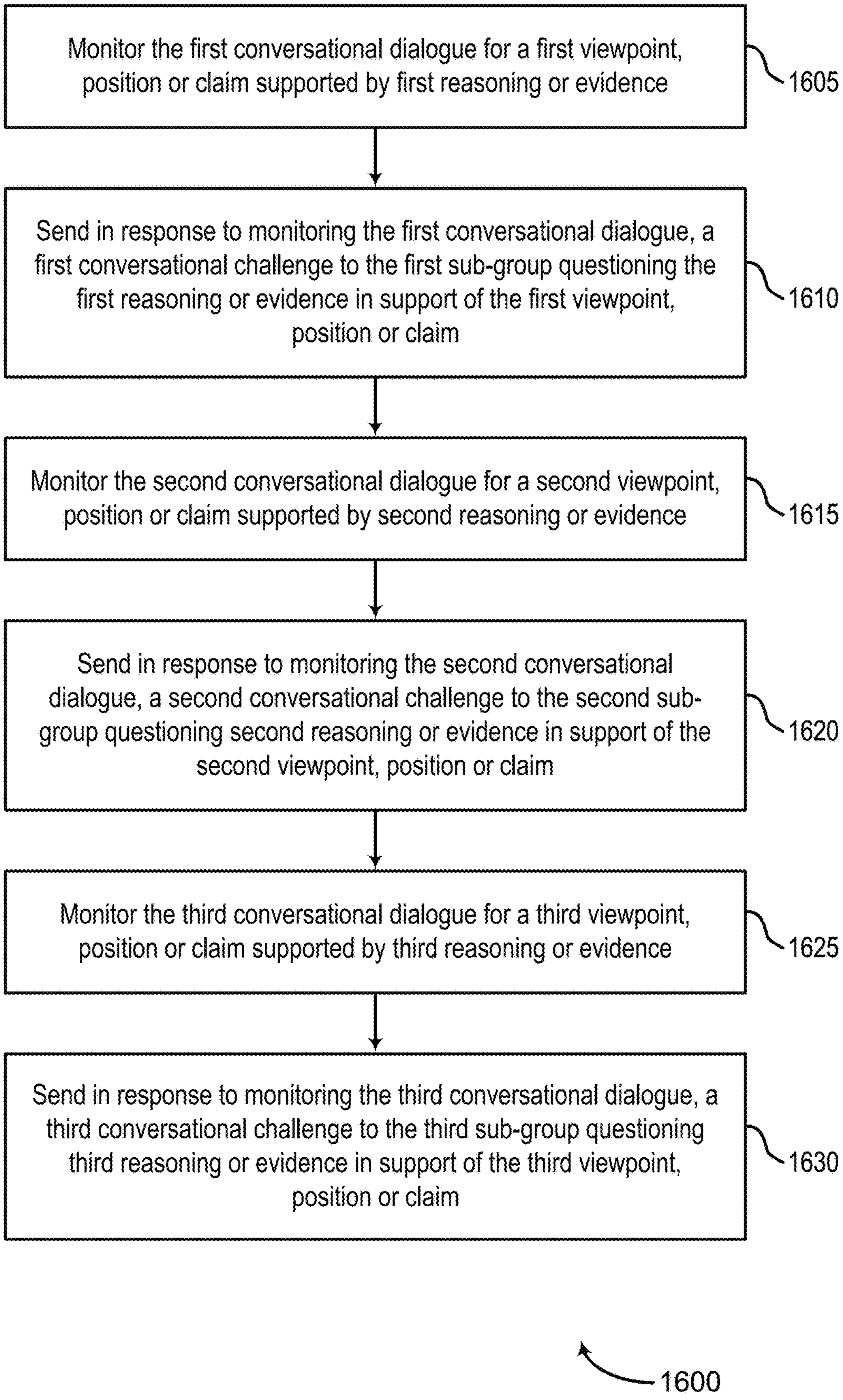

FIG. 16 shows an example of a method 1600 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605 (e.g., in step n), the system monitors the first conversational dialogue for a first assertion, viewpoint, position or claim supported by first reasoning or evidence. In some cases, the operations of this step refer to, or may be performed by, software components as described with reference to FIG. 2.

At operation 1610 (e.g., in step o), the system sends, in response to monitoring the first conversational dialogue, a first conversational challenge to the first sub-group questioning the first reasoning or evidence in support of the first assertion, viewpoint, position or claim. In some cases, the operations of this step refer to, or may be performed by, software components as described with reference to FIG. 2.

At operation 1615 (e.g., in step p), the system monitors the second conversational dialogue for a second assertion, viewpoint, position or claim supported by second reasoning or evidence. In some cases, the operations of this step refer to, or may be performed by, software components as described with reference to FIG. 2.

At operation 1620 (e.g., in step q), the system sends, in response to monitoring the second conversational dialogue, a second conversational challenge to the second sub-group questioning second reasoning or evidence in support of the second assertion, viewpoint, position or claim. In some cases, the operations of this step refer to, or may be performed by, software components as described with reference to FIG. 2.

At operation 1625 (e.g., in step r), the system monitors the third conversational dialogue for a third assertion, viewpoint, position or claim supported by third reasoning or evidence. In some cases, the operations of this step refer to, or may be performed by, software components as described with reference to FIG. 2.

At operation 1630 (e.g., in step s), the system sends, in response to monitoring the third conversational dialogue, a third conversational challenge to the third sub-group questioning third reasoning or evidence in support of the third assertion, viewpoint, position or claim. In some cases, the operations of this step refer to, or may be performed by, software components as described with reference to FIG. 2.

Figure 17:
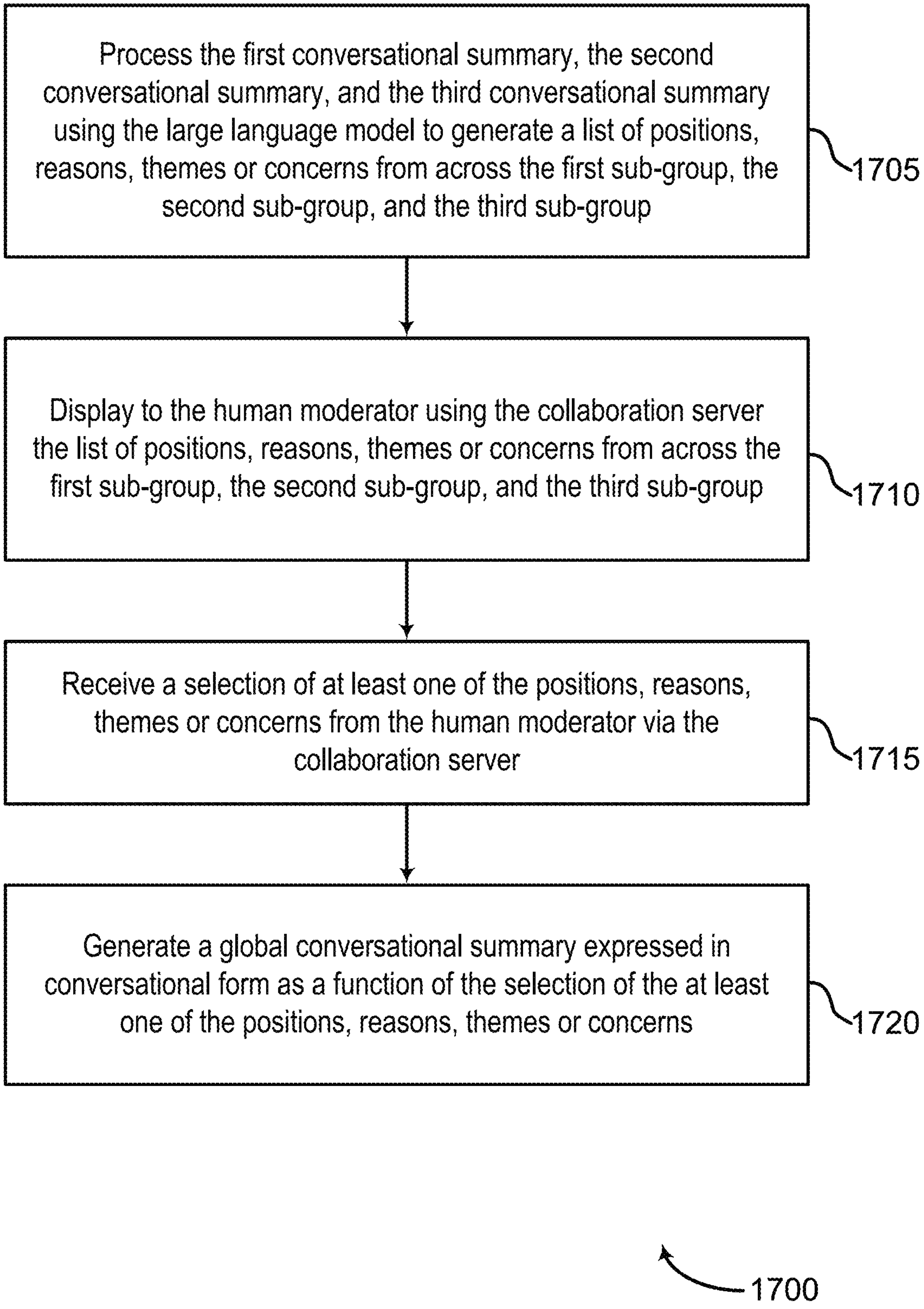

FIG. 17 shows an example of a method 1700 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705 (e.g., in step n), the system processes the first conversational summary, the second conversational summary, and the third conversational summary using the large language model to generate a list of assertions, positions, reasons, themes or concerns from across the first sub-group, the second sub-group, and the third sub-group. In some cases, the operations of this step refer to, or may be performed by, software components as described with reference to FIG. 2.

At operation 1710 (e.g., in step o), the system displays to the human moderator using the collaboration server the list of assertions, positions, reasons, themes or concerns from across the first sub-group, the second sub-group, and the third sub-group. In some cases, the operations of this step refer to, or may be performed by, software components as described with reference to FIG. 2.

At operation 1715 (e.g., in step p), the system receives a selection of at least one of the assertions, positions, reasons, themes or concerns from the human moderator via the collaboration server. In some cases, the operations of this step refer to, or may be performed by, software components as described with reference to FIG. 2.

At operation 1720 (e.g., in step q), the system generates a global conversational summary expressed in conversational form as a function of the selection of the at least one of the assertions, positions, reasons, themes or concerns. In some cases, the operations of this step refer to, or may be performed by, software components as described with reference to FIG. 2.

Figure 18:
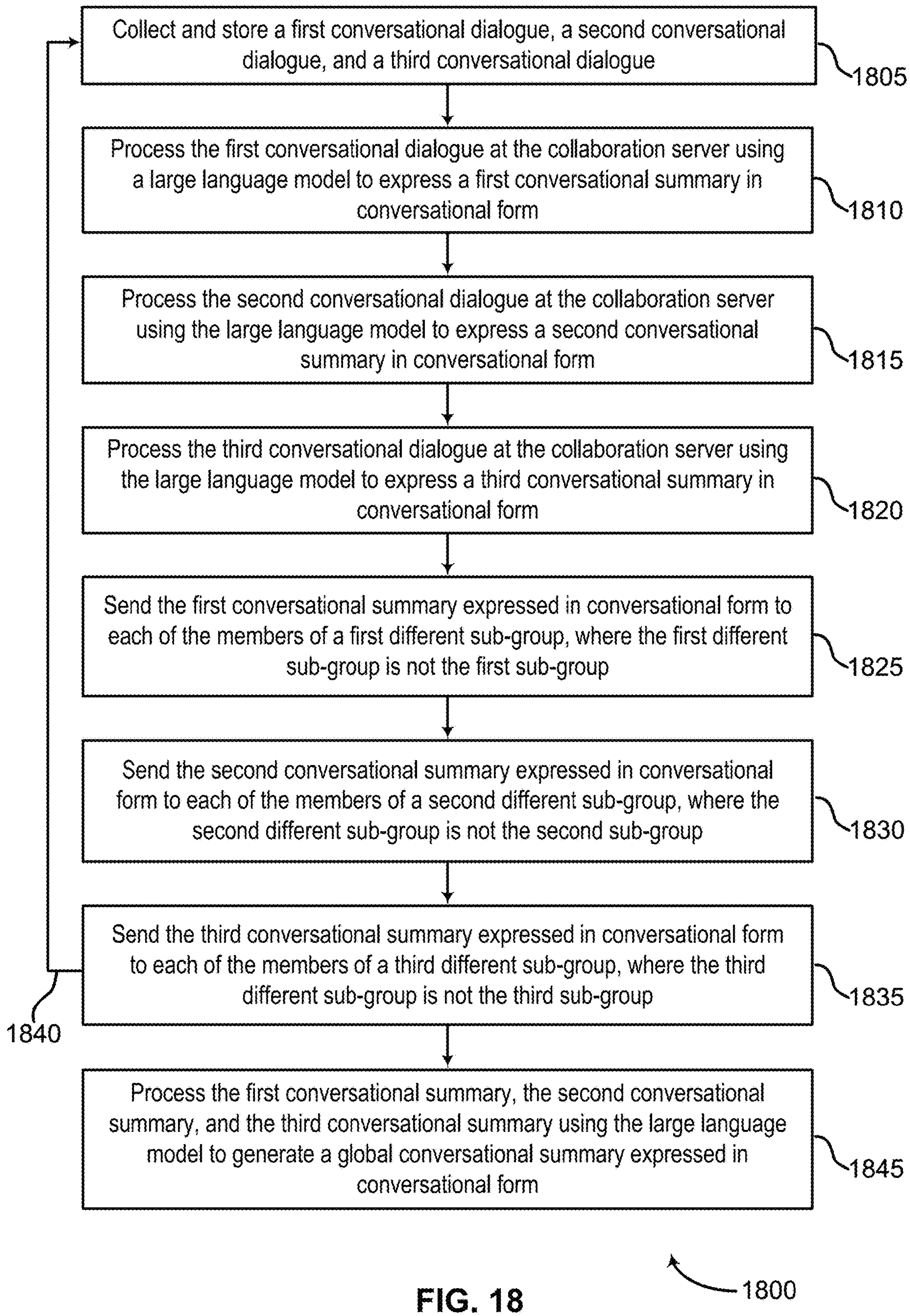

FIG. 18 shows an example of a method 1800 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1805 (e.g., in steps d-f), the system collects and stores a first conversational dialogue from a first sub-group, a second conversational dialogue from a second sub-group, and a third conversational dialogue from a third sub-group, said first, second, and third sub-groups not being the same sub-groups. In some cases, the operations of this step refer to, or may be performed by, software components as described with reference to FIG. 2.

At operation 1810 (e.g., in step g), the system processes the first conversational dialogue at the collaboration server using a large language model to generate a first conversational summary. In some cases, the operations of this step refer to, or may be performed by, software components as described with reference to FIG. 2.

At operation 1815 (e.g., in step h), the system processes the second conversational dialogue at the collaboration server using the large language model to generate a second conversational summary. In some cases, the operations of this step refer to, or may be performed by, software components as described with reference to FIG. 2.

At operation 1820 (e.g., in step i), the system processes the third conversational dialogue at the collaboration server using the large language model to generate a third conversational summary. In some cases, the operations of this step refer to, or may be performed by, software components as described with reference to FIG. 2.

At operation 1825 (e.g., in step j), the system sends the first conversational summary to each of the members of a first different sub-group and expresses it to each member in conversational form via text or voice, where the first different sub-group is not the first sub-group. In some cases, the operations of this step refer to, or may be performed by, software components as described with reference to FIG. 2.

At operation 1830 (e.g., in step k), the system sends the second conversational summary to each of the members of a second different sub-group and expresses it to each member in conversational form via text or voice, where the second different sub-group is not the second sub-group. In some cases, the operations of this step refer to, or may be performed by, software components as described with reference to FIG. 2.

At operation 1835 (e.g., in step 1), the system sends the third conversational summary to each of the members of a third different sub-group and expresses it to each member in conversational form via text or voice, where the third different sub-group is not the third sub-group. In some cases, the operations of this step refer to, or may be performed by, software components as described with reference to FIG. 2.

At operation 1840 (e.g., in step m), the system repeats operations 1805-1835 (e.g., steps (d) through (l)) at least one time. In some cases, the operations of this step refer to, or may be performed by, software components as described with reference to FIG. 2.

At operation 1845 (e.g., in step n), the system processes the first conversational summary, the second conversational summary, and the third conversational summary using the large language model to generate a global conversational summary. In some embodiments, the global conversational summary is represented, at least in part, in conversational form. In many embodiments the system sends the global conversational summary to a plurality of members of the full population of members and expresses it to each member in conversational form via text or voice. In some embodiments, the plurality of members is the full population of members. In many embodiments the expression in conversational form is in the first person. In some cases, the operations of this step refer to, or may be performed by, software components as described with reference to FIG. 2.

It should be noted that in some embodiments of the present invention, some participants my communicate by text chat while other participants communicate by voice chat and other participants communicate by video chat or VR chat. In other words, the methods described herein can enable a combined environment in which participants communicate in real-time conversations through multiple modalities of text, voice, video, or VR. For example, a participant can communicate by text as input while receiving voice, video, or VR messages from other members as output. In addition, a participant can communicate by text as input while receiving conversational summaries from surrogate agents as voice, video, or VR output.

In such embodiments, each networked computing device includes appropriate input and output elements, such as one or more screen displays, haptic devices, cameras, microphones, speakers, LIDAR sensors, and the like, as appropriate to voice, video, and virtual reality (VR) communications.

Accordingly (e.g., based on the techniques described with reference to FIGS. 1-11, the operations described with reference to FIGS. 12-18, etc.), the present disclosure includes the following aspects.

Methods, apparatuses, non-transitory computer readable medium, and systems for computer mediated collaboration for distributed conversations is described. One or more aspects of the methods, apparatuses, non-transitory computer readable medium, and systems include providing a collaboration server running a collaboration application, the collaboration server in communication with the plurality of the networked computing devices, each computing device associated with one member of the population of human participants, the collaboration server defining a plurality of sub-groups of the population of human participants, the collaboration server comprising: providing a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device to other members of the assigned sub-group; and enabling steps (e.g., steps or operations for computer mediated collaboration for distributed conversations) through communication between the collaboration application running on the collaboration server and the local chat applications running on each of the plurality of networked computing devices. The steps enabled through communication between the collaboration application and the local chat applications include: (a) sending the conversational prompt to the plurality of networked computing devices, the conversational prompt comprising a question, issue, or topic to be collaboratively discussed by the population of human participants, (b) presenting, substantially simultaneously, a representation of the conversational prompt to each member of the population of human participants on a display of the computing device associated with that member, (c) dividing the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants, (d) collecting and storing a first conversational dialogue in a first memory portion at the collaboration server from members of the population of human participants in the first sub-group during an interval via a user interface on the computing device associated with each member of the population of human participants in the first sub-group, (e) collecting and storing a second conversational dialogue in a second memory portion at the collaboration server from members of the population of human participants in the second sub-group during the interval via a user interface on the computing device associated with each member of the population of human participants in the second sub-group, (f) collecting and storing a third conversational dialogue in a third memory portion at the collaboration server from members of the population of human participants in the third sub-group during the interval via a user interface on the computing device associated with each member of the population of human participants in the third sub-group, (g) processing the first conversational dialogue at the collaboration server using a large language model to identify and express a first conversational argument in conversational form, wherein the identifying of the first conversational argument comprises identifying at least one viewpoint, position or claim in the first conversational dialogue supported by evidence or reasoning, (h) processing the second conversational dialogue at the collaboration server using the large language model to identify and express a second conversational argument in conversational form, wherein the identifying of the second conversational argument comprises identifying at least one viewpoint, position or claim in the second conversational dialogue supported by evidence or reasoning, (i) processing the third conversational dialogue at the collaboration server using the large language model to identify and express a third conversational argument in conversational form, wherein the identifying of the third conversational argument comprises identifying at least one viewpoint, position or claim in the third conversational dialogue supported by evidence or reasoning, (j) sending the first conversational argument expressed in conversational form to each of the members of a first different sub-group, wherein the first different sub-group is not the first sub-group, (k) sending the second conversational argument expressed in conversational form to each of the members of a second different sub-group, wherein the second different sub-group is not the second sub-group, (l) sending the third conversational argument expressed in conversational form to each of the members of a third different sub-group, wherein the third different sub-group is not the third sub-group, and (m) repeating steps (d) through (l) at least one time.

Some examples of the methods, apparatuses, non-transitory computer readable medium, and systems described herein further include sending, in step (j), the first conversational argument expressed in conversational form to each of the members of a first different sub-group expressed in first person as if the first conversational argument were coming from a member of the first different sub-group of the population of human participants. Some examples further include sending, in step (k), the second conversational argument expressed in conversational form to each of the members of a second different sub-group expressed in first person as if the second conversational argument were coming from a member of the second different sub-group of the population of human participants. Some examples further include sending, in step (l), the third conversational argument expressed in conversational form to each of the members of a third different sub-group expressed in first person as if the third conversational argument were coming from a member of the third different sub-group of the population of human participants.

Some examples of the methods, apparatuses, non-transitory computer readable medium, and systems described herein further include processing, in step (n), the first conversational argument, the second conversational argument, and the third conversational argument using the large language model to generate a global conversational argument expressed in conversational form.

Some examples of the methods, apparatuses, non-transitory computer readable medium, and systems described herein further include sending, in step (o), the global conversational argument expressed in conversational form to each of the members of the first sub-group, the second sub-group, and the third sub-group.

In some aspects, a final global conversational argument is generated by weighting more recent ones of the global conversational arguments more heavily than less recent ones of the global conversational arguments.

In some aspects, the first conversational dialogue, the second conversational dialogue and the third conversational dialogue each comprise a set of ordered chat messages comprising text.

In some aspects, the first conversational dialogue, the second conversational dialogue and the third conversational dialogue each further comprise a respective member identifier for the member of the population of human participants who entered each chat message.

In some aspects, the first conversational dialogue, the second conversational dialogue and the third conversational dialogue each further comprises a respective timestamp identifier for a time of day when each chat message is entered.

In some aspects, the processing the first conversational dialogue in step (g) further comprises determining a respective response target indicator for each chat message entered by the first sub-group, wherein the respective response target indicator provides an indication of a prior chat message to which each chat message is responding; the processing the second conversational dialogue in step (h) further comprises determining a respective response target indicator for each chat message entered by the second sub-group, wherein the respective response target indicator provides an indication of a prior chat message to which each chat message is responding; and the processing the third conversational dialogue in step (i) further comprises determining a respective response target indicator for each chat message entered by the third sub-group, wherein the respective response target indicator provides an indication of a prior chat message to which each chat message is responding.

In some aspects, the processing the first conversational dialogue in step (g) further comprises determining a respective sentiment indicator for each chat message entered by the first sub-group, wherein the respective sentiment indicator provides an indication of whether each chat message is in agreement or disagreement with prior chat messages; the processing the second conversational dialogue in step (h) further comprises determining a respective sentiment indicator for each chat message entered by the second sub-group, wherein the respective sentiment indicator provides an indication of whether each chat message is in agreement or disagreement with prior chat messages; and the processing the third conversational dialogue in step (i) further comprises determining a respective sentiment indicator for each chat message entered by the third sub-group, wherein the respective sentiment indicator provides an indication of whether each chat message is in agreement or disagreement with prior chat messages.

In some aspects, the processing the first conversational dialogue in step (g) further comprises determining a respective conviction indicator for each chat message entered by the first sub-group, wherein the respective conviction indicator provides an indication of conviction for each chat message; the processing the second conversational dialogue in step (h) further comprises determining a respective conviction indicator for each chat message entered by the second sub-group, wherein the respective conviction indicator provides an indication of conviction for each chat message; and the processing the third conversational dialogue in step (i) further comprises determining a respective conviction indicator for each chat message entered by the third sub-group, wherein the respective conviction indicator provides an indication of conviction each chat message is in the expressions of the chat message.

In some aspects, the first unique portion of the population (i.e., a first sub-group) consists of no more than ten members of the population of human participants, the second unique portion consists of no more than ten members of the population of human participants, and the third unique portion consists of no more than ten members of the population of human participants.

In some aspects, the first conversational dialogue comprises chat messages comprising voice (i.e., real-time verbal content expressed during a conversation by a user 145 and captured by a microphone associated with their computing device 135.)

In some aspects, the voice includes words spoken, and at least one spoken language component selected from the group of spoken language components consisting of tone, pitch, rhythm, volume and pauses. In some embodiments, the verbal content is converted into textual content (by well-known speech to text methods) prior to transmission to the collaboration server 145.)

In some aspects, the first conversational dialogue comprises chat messages comprising video (i.e., real-time verbal content expressed during a conversation by a user 145 and captured by a camera and microphone associated with their computing device 135).

In some aspects, the video includes words spoken, and at least one language component selected from the group of language components consisting of tone, pitch, rhythm, volume, pauses, facial expressions, gestures, and body language.

In some aspects, the each of the repeating steps occurs after expiration of an interval.

In some aspects, the interval is a time interval.

In some aspects, the interval is a number of conversational interactions.

In some aspects, the first different sub-group is the second sub-group, and the second different sub-group is the third sub-group.

In some aspects, the first different sub-group is a first randomly selected sub-group, the second different sub-group is a second randomly selected sub-group, and the third different sub-group is a third randomly selected sub-group, wherein the first randomly selected sub-group, the second randomly selected sub-group and the third randomly selected sub-group are not the same sub-group.

Some examples of the methods, apparatuses, non-transitory computer readable medium, and systems described herein further include processing, in step (g), the first conversational dialogue at the collaboration server using the large language model to identify and express the first conversational argument in conversational form, wherein the identifying of the first conversational argument comprises identifying at least one viewpoint, position or claim in the first conversational dialogue supported by evidence or reasoning, wherein the first conversational argument is not identified in the first different sub-group. Some examples further include processing, in step (h), the second conversational dialogue at the collaboration server using the large language model to identify and express the second conversational argument in conversational form, wherein the identifying of the second conversational argument comprises identifying at least one viewpoint, position or claim in the second conversational dialogue supported by evidence or reasoning, wherein the second conversational argument is not identified in the second different sub-group. Some examples further include processing, in step (i), the third conversational dialogue at the collaboration server using the large language model to identify and express the third conversational argument in conversational form, wherein the identifying of the third conversational argument comprises identifying at least one viewpoint, position or claim in the third conversational dialogue supported by evidence or reasoning, wherein the third conversational argument is not identified in the third different sub-group.

One or more aspects of the methods, apparatuses, non-transitory computer readable medium, and systems described herein include sending, in step (a), the conversational prompt to the plurality of networked computing devices, the conversational prompt comprising a question, issue, or topic to be collaboratively discussed by the population of human participants; presenting, in step (b), substantially simultaneously, a representation of the conversational prompt to each member of the population of human participants on a display of the computing device associated with that member; dividing, in step (c), the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants, comprising dividing the population of human participants as a function of user initial responses to the to the conversational prompt; collecting and storing, in step (d), a first conversational dialogue in a first memory portion at the collaboration server from members of the population of human participants in the first sub-group during an interval via a user interface on the computing device associated with each member of the population of human participants in the first sub-group; collecting and storing, in step (e), a second conversational dialogue in a second memory portion at the collaboration server from members of the population of human participants in the second sub-group during the interval via a user interface on the computing device associated with each member of the population of human participants in the second sub-group; collecting and storing, in step (f), a third conversational dialogue in a third memory portion at the collaboration server from members of the population of human participants in the third sub-group during the interval via a user interface on the computing device associated with each member of the population of human participants in the third sub-group; processing, in step (g), the first conversational dialogue at the collaboration server using a large language model to express a first conversational summary in conversational form; processing, in step (h), the second conversational dialogue at the collaboration server using the large language model to express a second conversational summary in conversational form; processing, in step (i), the third conversational dialogue at the collaboration server using the large language model to express a third conversational summary in conversational form; sending, in step (j), the first conversational summary expressed in conversational form to each of the members of a first different sub-group, wherein the first different sub-group is not the first sub-group; sending, in step (k), the second conversational summary expressed in conversational form to each of the members of a second different sub-group, wherein the second different sub-group is not the second sub-group; sending, in step (l), the third conversational summary expressed in conversational form to each of the members of a third different sub-group, wherein the third different sub-group is not the third sub-group; and repeating, in step (m), steps (d) through (l) at least one time.

Some examples of the methods, apparatuses, non-transitory computer readable medium, and systems described herein further include sending, in step (j), the first conversational summary expressed in conversational form to each of the members of a first different sub-group expressed in first person as if the first conversational summary were coming from an additional member (simulated) of the first different sub-group of the population of human participants. Some examples further include sending, in step (k), the second conversational summary expressed in conversational form to each of the members of a second different sub-group expressed in first person as if the as if the second conversational summary were coming from an additional member (simulated) of the second different sub-group of the population of human participants. Some examples further include sending, in step (l), the third conversational summary expressed in conversational form to each of the members of a third different sub-group expressed in first person as if the third conversational summary were coming from an additional member (simulated) of the third different sub-group of the population of human participants.

Some examples of the methods, apparatuses, non-transitory computer readable medium, and systems described herein further include processing, in step (n), the first conversational summary, the second conversational summary, and the third conversational summary using the large language model to generate a global conversational summary expressed in conversational form.

Some examples of the methods, apparatuses, non-transitory computer readable medium, and systems described herein further include sending, in step (o), the global conversational summary expressed in conversational form to each of the members of the first sub-group, the second sub-group, and the third sub-group.

In some aspects, a final global conversational summary is generated by weighting more recent ones of the global conversational summaries more heavily than less recent ones of the global conversational summaries.

In some aspects, the dividing the population of human participants, in step (c), comprises: assessing the initial responses to determine the most popular user perspectives the dividing the population to distribute the most popular user perspectives amongst the first sub-group the second sub-group and the third sub-group.

Some examples of the methods, apparatuses, non-transitory computer readable medium, and systems described herein further include presenting, substantially simultaneously, in step (b), a representation of the conversational prompt to each member of the population of human participants on a display of the computing device associated with that member, wherein the presenting further comprises providing a set of alternatives, options or controls for initially responding to the conversational prompt.

In some aspects, the dividing the population of human participants, in step (c), comprises: assessing the initial responses to determine the most popular user perspectives the dividing the population to group users having the first most popular user perspective together in the first sub-group, users having the second most popular user perspective together in the second sub-group, and users having the third most popular user perspective together in the third sub-group.

One or more aspects of the methods, apparatuses, non-transitory computer readable medium, and systems described herein include monitoring, in step (n), the first conversational dialogue for a first viewpoint, position or claim not supported by first reasoning or evidence; sending, in step (o), in response to monitoring the first conversational dialogue, a first conversational question to the first sub-group requesting first reasoning or evidence in support of the first viewpoint, position or claim; monitoring, in step (p), the second conversational dialogue for a second viewpoint, position or claim not supported by second reasoning or evidence; sending, in step (q), in response to monitoring the second conversational dialogue, a second conversational question to the second sub-group requesting second reasoning or evidence in support of the second viewpoint, position or claim; monitoring, in step (r), the third conversational dialogue for a third viewpoint, position or claim not supported by third reasoning or evidence; and sending, in step (s), in response to monitoring the third conversational dialogue, a third conversational question to the third sub-group requesting third reasoning or evidence in support of the third viewpoint, position or claim.

One or more aspects of the methods, apparatuses, non-transitory computer readable medium, and systems described herein include monitoring, in step (n), the first conversational dialogue for a first viewpoint, position or claim supported by first reasoning or evidence; sending, in step (o), in response to monitoring the first conversational dialogue, a first conversational challenge to the first sub-group questioning the first reasoning or evidence in support of the first viewpoint, position or claim; monitoring, in step (p), the second conversational dialogue for a second viewpoint, position or claim supported by second reasoning or evidence; sending, in step (q), in response to monitoring the second conversational dialogue, a second conversational challenge to the second sub-group questioning second reasoning or evidence in support of the second viewpoint, position or claim; monitoring, in step (r), the third conversational dialogue for a third viewpoint, position or claim supported by third reasoning or evidence; and sending, in step (s), in response to monitoring the third conversational dialogue, a third conversational challenge to the third sub-group questioning third reasoning or evidence in support of the third viewpoint, position or claim.

Some examples of the methods, apparatuses, non-transitory computer readable medium, and systems described herein further include sending, in step (o), the first conversational challenge to the first sub-group questioning the first reasoning or evidence in support of the first viewpoint, position, or claim, wherein the questioning the first reasoning or evidence includes a viewpoint, position, or claim collected from the second different sub-group or the third different sub-group.

One or more aspects of the methods, apparatuses, non-transitory computer readable medium, and systems described herein include processing, in step (n), the first conversational summary, the second conversational summary, and the third conversational summary using the large language model to generate a list of positions, reasons, themes or concerns from across the first sub-group, the second sub-group, and the third sub-group; displaying, in step (o), to the human moderator using the collaboration server the list of positions, reasons, themes or concerns from across the first sub-group, the second sub-group, and the third sub-group; receiving, in step (p), a selection of at least one of the positions, reasons, themes or concerns from the human moderator via the collaboration server; and generating, in step (q), a global conversational summary expressed in conversational form as a function of the selection of the at least one of the positions, reasons, themes or concerns.

In some aspects, the providing the local moderation application on at least one networked computing device, the local moderation application configured to allow the human moderator to observe the first conversational dialogue, the second conversational dialogue, and the third conversational dialogue.

In some aspects, the providing the local moderation application on at least one networked computing device, the local moderation application configured to allow the human moderator to selectively and collectively send communications to members of the first sub-group, send communications to members of the second sub-group, and send communications to members of the third sub-group.

Some examples of the methods, apparatuses, non-transitory computer readable medium, and systems described herein further include sending, in step (r), the global conversational summary expressed in conversational form to each of the members of the first sub-group, the second sub-group, and the third sub-group.

One or more aspects of the methods, apparatuses, non-transitory computer readable medium, and systems described herein include processing, in step (g), the first conversational dialogue at the collaboration server using a large language model to express a first conversational summary in conversational form; processing, in step (h), the second conversational dialogue at the collaboration server using the large language model to express a second conversational summary in conversational form; processing, in step (i), the third conversational dialogue at the collaboration server using the large language model to express a third conversational summary in conversational form; sending, in step (j), the first conversational summary expressed in conversational form to each of the members of a first different sub-group, wherein the first different sub-group is not the first sub-group; sending, in step (k), the second conversational summary expressed in conversational form to each of the members of a second different sub-group, wherein the second different sub-group is not the second sub-group; sending, in step (l), the third conversational summary expressed in conversational form to each of the members of a third different sub-group, wherein the third different sub-group is not the third sub-group; repeating, in step (m), steps (d) through (l) at least one time; and processing, in step (n), the first conversational summary, the second conversational summary, and the third conversational summary using the large language model to generate a global conversational summary expressed in conversational form.

Some examples of the methods, apparatuses, non-transitory computer readable medium, and systems described herein further include processing, in step (n), the first conversational summary, the second conversational summary, and the third conversational summary using the large language model to generate a first global conversational summary expressed in conversational form, wherein the first global conversational summary is tailored to the first sub-group, generate a second global conversational summary, wherein the second global conversational summary is tailored to the second sub-group, and generate a third global conversational summary, wherein the third global conversational summary is tailored to the third sub-group. Some examples further include sending, in step (o), the first global conversational summary expressed in conversational form to each of the members of the first sub-group, send the second global conversational summary expressed in conversational from to the each of the members of the second sub-group, and send the third global conversational summary expressed in conversational from to each of the members of the third sub-group.

Some examples of the methods, apparatuses, non-transitory computer readable medium, and systems described herein further include processing, in step (n), the first conversational summary, the second conversational summary, and the third conversational summary using the large language model to generate a first global conversational summary expressed in conversational form, wherein the first global conversational summary is tailored to the first sub-group by including a viewpoint, position, or claim not expressed in the first sub-group, generate a second global conversational summary, wherein the second global conversational summary is tailored to the second sub-group by including a viewpoint, position, or claim not expressed in the second sub-group, and generate a third global conversational summary, wherein the third global conversational summary is tailored to the third sub-group by including a viewpoint, position, or claim not expressed in the third sub-group.

Some examples of the methods, apparatuses, non-transitory computer readable medium, and systems described herein further include processing, in step (n), the first conversational summary, the second conversational summary, and the third conversational summary using the large language model to generate a first global conversational summary expressed in conversational form, wherein the first global conversational summary is tailored to the first sub-group by including a viewpoint, position, or claim not expressed in the first sub-group, wherein the viewpoint, position, or claim not expressed in the first sub-group is collected from the first different subgroup, wherein the second global conversational summary is tailored to the second sub-group by including a viewpoint, position, or claim not expressed in the second sub-group, wherein the viewpoint, position, or claim not expressed in the second sub-group is collected from the second different subgroup, wherein the third global conversational summary is tailored to the third sub-group by including a viewpoint, position, or claim not expressed in the third sub-group, wherein the viewpoint, position, or claim not expressed in the third sub-group is collected from the third different subgroup.

One or more aspects of the methods, apparatuses, non-transitory computer readable medium, and systems described herein include sending, in step (a), the conversational prompt to the plurality of networked computing devices, the conversational prompt comprising a question, issue, or topic to be collaboratively discussed by the population of human participants; presenting, in step (b), substantially simultaneously, a representation of the conversational prompt to each member of the population of human participants on a display of the computing device associated with that member; dividing, in step (c), the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants; collecting and storing, in step (d), a first conversational dialogue in a first memory portion at the collaboration server from members of the population of human participants in the first sub-group during an interval via a user interface on the computing device associated with each member of the population of human participants in the first sub-group, wherein the first conversational dialogue comprises chat messages comprising a first segment of video including at least one member of the first sub-group; collecting and storing, in step (e), a second conversational dialogue in a second memory portion at the collaboration server from members of the population of human participants in the second sub-group during the interval via a user interface on the computing device associated with each member of the population of human participants in the second sub-group, wherein the first conversational dialogue comprises chat messages comprising a second segment of video including at least one member of the second sub-group; collecting and storing, in step (f), a third conversational dialogue in a third memory portion at the collaboration server from members of the population of human participants in the third sub-group during the interval via a user interface on the computing device associated with each member of the population of human participants in the third sub-group, wherein the first conversational dialogue comprises chat messages comprising a second segment of video including at least one member of the third sub-group; processing, in step (g), the first conversational dialogue at the collaboration server using a large language model to express a first conversational summary in conversational form; processing, in step (h), the second conversational dialogue at the collaboration server using the large language model to express a second conversational summary in conversational form; processing, in step (i), the third conversational dialogue at the collaboration server using the large language model to express a third conversational summary in conversational form; sending, in step (j), the first conversational summary expressed in conversational form to each of the members of a first different sub-group, wherein the first different sub-group is not the first sub-group; sending, in step (k), the second conversational summary expressed in conversational form to each of the members of a second different sub-group, wherein the second different sub-group is not the second sub-group; sending, in step (l), the third conversational summary expressed in conversational form to each of the members of a third different sub-group, wherein the third different sub-group is not the third sub-group; and repeating, in step (m), steps (d) through (l) at least one time.

Some examples of the methods, apparatuses, non-transitory computer readable medium, and systems described herein further include sending, in step (j), the first conversational summary expressed in conversational form to each of the members of a first different sub-group expressed in first person as if the first conversational summary were coming from an additional member (simulated) of the first different sub-group of the population of human participants. Some examples further include sending, in step (k), the second conversational summary expressed in conversational form to each of the members of a second different sub-group expressed in first person as if the as if the second conversational summary were coming from an additional member (simulated) of the second different sub-group of the population of human participants. Some examples further include sending, in step (l), the third conversational summary expressed in conversational form to each of the members of a third different sub-group expressed in first person as if the third conversational summary were coming from an additional member (simulated) of the third different sub-group of the population of human participants.

Some examples of the methods, apparatuses, non-transitory computer readable medium, and systems described herein further include sending, in step (j), the first conversational summary expressed in conversational form to each of the members of a first different sub-group expressed in first person as if the first conversational summary were coming from an additional member (simulated) of the first different sub-group of the population of human participants, including sending the first conversational summary in a first video segment comprising a graphical character representation expressing the first conversational summary through movement and voice. Some examples further include sending, in step (k), the second conversational summary expressed in conversational form to each of the members of a second different sub-group expressed in first person as if the as if the second conversational summary were coming from an additional member (simulated) of the second different sub-group of the population of human participants, including sending the second conversational summary in a second video segment comprising a graphical character representation expressing the second conversational summary through movement and voice. Some examples further include sending, in step (l), the third conversational summary expressed in conversational form to each of the members of a third different sub-group expressed in first person as if the third conversational summary were coming from an additional member (simulated) of the third different sub-group of the population of human participants, including sending the second conversational summary in a second video segment comprising a graphical character representation expressing the second conversational summary through movement and voice.

Some examples of the methods, apparatuses, non-transitory computer readable medium, and systems described herein further include sending, in step (j), the first conversational summary expressed in conversational form to each of the members of a first additional different sub-group. Some examples further include sending, in step (k), the second conversational summary expressed in conversational form to each of the members of a second additional different sub-group. Some examples further include sending, in step (l), the third conversational summary expressed in conversational form to each of the members of a third additional different sub-group.

Some examples of the methods, apparatuses, non-transitory computer readable medium, and systems described herein further include processing, in step (g), the first conversational dialogue at the collaboration server using a large language model to express a first conversational summary in conversational form, wherein the first conversational summary includes a first graphical representation of a first artificial agent. Some examples further include processing, in step (h), the second conversational dialogue at the collaboration server using the large language model to express a second conversational summary in conversational form, wherein the second conversational summary includes a second graphical representation of a second artificial agent. Some examples further include processing, in step (i), the third conversational dialogue at the collaboration server using the large language model to express a third conversational summary in conversational form, wherein the third conversational summary includes a third graphical representation of a third artificial agent.

Real-Time Interaction Using Collective Superintelligence

Embodiments of the present disclosure may enable one or more individual users to hold a real-time conversation. In some cases, the users may be referred to as interviewers that may hold a real-time conversation (i.e., interview) via text, voice, video, or VR chat with a personified collective intelligence. For example, the personified collective intelligence may comprise a large number of human participants referred to as CI members. One or more embodiments of the present disclosure may enable very large populations of human participants (e.g., thousands or tens of thousands) to contribute in real-time, potentially enabling conversations with a collective superintelligence (CSI) that significantly enhances the intellectual capabilities of individual participants.

As described herein, the personified collective intelligence agent (PCI agent or PCI) refers to an AI-powered conversational agent that responds conversationally to one or more dialog-based inquiries from the interviewer. In some cases, the conversational response of the PCI agent may be based on aggregated dialog-based input collected from a plurality of human participants in response to the participants being presented with a representation of the one or more dialog-based inquiries.

According to an embodiment, the PCI may be an AI-powered avatar with a visual facial representation in 2D or 3D that may be animated in real-time. In some examples, the PCI may output real-time dialog as computer-generated voice, complete with facial expressions and vocal inflections, where the dialog of the PCI may be driven (e.g., at least in part) by the output of a large language model.

In some cases, the PCI may be configured to respond to one or more inquiries from one or more interviewers via text, voice, video, or VR chat. For example, the PCI response may be generated based on the chat-based, voice-based, video-based, or Virtual Reality-based input collected from a plurality of real-time members in response to the participants being presented with a text, voice, video, or VR representation of the one or more inquiries.

As described herein, an interviewer may refer to one or more human participants that may be connected to the system via a one-to-many chat application. As described herein, CI Member(s) may refer to a plurality of human participants. For example, the CI members may refer to a group of 50, 500, or 5000 participants who are each connected to the system via a many-to-one chat application.

In some cases, a central server (herein referred to as a Collective Intelligence Server) may be configured to enable real-time interactions among human participants. In some examples, the human participants may include two different types of participants (i.e., interviewers and collective intelligence members). In some cases, each of the interviewers and the collective intelligence members may download the same Chat Application and may select among the one-to-many functionality or the many-to-one functionality based on the type of user the participant may log in as (e.g., an interviewer or a CI Member).

According to an embodiment, the Collective Intelligence Server may work in combination with the one-to-many chat applications running on the local computing devices of the interviewer(s) and the many-to-one chat applications running on the local computing devices of the plurality of CI Members.

Figure 19:
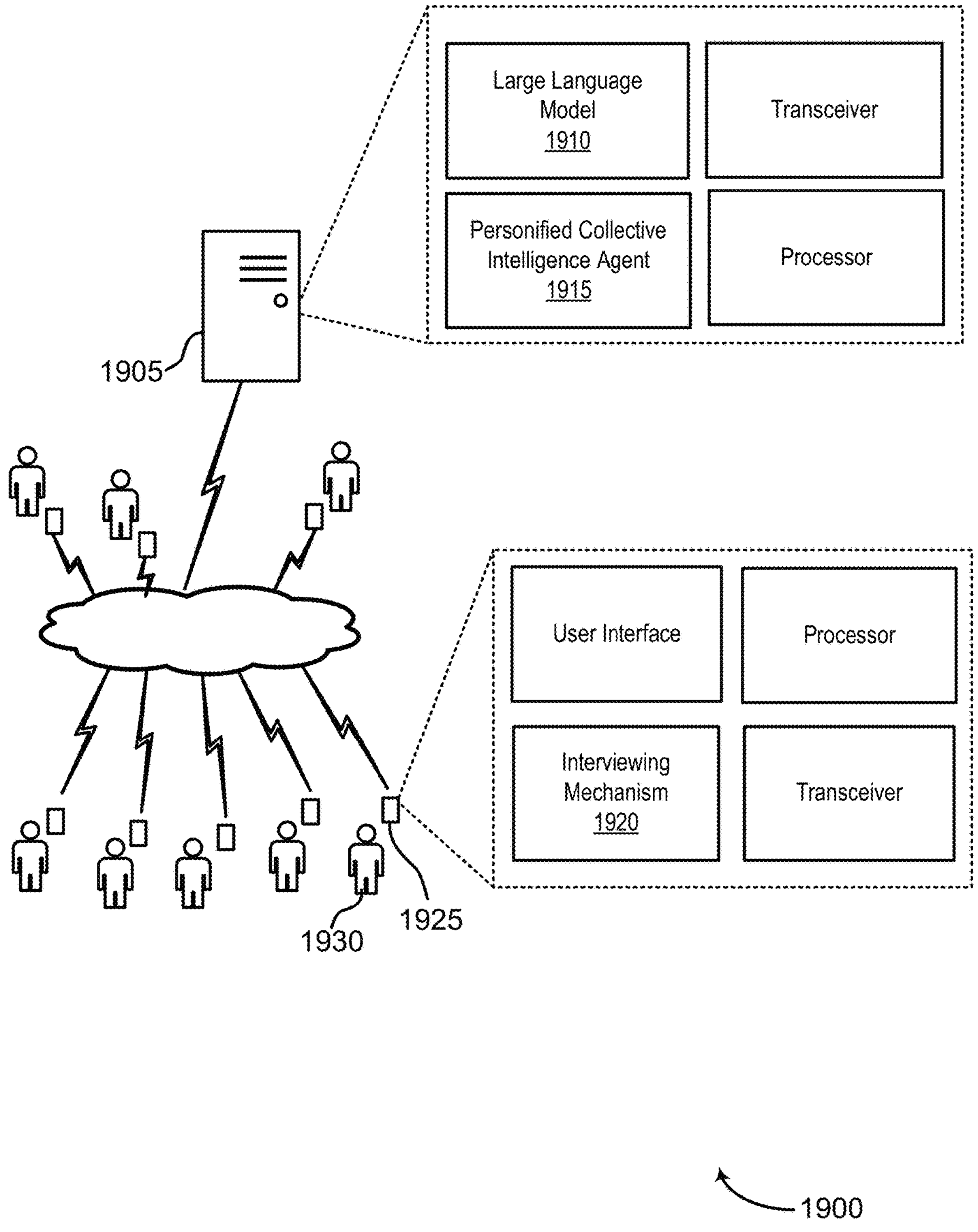
FIG. 19 shows an example of system for enabling real-time conversational interaction with an embodied large-scale personified collective intelligence according to aspects of the present disclosure.

FIG. 19 shows an example of system 1900 for enabling real-time conversational interaction with an embodied large-scale personified collective intelligence according to aspects of the present disclosure. System 1900 is an example of, or includes aspects of, the corresponding element described with reference to FIGS. 20 and 21.

In one aspect, system 1900 includes collective intelligence server 1905, large language model 1910, personified collective intelligence agent 1915, interviewing mechanism 1920, computing device 1925, and participants 1930 (e.g., which may be users in the system 1900 via their respective computing devices 1925).

According to some aspects, collective intelligence server 1905 is configured to receive inquiries from an interviewer and route a representation of the inquiries to a plurality of human participants 1930. In some aspects, the collective intelligence server 1905 is further configured to send a representation of the collective intelligence response to at least a computing device 1925 used by the interviewer such that the collective intelligence response is locally displayed to the interviewer as text chat, audio chat, video chat, or VR chat via a one-to-many chat application on the computing device 1925 used by the interviewer. In some aspects, the collective intelligence server 1905 is further configured to perform real-time language translation.

According to some aspects, collective intelligence server 1905 receives inquiries from an interviewer at a collective intelligence server 1905 and routes a representation of the inquiries to a set of human participants 1930. In some examples, collective intelligence server 1905 transmits the collective intelligence response from the collective intelligence server 1905 to a computing device 1925 used by the interviewer. In some aspects, the representation of the inquiries is routed to the set of human participants 1930 in real-time. In some aspects, the collective intelligence server 1905 is further configured to send a representation of the collective intelligence response to at least a computing device 1925 used by the interviewer such that the representation of the collective intelligence response is locally displayed to the interviewer as text chat, audio chat, video chat, or VR chat via a one-to-many chat application on the computing device 1925 used by the interviewer.

In some examples, collective intelligence server 1905 transmits the collective intelligence response from the collective intelligence server 1905 to the computing devices 1925 associated with at least a portion of the set of human participants 1930. In some aspects, the collective intelligence server 1905 may include large language model 1910, personified collective intelligence agent 1915, a transceiver, and one or more processor(s). Collective intelligence server 1905 is an example of, or includes aspects of, the corresponding element described with reference to FIG. 21.

According to some aspects, large language model 1910 is configured to receive, analyze, and aggregate the plurality of responses to determine a collective intelligence response. In some aspects, large language model 1910 is further configured to identify a most popular response or responses among the plurality of responses within a text file comprising the plurality of responses and to report the most popular response or top few responses in conversational form. In some aspects, large language model 1910 is further configured to report a most popular response or prescribed top few responses in first-person conversational form. In some aspects, large language model 1910 is further configured to add a conversational preamble to the collective intelligence response to give context for the personified collective intelligence agent 1915. Large language model 1910 is an example of, or includes aspects of, the corresponding element described with reference to FIGS. 1, 2, 3, 4, 6, 7 and 21.

According to some aspects, local chat application 1920 comprises a mechanism for enabling participants (e.g., participants 1930) to take turns having the role of the interviewer, where the participants have a shared experience of participating as part of a real-time personified collective intelligence that can answer questions posed to it in a coherent, conversational, first-person manner, and also get a chance to ask questions to the personified collective intelligence agent 1915. In some examples, local chat application 1920 comprises a right to ask a question may be dependent at least in part on whether that user provides responses to a prior question, thereby incentivizing users to provide thoughtful answers that are likely to represent the real-time personified collective intelligence of the set of human participants 1930. In some examples, local chat application 1920 comprises only users who provided responses in a prescribed top percentage of popular responses to the prior question are given credits that can be redeemed to ask a question or are considered in a lottery for asking a question.

According to some aspects, one or more processor(s) may be configured to execute a set of codes to control functional elements a device (e.g., of a collective intelligence server 1905 and/or computing devices 1925) to perform one or more operations described herein. According to some aspects, a transceiver may be configured to transmit (or send) and/or receive (or obtain) signals (e.g., to facilitate communications and exchange of information between collective intelligence server 1905 and computing devices 1925). In some aspects, collective intelligence server 1905 and computing devices 1925 may communicate via a network or cloud.

One or more aspects of the apparatus include a plurality of networked computing devices 1925 associated with members of a population of participants 1930, and networked via a computer network and a collective intelligence server 1905 (e.g., central server as described in FIGS. 1-2) in communication with the plurality of networked computing devices 1925, the central server 1905 dividing the population into a plurality of groups and enabling a computing device 1925 to provide a user interface for the participants 1930 to perform real-time conversational interaction.

In some aspects, a computing device 1925 may include an local chat application 1920, a user interface, a processor, and a transceiver, among other components. Computing device 1925 is an example of, or includes aspects of, the corresponding element described with reference to FIGS. 1, 2, 20, and 21. In some aspects, a participant 1930 (e.g., or corresponding users in the system 1900) is an example of, or includes aspects of, the corresponding element described with reference to FIGS. 1-6, 8, 9, 20, and 21.

According to some aspects, user interface enables a user (e.g., a participant 1930) to interact with computing device 1925. In some examples, user interface may include an audio device, an external display device, an input device, or a combination thereof. According to some aspects, a transceiver is configured to transmit (or send) and receive signals for a computing device 1925. According to some aspects, one or more processor(s) may be configured to execute a set of codes to control functional elements of the computing device 1925.

According to some aspects, personified collective intelligence agent 1915 is configured to receive and express the collective intelligence response in a first-person conversational form. In some aspects, the personified collective intelligence agent 1915 is an AI-powered conversational agent that responds conversationally to one or more dialog-based inquiries based on aggregated dialog-based input collected from the set of human participants 1930. In some aspects, the personified collective intelligence agent 1915 is configured to provide its conversational response in first person, thereby taking on a personified identity of a collective intelligence. In some aspects, the personified collective intelligence agent 1915 is assigned a name and responds conversationally to inquiries in first-person voice of an entity with that name.

In some aspects, the personified collective intelligence agent 1915 is an AI-powered avatar with a visual facial representation in 2D or 3D that is animated in real-time and outputs real-time dialog as computer-generated voice, complete with facial expressions and vocal inflections. In some aspects, the personified collective intelligence agent 1915 is further configured to display its collective intelligence response to the set of human participants 1930, enabling them to see and hear each collective intelligence response as it emerges during the conversation. In some aspects, the display of the collective intelligence response to the set of human participants 1930 provides conversational context for follow-up questions from the interviewer that refer to a prior conversational response from the personified collective intelligence agent 1915. In some aspects, the interviewer is enabled to hold a real-time conversation with the personified collective intelligence agent 1915, asking questions and then following up with additional questions, as the personified collective intelligence agent 1915 responds in real-time.

According to some aspects, personified collective intelligence agent 1915 receives and expresses the collective intelligence response in a first-person conversational form using a personified collective intelligence agent 1915 on the computing device 1925 used by the interviewer. In some aspects, the personified collective intelligence agent 1915 is an AI-powered conversational agent that responds conversationally to the inquiries. In some aspects, the personified collective intelligence agent 1915 provides its conversational response in first person, thereby taking on a personified identity of a collective intelligence.

In some aspects, the personified collective intelligence agent 1915 is an AI-powered avatar with a visual facial representation in 2D or 3D that is animated in real-time and outputs real-time dialog as computer-generated voice.

In some examples, personified collective intelligence agent 1915 receives and expresses the collective intelligence response in a first person conversational form using a personified collective intelligence agent 1915 on computing devices 1925 used by at least a portion of the set of human participants 1930. Personified collective intelligence agent 1915 is an example of, or includes aspects of, the corresponding element described with reference to FIGS. 20 and 21.

According to an embodiment, the Personified Collective Intelligence agent 1915 may be an AI-powered avatar with a visual facial representation in 2D or 3D that may be animated in real-time. In some examples, the PCI may output real-time dialog as computer-generated voice, complete with facial expressions and vocal inflections, where the dialog of the PCI may be driven (e.g., at least in part) by the output of a large language model. In some cases, the PCI may be configured to respond to one or more inquiries from one or more interviewers via text, voice, video, or VR chat. For example, the PCI response may be generated based on the chat-based, voice-based, video-based, or Virtual Reality-based input collected from a plurality of real-time members in response to the participants 1930 being presented with a text, voice, video, or VR representation of the one or more inquiries.

In some cases, an interviewer refers to one or more human participants 1930 that may enter and send one or more inquiries to the system via a one-to-many chat application. In some cases, CI Member(s) may refer to a plurality of human participants 1930 that may be configured to provide a response to the received inquiries from the interviewer. For example, the CI members may refer to a group of 50, 500, or 5000 participants 1930 who are each connected to the system 1900 via a many-to-one chat application. In some cases, the one-to-many chat application and the many-to-one chat application may refer to the same software which may be configured to support one-to-many or many-to-one functionality. For example, the software may be configured based on user identity, i.e., based on the user logging in as an interviewer or as a participant (e.g., referred to herein as a collective intelligence member (CI Member)).

In some cases, the response sent from each many-to-one chat application may be entered in text form and may be sent to the collective intelligence server in text form. Additionally or alternatively, the response may be entered as recorded voice and/or video and may be sent to the collective intelligence application as recorded voice and/or video. Additionally or alternatively, the response may be captured as recorded voice and/or video, may be converted to text via a voice-to-text converter module, and then may be sent to the collective intelligence server in a text representation. In some examples, the response may be in the form of a VR representations that may include physical gestural information captured by camera and/or motion sensor devices on the user's hands, body, or head.

In many embodiments, the plurality of participants 1930 are organized in local subgroups for local deliberation of a provided question or topic, each subgroup containing a surrogate agent that observes the local deliberation and passes insights to surrogate agents within one or more other subgroups. In such embodiments, the receiving surrogate agents express the insights conversationally within those subgroups, thereby weaving the population together into a unified deliberation. This unique architecture, as described in detail with respect to FIG. 1 through FIG. 17, enables efficient deliberation and amplified collective intelligence among the population 1930 and can offer significant intelligence benefits over simply collecting and processing individual responses from participants without local groupwise deliberation."

Figure 20:
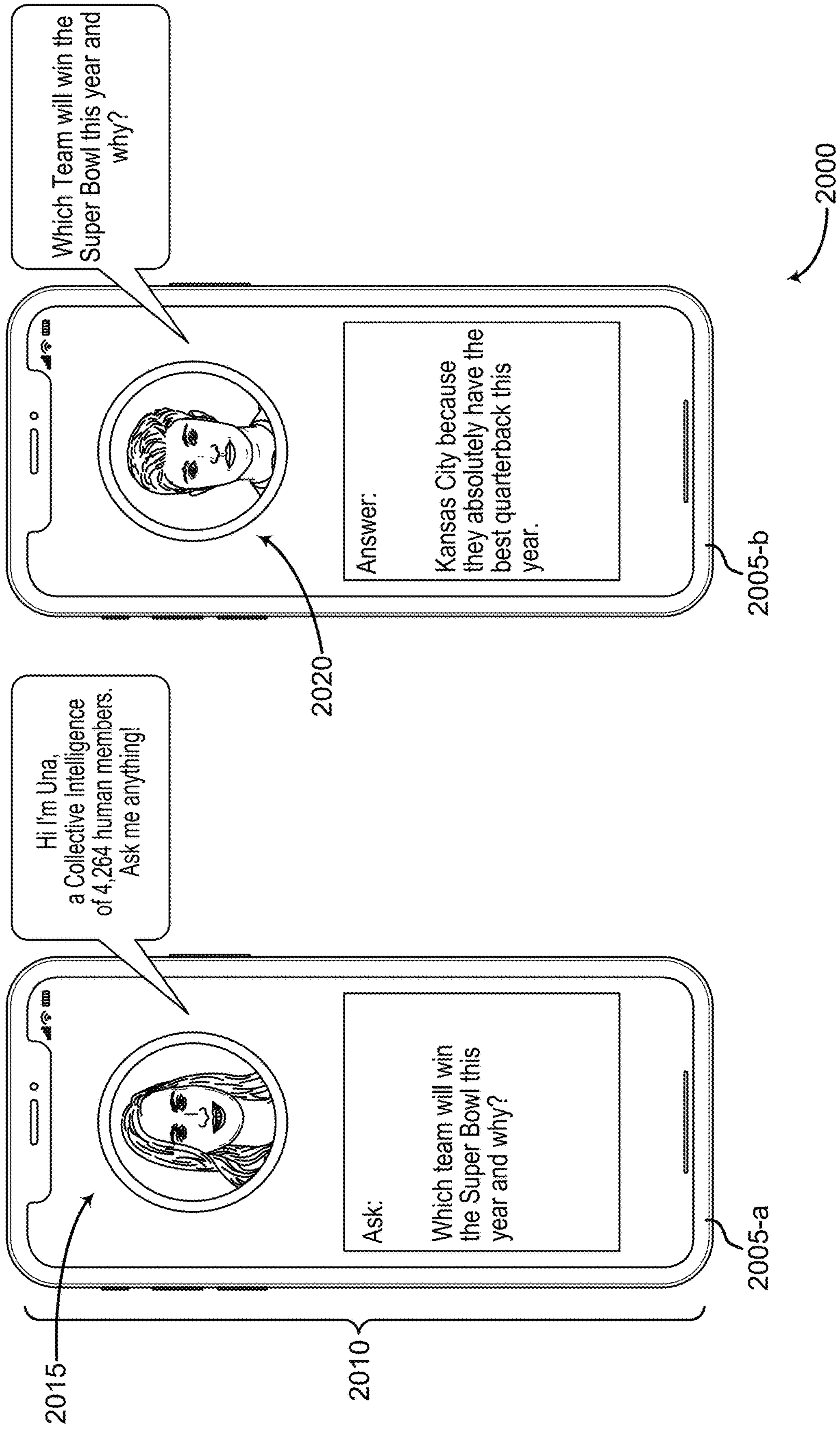
FIG. 20 shows an example of a system according to aspects of the present disclosure.

FIG. 20 shows an example of a system 2000 according to aspects of the present disclosure.

System 2000 is an example of, or includes aspects of, the corresponding element described with reference to FIGS. 19 and 21. In one aspect, system 2000 includes computing device (e.g., 2005-*a* or 2005-*b*) and user (e.g., a plurality of users). Computing device (i.e., 2005-*a* or 2005-*b*) is an example of, or includes aspects of, the corresponding element described with reference to FIGS. 1, 2, 19, and 21. User is an example of, or includes aspects of, the corresponding element described with reference to FIGS. 1-6, 8, 9, 19, and 21.

In one aspect, computing device 2005-*a* includes user interface 2010 and personified collective intelligence (PCI) agent 2015. In one aspect, computing device 2005-*b* includes user interface (e.g., such as user interface 2010) and interviewing likeness or agent 2020. User interface 2010 is an example of, or includes aspects of, the corresponding element described with reference to FIGS. 1-6, 8, 9, and 21. Personified collective intelligence agent 2015 is an example of, or includes aspects of, the corresponding element described with reference to FIGS. 19 and 21. Interviewing agent 2020 is an example of, or includes aspects of, the corresponding element described with reference to FIGS. 19 and 21.

FIG. 20 shows a user interface of Local Chat Application 1920, including a representation of a personified collective intelligence agent 2015 and an input area (we need number on ASK box) by which the user can communicate with the PCI agent through text or voice. This user interface enables the user of computing device 2005-*a* to communicate conversationally with a collective intelligence that is created computationally by connecting the plurality of users 1930 into a real-time system as described with respect to FIGS. 1 to 19. The user communicates with this real-time collective intelligence by either entering text into box??? or speaking voice into a microphone of computing device 2005-*a*. For example, the user may enter one or more inquiries into computer 2005-*a* as text or voice. Said one or more inquiries are sent by computer 2005-*a* via Local Chat Application 1920 to Collective Intelligence Server 1905. When the user is communicating by voice, the communication will be spoken, converted to text using a speak to text module, and will be sent to the Collective Intelligence Server 1905 to initiate conversation with or respond to conversation from the PCI agent 2015.

In some cases, the one or more inquiries may be sent in a conversational form to the collective intelligence server (e.g., collective intelligence server described with reference to FIG. 20). In some cases, the collective intelligence server may receive and process the inquiry and route a representation of said inquiries to a plurality of human participants (e.g., for display via a many-to-one chat application). In some cases, the many-to-one chat application (e.g. on computing device 2005-*b*) may provide for each CI Member (e.g., user 2020) to enter a response (e.g., in a conversational form) in replay to one or more received inquiries. In some cases the plurality of participants 1930 are organized in local subgroups for local deliberation of the inquiry, each subgroup containing a surrogate agent that observes the local deliberation and passes insights to surrogate agents within one or more other subgroups thereby facilitating a collective answer as described with respect to FIGS. 1 to 18.

According to an example, the inquiries may be received (e.g., and originate) from one or more Interviewer(s) (e.g., PCI agent 2015) and may be routed to the CI member (e.g., associated with user device 2005-*b*) by a collective intelligence server. In some examples, the collective intelligence server may receive the inquiries from the Interviewer (e.g., associated with user device 2005-*a*). In some cases, the collective intelligence server may process the inquiry and route a representation of said inquiries to a plurality of human participants in real-time (e.g., visually represented as a likeness of the interviewing user which could be a still image and streamed audio of the interviewing user, streamed audio and video of the interviewing user, or an animated AI-generated interviewing agent 2020) for display on the many-to-one chat application (i.e., on user interface of computing device 2005-*b*) associated with the user logged in as CI member.

Referring again to FIG. 20, a user interface 2010 of the one-to-many application may run on the Local Computing Device (i.e., user device 2005-*a*) used by an interviewer. A PCI agent 2015 may appear on the user interface 2010 (e.g., screen) of the local computing device 2005-*a* as an animated avatar that may speak partially pre-planned introductory words (as shown with reference to FIG. 20).

Additionally, as shown in FIG. 20, the user (i.e., interviewer) of the local computing device 2005-*a* may then be given the opportunity to enter a question via text (e.g., as shown in FIG. 20) or by natural voice which may be converted to text via a speech-to-text module. As described, the question from the interviewer may be routed via the Collective Intelligence Server (as described with reference to FIG. 19) in real-time to the plurality of CI Members for display on the associated computing devices (e.g., computing device 2005-*b*).

In some cases, an example interface (e.g., screen) of the local computing device 2005-*b* of a CI member using a many-to-one instance of the chat application may be shown in FIG. 20. As shown on the CI member's interface, the interviewer may be represented visually as a streamed video or as an animated avatar, i.e., referred to herein as interviewing agent 2020. The video or avatar or interviewing agent 2020 may be configured to verbally express to the user (i.e., the CI Member) the question that may be entered by the interviewer using PCI agent 2015.

For example, the question asked by the user of 2005-*a* via interface 2010 of computing device 2005-*a* may be "Which team will win the Super Bowl this year?". The same question may appear as being asked by a likeness 2020 which may be a still image and streamed audio of the interviewing user, streamed audio and video of the interviewing user, or an animated AI-generated interviewing agent of user device 2005-*b* associated with the CI member. Additionally, the CI member may be asked to enter an answer via text (as shown in FIG. 20) or by voice which may be converted to text via a speech-to-text module. For example, the response by the user of computing device 2005-*b* may be "Kansas City because they absolutely have the best quarterback this year".

Figure 21:
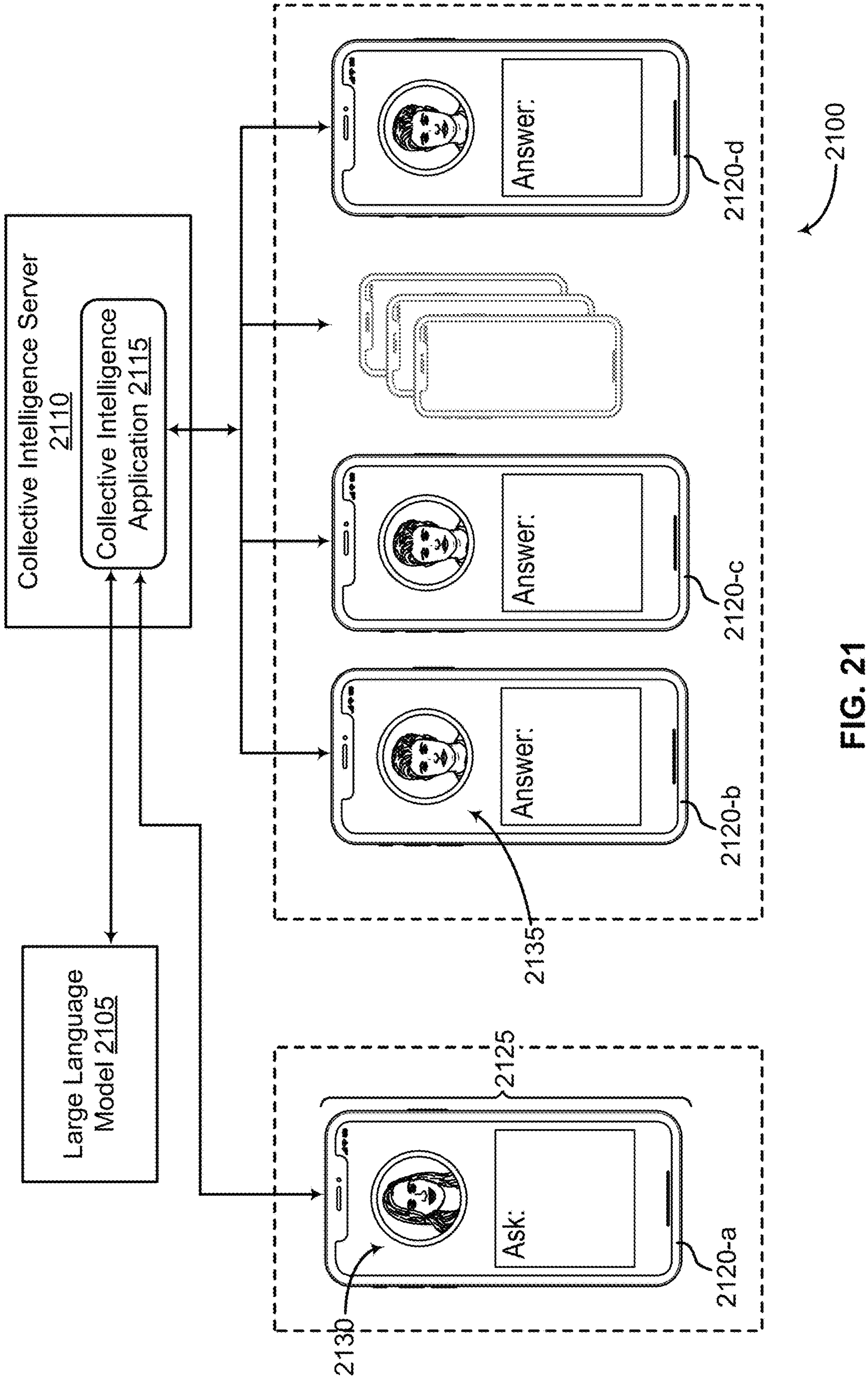
FIG. 21 shows an example of a system of an embodied large-scale personified collective intelligence according to aspects of the present disclosure.

FIG. 21 shows an example of a system 2100 of an embodied large-scale personified collective intelligence according to aspects of the present disclosure.

System 2100 is an example of, or includes aspects of, the corresponding element described with reference to FIGS. 19 and 20. In one aspect, system 2100 includes large language model 2105, collective intelligence server 2110, computing device 2120, and user (e.g., a plurality of users).

Referring to FIG. 21, computing device 2120-*a* includes user interface 2125 and personified collective intelligence agent 2130. User interface 2125 is an example of, or includes aspects of, the corresponding element described with reference to FIGS. 1-6, 8, 9, and 20. Personified collective intelligence agent 2130 is an example of, or includes aspects of, the corresponding element described with reference to FIGS. 19 and 20.

As shown in FIG. 21, computing device (e.g., computing devices 2120-*b*, 2120-*c*, 2120-*d*, etc.) includes user interface and interviewing agent 2135. User interface is an example of, or includes aspects of, the corresponding element described with reference to FIGS. 1-6, 8, 9, and 20. Likeness 2135 of the interviewer which may be streamed audio and/or video of the interviewing user or an AI-driven interviewing agent is an example of, or includes aspects of, the corresponding element described with reference to FIG. 20.

One or more embodiments include an interviewer that may be a human participant logged in as an interviewer and connected to the system 2100 via a one-to-many chat application on user interface 2125 with a PCI agent 2130 on user device 2120-*a*. Additionally, CI Member(s) may refer to a plurality of users or human participants. For example, the CI members (e.g., users logged in as CI members) may refer to a group of 50, 500, or 5000 participants who are each connected to the system 2100 via a many-to-one chat application on user interface (e.g., user interface on user devices 2120-*b*, 2120-*c*, 2120-*d*, etc.) that includes a likeness 2135 of the interviewer which may be streamed audio and/or video of the interviewing user or an AI-driven interviewing agent.

In some cases, the many-to-one chat application may provide for each CI Member to enter a response (e.g., in a conversational form) in reply to one or more received inquiries. For example, the inquiries may be received (e.g., and originate) from one or more Interviewer(s) and may be routed to the CI member by a collective intelligence server 2110. Further details regarding the transmission of inquiries and responses between the Interviewer and the CI member are described with reference to FIGS. 19-20 and repeated description is omitted herein for brevity.

In some cases, the response (e.g., in text, voice, or video form) from each of a plurality of CI Member(s) may be routed to the conversational server 2110 for processing into an Aggregated Collective Intelligence Response. In some cases, the plurality of real-time responses from the plurality of CI Member(s) may be aggregated via calls to a Large Language Model (LLM) 2105 into a Collective Response in first person conversational form. Large language model 2105 is an example of, or includes aspects of, the corresponding element described with reference to FIGS. 1, 2, and 19. In preferred embodiments, the Collective Response is routed to the PCI agent for first-person expression to the user(s) of 2120*a*. In some cases, the Collective Response is also routed to the PCI agent for first person expression to the users of 2120-*b*, 2120-*c* . . . 2120-*d*. This is because the participants 1930 who provide the real-time input to the collective intelligence often need to see a real-time representation of the Collective Response, especially during an interactive bi-directional conversation between the interviewer and the personified collective intelligence.

In some examples, the collective intelligence server 2110 may receive the inquiries from the computing device 2120-*a* of the interviewing user. In some cases, the collective intelligence server 2110 may process the inquiry and route a representation of said inquiries to a plurality of human participants using likeness 2135 of the interviewer which may be streamed video of the interviewing user or an AI driven interviewing agent on user device 2120-*b*, 2120-*c*, 2120-*d*, etc. In some cases, the Collective Intelligence Server 2110 may work in combination with the one-to-many chat applications running on the local computing devices (e.g., 2120-*a*) of the interviewer(s) and the many-to-one chat applications running on the local computing devices (e.g., 2120-*b*, 2120-*c*, 2120-*d*, etc.) of the plurality of CI Members. Collective intelligence server 2110 is an example of, or includes aspects of, the corresponding element described with reference to FIG. 19. In one aspect, collective intelligence server 2110 includes collective intelligence application 2115. In some examples, collective intelligence application 2115 may refer to the one-to-many chat application and/or the many-to-one chat application.

According to some examples, the one-to-many chat application may support text, voice, video, or VR chat on a computing device 2120-*a* depicting the PCI agent 2130. Additionally, in some examples, the many-to-one chat application may support text, voice, video, or VR chat on a computing device (e.g., computing devices 2120-*b*, 2120-*c*, 2120-*d*, etc.) depicting the likeness 2135 of the interviewing user or interviewing agent. Computing device (e.g., 2120-*a*, 2120-*b*, 2120-*c*, 2120-*d*) is an example of, or includes aspects of, the corresponding element described with reference to FIGS. 1, 2, 19, and 20.

Referring to FIG. 21, the interviewer may be configured to hold a conversational exchange with a real-time collective intelligence comprised of a plurality of users, said conversational exchange including at least one question or inquiry expressed by the interviewer via the user interface, collective intelligence server 2110, and interviewing likeness or agent 2135. In some examples, same question appears on the screen of user devices 2120-*b*, 2120-*c*, 2120-*d* (e.g., appears as being asked by interviewing agent 2135) associated with each of the N members. Additionally, each of the N members may be asked to enter an answer via text (as shown in FIG. 21) or by voice which may be converted to text via a speech-to-text module.

In some cases, each of the responses from the CI Members may be routed in real-time to the Collective Intelligence server 2110 which may process the responses, generate a collective response, and send the collective response to the Local Computing Device 2120-*a* associated with the interviewer, depicting the PCI agent 2130. In some cases, the collective response may be verbally expressed in the first person language. For example, the collective response may be "Based on the Collective Intelligence of 4264 real-time human members, I believe that Kansas City is the most likely to win the Super Bowl because (i) they currently have the most reliable and talented quarterback, and (ii) they have a strong history of avoiding serious injuries for the key players."

According to an embodiment, a Collective Intelligence server 2110 may run a Collective Intelligence Application 2115. In some cases, the Collective Intelligence application 2115 may communicate with the local computer(s) 2120-*a* of the one or more Interviewer(s). Additionally, the Collective Intelligence Application 2115 may communicate with the (N) local computers (e.g., 2120-*b*, 2120-*c*, 2120-*d*, etc.) of the (N) collective intelligence members. Additionally, the Collective Intelligence Application 2115 may communicate with one or more Large Language Models 2105 via API interactions (or embed the LLM within the associated code).

Referring to FIG. 21, the interviewer(s) (i.e., only the interviewer(s)) may see the Personified Collective Intelligence agent 2130. For example, the PCI agent 2130 may be seen as a text bot, voice bot, or visual avatar bot. Additionally, the large group of CI members each may see the interviewer either by viewing the real-time text chat of the interviewer or by viewing the real-time video stream or virtual avatar of the interviewer, via interviewing agent 2135.

According to one or more embodiments, the CI members may see a representation of the Personified Collective Intelligence (PCI) agent 2130 (in addition to the interviewer via interviewing agent 2135) on the local computing devices (e.g., 2120-*b*, 2120-*c*, 2120-*d*, etc.). As such, the CI members may see (and/or hear, when voice is enabled) the PCI responses as the responses emerge during the conversation. Accordingly, by enabling CI members to see a representation of the PCI agent, embodiments may enable follow-up questions from the interviewer that refer to a prior response from the PCI agent.

Accordingly, the interviewer may hold a real-time conversation with a personified collective intelligence (PCI) agent, ask questions and then follow up with additional questions, as the PCI (e.g., PCI agent 2130) responds in real time. In some cases, when the CI Members may not be exposed to the PCI responses, the CI members may be confused about follow-up questions from the interviewer as the CI members may be uninformed of the conversational exchange between the PCI agent 2130 and the interviewer. Therefore, by providing conversational context to the CI Members based on displaying the PCI dialog to the CI members, embodiments may enable the complete population of CI members to hold a real-time conversation in first-person form with the Interviewer(s).

Therefore, embodiments of the present disclosure may create a new form of real-time conversational communication from one to many where the number of members is very large. As such, individuals may be enabled to hold an interactive conversation with a Collective Superintelligence (CSI) that substantially exceeds the intellectual abilities of the individual CI members in various capacities.

Accordingly, an apparatus for enabling real-time conversational interaction with an embodied large-scale personified collective intelligence is described. One or more aspects of the apparatus include a collective intelligence server configured to receive inquiries from an interviewer and route a representation of the inquiries to a plurality of human participants; a plurality of computing devices, each associated with one of the plurality of human participants, configured to receive and display the inquiries and to receive and transmit a plurality of responses from the plurality of human participants to the collective intelligence server; a large language model configured to receive, analyze, and aggregate the plurality of responses to determine a collective intelligence response; and a personified collective intelligence agent configured to receive and express the collective intelligence response in a first-person conversational form.

In some aspects, the personified collective intelligence agent is an AI-powered conversational agent that responds conversationally to one or more dialog-based inquiries based on aggregated dialog-based input collected from the plurality of human participants. In some aspects, the personified collective intelligence agent is configured to provide its conversational response in first person, thereby taking on a personified identity of a collective intelligence.

In some aspects, the personified collective intelligence agent is assigned a name and responds conversationally to inquiries in first-person voice of an entity with that name. In some aspects, the personified collective intelligence agent is an AI-powered avatar with a visual facial representation in 2D or 3D that is animated in real-time and outputs real-time dialog as computer-generated voice, complete with facial expressions and vocal inflections.

In some aspects, the collective intelligence server is further configured to send a representation of the collective intelligence response to at least a computing device used by the interviewer such that the collective intelligence response is locally displayed to the interviewer as text chat, audio chat, video chat, or VR chat via a one-to-many chat application on the computing device used by the interviewer.

In some aspects, the large language model is further configured to identify a most supported response or responses, for example by assessed sentiment, confidence, and/or conviction across the population of users as described herein, among the plurality of responses within a text file comprising the plurality of responses and to report the most supported response or top few responses in conversational form. In some aspects, the large language model is further configured to report a most supported response or prescribed top few responses in first-person conversational form. In some aspects, the large language model is further configured to add a conversational preamble to the collective intelligence response to give context for the personified collective intelligence agent. In some aspects, the plurality of computing devices are further configured to receive and display the collective intelligence response.

In some aspects, the large language model is further configured to rank support of answer groupings based on a measure of expressed conviction within each response from each of the plurality of human participants, wherein a response with higher expressed conviction contributes more to the ranked support of an answer grouping than a response with lower expressed conviction. In some aspects, the expressed conviction is assessed based on the conversational language of the response. In some aspects, the expressed conviction is assessed based on vocal inflections and/or facial expressions of the human participant who expressed the response. In some aspects, the ranking of the support of the answer groupings is further weighted by sentiment data such as textual sentiment, vocal inflection sentiment, or facial expression sentiment. In some aspects, the collective intelligence server is further configured to perform real-time language translation.

In some aspects, the personified collective intelligence agent is further configured to display its collective intelligence response to the plurality of human participants, enabling them to see and hear each collective intelligence response as it emerges during the conversation. In some aspects, the display of the collective intelligence response to the plurality of human participants provides conversational context for follow-up questions from the interviewer that refer to a prior conversational response from the personified collective intelligence agent. In some aspects, the interviewer is enabled to hold a real-time conversation with the personified collective intelligence agent, asking questions and then following up with additional questions, as the personified collective intelligence agent responds in real-time.

In some aspects, the large language model is further configured to categorize elements within responses as either answers to a posed question or reasons to support or reject a given answer. In some aspects, the large language model is further configured to group similar answers within a certain threshold of similarity, thereby creating answer groupings that effectively mean the same thing. In some aspects, the large language model is further configured to group similar reasons within each answer grouping, thereby creating reason groupings.

In some aspects, the large language model is further configured to rank the support of the answer groupings from a most supported answer grouping to a least supported answer grouping. In some aspects, the large language model is further configured to rank the support of reason groupings that are associated with each unique answer grouping, from a most popular reason grouping associated with that answer grouping to a least supported reason grouping associated with that answer grouping.

Some examples of the apparatus, system, and method further include a mechanism for enabling participants to take turns having the role of the interviewer, wherein the participants have a shared experience of participating as part of a real-time personified collective intelligence that can answer questions posed to it in a coherent, conversational, first-person manner, and also get a chance to ask questions to the personified collective intelligence agent.

Some examples of the apparatus, system, and method further include a right to ask a question may be dependent at least in part on whether that user provides responses to a prior question, thereby incentivizing users to provide thoughtful answers that are likely to represent the real-time personified collective intelligence of the plurality of human participants. Some examples of the apparatus, system, and method further include only users who provided responses in a prescribed top percentage of popular responses to the prior question are given credits that can be redeemed to ask a question or are considered in a lottery for asking a question.

In some aspects, the large language model is further configured to perform an emotional assessment and/or conviction assessment determined for each of a plurality of CI Members based on their captured voice, captured facial expressions, and/or captured language content of their response. In some aspects, the large language model is further configured to perform an emotional aggregation that is used at least in part to determine the facial expressions and/or vocal inflections of the personified collective intelligence when it reports the collective intelligence response.

In some aspects, the conviction is assessed based on the language of the response, vocal inflections, and/or facial expressions of the human participant who expressed the response. In some aspects, the ranking of support of answer groupings is further weighted by sentiment data such as textual sentiment, vocal inflection sentiment, or facial expression sentiment.

A Conversational Interaction Process

The present disclosure describes systems and methods that may enable one or more interviewers to ask questions to and hold a conversation with a real-time personified collective intelligence agent. For example, the interviewer may be a human participant. The response of the real-time personified collective intelligence agent may be based on the real-time responses of a plurality of collective intelligence (CI) members. In some cases, the plurality of CI members are organized into a set of subgroups for local conversational deliberation, each subgroup containing a surrogate agent that observes the local deliberation and passes insights to one or more other subgroups to enable a unified large-scale deliberation as described with respect to FIGS. 1 to 18. In some cases, a participant (e.g., human participant) refers to a user in the system. According to an embodiment, the users may log-in to the chat application (e.g., a one-to-many chat application or a many-to-one chat application) as an 'Interviewer' or 'CI Member'.

In some examples, each interviewer participant may be enabled to use a One-to-Many Chat Application on a local computing device to send information to and receive information from a collective intelligence (CI) Server. In some cases, each CI Member may be enabled to use a Many-to-One chat application to send information to and receive information from the CI Server. According to an embodiment, the CI Server may work in combination with the one-to-many chat applications running on the local computing devices of the interviewer(s) and the many-to-one chat applications running on the local computing devices of the plurality of CI Members.

According to an embodiment, the CI server receives an inquiry from an interviewer via a local computing device and sends a representation of the received inquiry to the plurality of CI Members. Further, the plurality of CI members respond to the received inquiry and transmit the response to the CI server which stores the plurality of received responses. In some cases, the CI server may process the received responses (e.g., generate an aggregated response, rank the responses, etc.) and sends the processed response to the interviewer. In some cases, the plurality of CI members deliberate on the inquiry conversationally in local subgroups before the responses are aggregated, each subgroup containing a surrogate agent that observes the local deliberation and passes insights to one or more other subgroups to enable a unified large-scale deliberation as described with respect to FIGS. 1 to 18. Accordingly, embodiments of the present disclosure are able to perform a real-time collective superintelligence process which may combine the knowledge, wisdom, insight, and intuitions of a large-scale human population (e.g., thousands of people).

Figure 22:
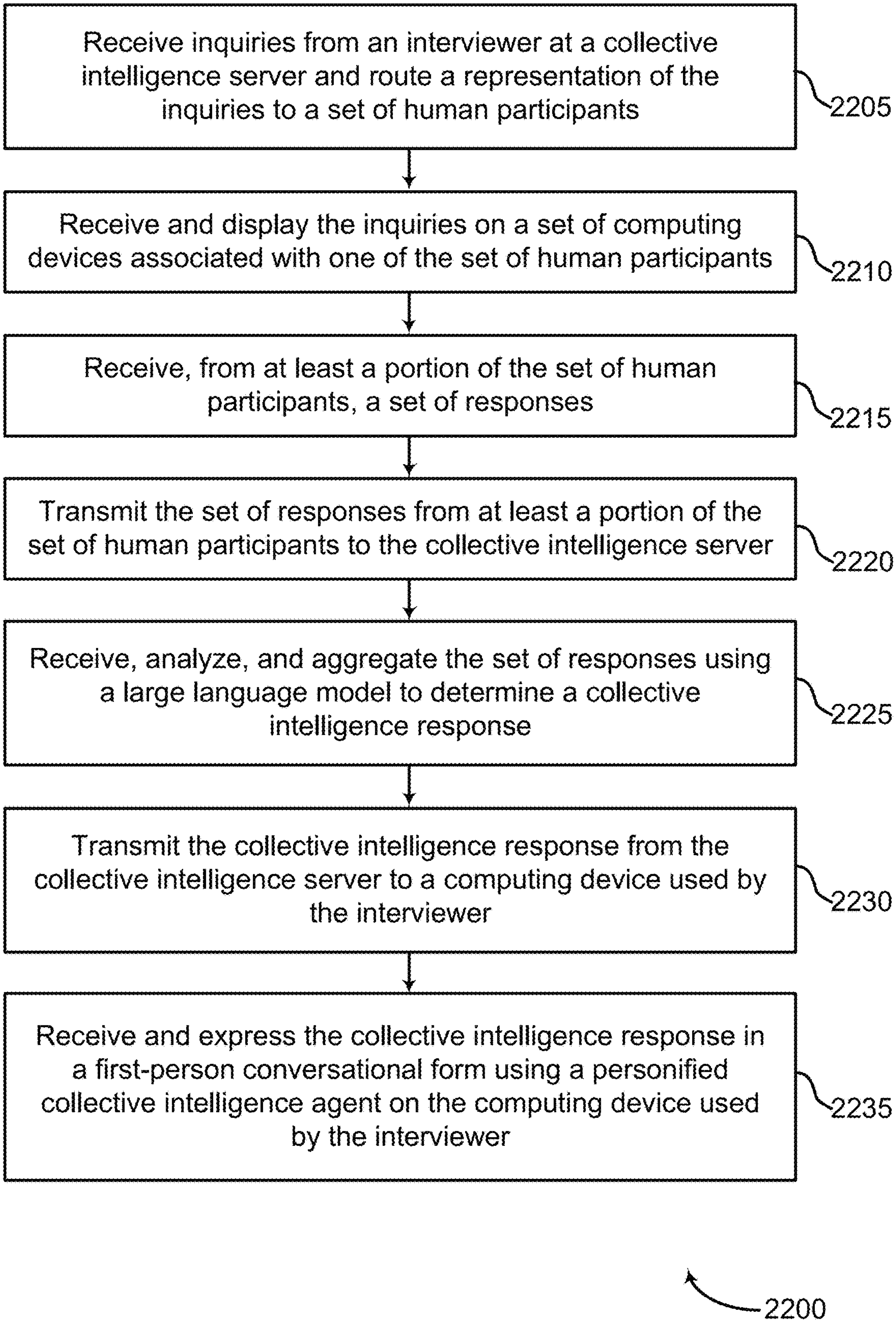
FIG. 22 shows an example of a method for communication systems according to aspects of the present disclosure.

FIG. 22 shows an example of a method 2200 for communication systems according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2205, the system receives inquiries from an interviewer at a collective intelligence (CI) server and routes a representation of the inquiries to a set of human participants. In some cases, the operations of this step refer to, or may be performed by, a collective intelligence server as described with reference to FIGS. 19 and 21.

In some cases, the CI Server may receive an inquiry (e.g., in conversational form) from an interviewer via a local computing device. For example, the local computing device may be used by the interviewer, where the local computing device may run a one-to-many chat application. For example, the inquiry may be a question entered in text chat form, such as "Which team will win the super bowl this year and why?". The inquiry may include the same conversational content, be expressed vocally, and may be captured by a microphone connected to the local computing device of the interviewer. In some examples, the vocal inquiry may be stored as a digitized audio signal and/or may be converted from an audio signal to a textual representation using a voice to text converter module.

In some cases, a representation of the inquiry entered into the one-to-many chat application on the local computing device of the interviewer may be sent over a communication channel and received by the CI Server. In some cases, the inquiry may be stored in a memory accessible to the CI Server along with relevant data (such as, time and date of the inquiry, a username, other identifier representative of the specific human participant, i.e., the interviewer asking the question). For example, the interviewer may be a human moderator.

At operation 2210, the system receives and displays the inquiries on a set of computing devices, each associated with one of the set of human participants. In some cases, the operations of this step refer to, or may be performed by, a computing device as described with reference to FIGS. 1, 2, and 19-21. In some cases, the set of human participants is organized into a plurality of small local subgroups, each subgroup containing a surrogate agent that observes the local deliberation and passes insights to one or more other subgroups to enable a unified large-scale deliberation as described with respect to FIGS. 1 to 18.

According to an embodiment, the CI Server may send a representation of a received inquiry (e.g., in conversational form) to the plurality of CI Members. In some cases, the sending process may trigger the display of said inquiry on each of the computing devices of said plurality of CI Members via a local many-to-one chat application (e.g., at approximately the same time). In some examples, the local display of the inquiry may be a textual display of a text-based inquiry on a screen associated with the local computing device of the CI Member. In some examples, the local inquiry display may be an audio display or streamed video display of a verbally expressed conversational inquiry via speakers associated with the local computing device of the CI Member.

In some examples, the local inquiry display may include the display of a graphical avatar (e.g., interviewing agent as described in FIGS. 20-21) that may appear and sound as if verbally expressing the conversational inquiry to the CI Member on the associated member's local computing device. In some cases, an interviewing agent may be used which may ensure to the CI Member that the inquiry may have originated from a designated interviewer. In some cases, a local text-to-avatar converter module may be present on the local computing device as part of the local many-to-one chat application. For example, the local text-to-avatar converter module may receive a textual inquiry from the CI Server and display the inquiry as an audio/visual representation of an interviewing agent verbally expressing the inquiry.

At operation 2215, the system receives from at least a portion of the set of human participants a set of responses. In some cases, the operations of this step refer to, or may be performed by, a computing device as described with reference to FIGS. 1, 2, and 19-21. In some cases, each of the plurality of CI Members may be presented the same interviewer inquiry in visual and/or audio form on the local computing device (e.g., at approximately the same time).

In some cases, the human participants (e.g., CI members) may respond to the inquiry received from the interviewer. For example, the CI member may use a user interface of the associated computing device/user device to respond to the received inquiry. In some cases, the plurality of CI Members may enter a response to the inquiry into the local computing device, e.g., by typing the response as text, expressing the response verbally into a microphone, and/or expressing the response into a camera that may capture the facial expressions of the CI members.

At operation 2220, the system transmits the set of responses from the at least a portion of the set of human participants to the collective intelligence server. In some cases, the operations of this step refer to, or may be performed by, a computing device as described with reference to FIGS. 1, 2, and 19-21.

For example, each computing device of the plurality of computing devices may be associated with one of a plurality of CI Members, where the responses entered by each of the CI Members in reply to the interviewer inquiry may be transmitted by the local computing device to the CI server.

In some cases, a representation of each response may then be sent from each local computing device to the CI Server, where the representation may be a text message in textual form entered by the CI Member. Additionally or alternatively, the representation may be a verbally entered audio signal converted to text. Additionally or alternatively, the representation of each response may include vocal inflection and/or facial expression information associated with the conversational content. In some cases, the CI Server may receive and store a plurality of responses (e.g., in conversational form) from the plurality of computing devices.

At operation 2225, the system receives, analyzes, and aggregates the set of responses using a large language model to determine a collective intelligence response. In some cases, the operations of this step refer to, or may be performed by, a large language model as described with reference to FIGS. 1, 2, 19, and 21. In some cases, the set of human participants is organized into a plurality of small local subgroups for local deliberation prior to member responses being analyzed and aggregated, each subgroup containing a surrogate agent that observes the local deliberation and passes insights to one or more other subgroups to enable a unified large-scale deliberation as described with respect to FIGS. 1 to 18.

According to an embodiment, the CI Server may process the plurality of received and stored responses to determine a collective intelligence response. In some cases, the processing may include creating an aggregated text file that comprises a listing of the plurality of responses. For example, each response may be associated with a unique identifier linking the response to the CI member who may have provided the unique response (e.g., or the member computing device).

Therefore, the text file may include a listing, for example, of member names, where each member name may be associated with a text representation of the conversational response to the interview inquiry. In some cases, additional information may be associated with the response when the textual content of a member's response may be generated via voice to text conversion. For example, the additional information may refer to vocal inflection information linking emotional content to the complete response or specific portions of the response.

In some cases, additional information may be associated with the response when textual content of a member's response may be generated via video to text conversation. For example, the additional information may refer to facial expression information linking emotional content to the complete response or specific portions of the response. According to an embodiment, the text file may be sent from the CI Server (via one or more API calls) to a Large Language Model (such as, but not limited to ChatGPT or Gemini AI), wherein the API call may include a prompt that specifies the requested processing to be performed on the text file.

According to an embodiment, the requested processing may include a request for the LLM to identify the most supported response or responses among the plurality of responses within the text file. Additionally, the LLM may report the most supported response or one or more popular responses in conversational form. For example, the LLM may report—"When considering which team will win the Super Bowl this year and why, the most supported response among the plurality of responses was that Kansas City will win the Super Bowl because they currently have the most reliable and talented quarterback."

Additionally, in some cases, the LLM request may report the most supported response or top few responses in first person conversational form. For example, the response may further be modified by the LLM such as—"When considering which team will win the Super Bowl this year and why, I believe that Kansas City is the team most likely to the Super Bowl because they currently have the most reliable and talented quarterback."

In some cases, a pre-amble may be added to the conversational response to provide context for the Personified Collective Intelligence Agent. For example, the response from the LLM may be—"My name is Una and I am a collective intelligence currently comprised of 4264 real-time members. Based on the combined insights of these members, I believe that Kansas City is the team most likely to the Super Bowl because they currently have the most reliable and talented quarterback."

In some cases, the processing step may be divided into a series of API calls the Large Language Model, where each API call may include performing further processing on the text file. As a first step, the LLM may identify each of the unique responses present by grouping duplicates within a threshold of similarity and reporting the number of duplicates for each unique response. Next, the LLM may report a reformulated version of the text file with answers grouped by duplication and rank ordered by number of duplications identified. In some cases, the answers may be reported such that the most popular answers may be placed/ranked first (e.g., based on number of duplications) and the least popular answers may be placed/ranked last (e.g., based on number of duplications). According to an embodiment, the ranking may be further processed based on consideration of sentiment data, such as textual sentiment, vocal inflection sentiment, or facial expression sentiment. In some cases, the sentiment data may weight the rankings by sentiment strength and the number of duplications.

Additionally, as a second step, the LLM may be sent an updated version of the text file (with the prior grouping performed) and the LLM may identify each of the unique reasons (i.e., justifications) associated with each of the unique responses, while grouping duplicate reasons within a threshold of similarity and reporting the number of duplicates for each reason (i.e., justification). In some cases, the LLM may report a reformulated version of the text file. For example, the reported text file may include justifications (e.g., within each answer category) grouped by duplication and rank ordered by number of duplications. In some cases, the rank ordering of reasons may be weighted by sentiment data such as textual sentiment, vocal inflection sentiment, and/or facial expression sentiment.

Additionally, as a third step, the LLM may be sent an updated version of the text file i.e., including duplicate answers grouped and rank ordered based on the number of duplications, and within each answer category, the reasons grouped by duplication and rank ordered by the number of duplications. Additionally, the LLM may be prompted to identify the top answer along with the top reasons for the answer, e.g., the most supported answer and the corresponding reason. Additionally or alternatively, the LLM may be prompted to identify a predetermined number (e.g., any specific number) of top answers, by rank, and a predetermined number (e.g., any number) of top reasons for each answer, by rank.

According to an embodiment, the answer output may be requested, in the first person and in conversational form, from the perspective of the Personified Collective Intelligence Agent. In some cases, the answer output may include the most supported (e.g., top two) answers, and the most supported (e.g., top two) reasons for each answer.

For example, when there are 4264 members who have responded to the interviewer's inquiry regarding winner of the Super Bowl and the associated reason, the response generated, in conversational form, may be—"My name is Una and I am a collective intelligence currently comprised of 4264 real-time human members. Based on the combined insights of these members, I believe that Kansas City is the most likely team to win the Super Bowl because (i) they currently have the most reliable and talented quarterback, and (ii) they have a strong history of avoiding serious injuries. If not Kansas City, my second most likely choice is Philadelphia because (i) they have the best all-around team, and (ii) they have the most to prove and may be the most aggressive."

At operation 2230, the system transmits the collective intelligence response from the collective intelligence server to a computing device used by the interviewer. In some cases, the operations of this step refer to, or may be performed by, a collective intelligence server as described with reference to FIGS. 19 and 21.

In some cases, the CI Server may send a conversational representation of the final answer output (referred to herein as a collective response) after receiving a final version of the processed set of responses from the Large Language Model. In some cases, the collective response may be sent to at least the local computing device of the interviewer such that the conversational representation of the collective response may be locally displayed to the interviewer in the form of text chat, audio chat, video chat, or VR chat via the one-to-many chat application on the interviewer's local computing device.

According to an embodiment, the local chat application may display text chat as if from a simulated user, for example named Una, that represents the Personified Collective Intelligence agent. For example, Una may appear to the user on a personal computer, laptop, or phone as an animated avatar that may speak vocally.

Referring again to the example in which 4264 members respond to an interviewer question regarding the winner of the Super Bowl and the associated reason, the collective response may appear in the text stream of chat messages as a personified message of the form: "UNA: I'm a collective intelligence currently comprised of 4264 real-time human members. Based on the combined insight of these members, I believe that Kansas City is the most likely to win the Super Bowl because (i) they currently have the most reliable and talented quarterback, and (ii) they have a strong history of avoiding serious injuries. If not Kansas City, my second most likely choice is Philadelphia because (i) they have the best all-around team, and (ii) they have the most to prove and may be the most aggressive."

According to an embodiment, the Personified Collective Intelligence agent may refer to a chatbot that displays text messages on the local computer of the interviewer. Additionally or alternatively, the Personified Collective Intelligence agent (PCI agent) may refer to an animated visual avatar with embodied facial features. In some cases, the PCI agent may be configured to express the text representation as a visually displayed face that speaks the text verbally as audio output with corresponding facial motions and expressions.

As described, the collective response, received as a textual representation generated by the LLM, may be converted to audio voice that appears to be coming from a visually displayed animated avatar using a text to voice converter module and/or text to avatar converter module disposed within the local chat application on the local computing device of the interviewer.

Accordingly, in some examples, the interviewer may ask a question regarding Super Bowl to a collective intelligence, e.g., comprising 4264 human members, who receive the inquiry at approximately the same time and respond to the inquiry at approximately the same time. In some examples, the 4264 human members may have the said responses aggregated by a large language model such that a Personified Collective Intelligence agent responds on behalf of each of the members in the first person. In some cases the 4264 human members may be divided into a series of deliberative subgroups that are networked together using AI agents as described with respect to FIGS. 1 to 18, In some such embodiments the 4264 members deliberate on the question by discussing conversationally within said networked deliberative subgroups, thereby amplifying their combined intelligence prior to reaching a final answer as described with respect to FIG. 1 to FIG. 18.

For example, the PCI agent may express the most popular (e.g., strongest) aggregated views of the complete population. Considering the perspective of the interviewer, the process may resemble talking in real time to a Collective Superintelligence (CSI) that may combine the knowledge, wisdom, insight, and intuitions of a plurality of users (e.g., thousands of people), and respond instantly (e.g., as quickly and as naturally as talking to a single individual). According to an exemplary embodiment, the process may be used for small groups, for example 80 people, providing an interviewer (e.g., an employer) to capture the central insights from a large team of employees in real-time via conversational interaction.

At operation 2235, the system receives and expresses the collective intelligence response in a first-person conversational form using a personified collective intelligence agent on the computing device used by the interviewer. In some cases, the operations of this step refer to, or may be performed by, a personified collective intelligence agent as described with reference to FIGS. 19-21. In some cases, the plurality of real-time responses from the plurality of human participants may be aggregated via calls to a Large Language Model (LLM) into a Collective Response in first person conversational form.

Accordingly, a method for enabling real-time conversational interaction with an embodied large-scale personified collective intelligence is described. One or more aspects of the method include receiving inquiries from an interviewer at a collective intelligence server and routing a representation of the inquiries to a plurality of human participants; receiving and displaying the inquiries on a plurality of computing devices, each associated with one of the plurality of human participants; receiving from at least a portion of the plurality of human participants a plurality of responses; transmitting the plurality of responses from the at least a portion of the plurality of human participants to the collective intelligence server; receiving, analyzing, and aggregating the plurality of responses using a large language model to determine a collective intelligence response; transmitting the collective intelligence response from the collective intelligence server to a computing device used by the interviewer; and receiving and expressing the collective intelligence response in a first-person conversational form using a personified collective intelligence agent on the computing device used by the interviewer.

In some aspects, the inquiries are received from the interviewer via a one-to-many chat application running on a respective computing device used by each interviewer. In some aspects, the representation of the inquiries is routed to the plurality of human participants in real-time.

In some aspects, the inquiries are displayed on the plurality of computing devices via a many-to-one chat application running on each computing device. In some aspects, the plurality of responses are transmitted from the plurality of human participants to the collective intelligence server in real-time.

In some aspects, the personified collective intelligence agent is an AI-powered conversational agent that responds conversationally to the inquiries. In some aspects, the personified collective intelligence agent provides its conversational response in first person, thereby taking on a personified identity of a collective intelligence.

In some aspects, the personified collective intelligence agent is assigned a name and responds conversationally to inquiries in first-person voice of an entity with that name. In some aspects, the personified collective intelligence agent is an AI-powered avatar with a visual facial representation in 2D or 3D that is animated in real-time and outputs real-time dialog as computer-generated voice.

In some aspects, the personified collective intelligence agent is an AI-powered conversational agent that responds conversationally to one or more dialog-based inquiries based on aggregated dialog-based input collected from the plurality of human participants. In some cases, the plurality of human participants may be divided into a series of deliberative subgroups that are networked together using AI agents as described with respect to FIGS. 1 to 18, In some such embodiments the human participants deliberate among themselves by discussing conversationally within said networked deliberative subgroups prior to reaching a final collective response. In some aspects, the personified collective intelligence agent is configured to provide its conversational response in first person, thereby taking on a personified identity of a collective intelligence.

In some aspects, the personified collective intelligence agent is assigned a name and responds conversationally to inquiries in first-person voice of an entity with that name. In some aspects, the personified collective intelligence agent is an AI-powered avatar with a visual facial representation in 2D or 3D that is animated in real-time and outputs real-time dialog as computer-generated voice, complete with facial expressions and vocal inflections.

In some aspects, the collective intelligence server is further configured to send a representation of the collective intelligence response to at least a computing device used by the interviewer such that the representation of the collective intelligence response is locally displayed to the interviewer as text chat, audio chat, video chat, or VR chat via a one-to-many chat application on the computing device used by the interviewer.

In some aspects, the large language model is further configured to identify a most popular response or responses among the plurality of responses within a text file comprising the plurality of responses and to report the most popular response or top few responses in conversational form. In some aspects, the large language model is further configured to report a most popular response or prescribed top few responses in first-person conversational form. In some aspects, the large language model is further configured to add a preamble to the collective intelligence response to give context for the personified collective intelligence agent.

In some aspects, the plurality of computing devices are further configured to receive and display the collective intelligence response.

In some aspects, the large language model is further configured to rank support of answer groupings based on a measure of expressed conviction within each response from each of the plurality of human participants, wherein a response with higher expressed conviction contributes more to the ranked support of an answer grouping than a response with lower expressed conviction.

Some examples of the method, apparatus, non-transitory computer readable medium, and system further include transmitting the collective intelligence response from the collective intelligence server to the computing devices associated with at least a portion of the plurality of human participants. Some examples further include receiving and expressing the collective intelligence response in a first person conversational form using a personified collective intelligence agent on computing devices used by at least a portion of the plurality of human participants.

One or more embodiments of the present disclosure provide systems and methods that may be configured to support a large population of users who communicate in different languages by performing real-time language translation. In some cases, a baseline language may be defined on the Collective Intelligence Server for a given session. Additionally, each user of a local computing device may configure the language for the associated computing device, where the associated computing device may report the language setting upon connecting to the Collective Intelligence Server.

In case the messages received from an Interviewer are not represented in the baseline language, the messages may be converted to the baseline language and stored in memory accessible to the Collective Intelligence Server. Next, the stored messages may be sent to each of the local computing devices in the language associated with the settings of the computing device using a translation module. In some cases, the translation module may be locally stored and translation may be performed on the local computing device. Similarly, a message sent by the Collective Intelligence Members to the Collective Intelligence Server may be converted into the baseline language and stored locally. In some cases, the Large Language Model may be highly equipped to process the baseline language, for example English.

In some cases, the content expressed by the personified collective intelligence may be generated by a Large Language Model that may be tasked with ingesting, analyzing, and aggregating a plurality of real-time conversational responses. For example, the plurality of real-time conversational responses may be obtained from the plurality of human participants and a collective response may be generated that represents the combined knowledge, wisdom, insights, and intuitions expressed within the plurality of real-time conversational responses from the plurality of real-time human participants. In some cases the plurality of human participants may be divided into a series of deliberative subgroups that are networked together using AI agents as described with respect to FIGS. 1 to 18, In some such embodiments the human participants deliberate among themselves by discussing conversationally within said networked deliberative subgroups prior to the Large Language Model ingesting, analyzing, and aggregating a plurality of real-time conversational responses.

In some cases, the analysis of the real-time conversational responses may include categorizing elements within responses as either answers to a posed question, or as reasons to support or reject a given answer. Additionally, the analysis may include grouping similar answers (within a certain threshold of similarity) thereby creating answer groupings that effectively have the same meaning. Additionally, the analysis may include grouping similar reasons within each answer grouping thereby creating reason groupings.

Additionally, the analysis may include ranking the support of the answer groupings from the most popular answer grouping (i.e., received the most support within the plurality of responses from the plurality of human participants) to least popular answer grouping (i.e., received the least support within the plurality of responses from the plurality of human participants). In some cases, the ranking may optionally weight the ranked items based on popularity. In some cases, the ranking may optionally weight the ranked items based on the assessment on a measure of expressed conviction within each response from each of the plurality of human participants.

Accordingly, a response with high expressed conviction may contribute more to the ranked support of an answer grouping than a response with low expressed conviction. In some cases, the conviction may be assessed based on the conversational language of the response. In some cases, the conviction level associated with a given response may be assessed based on vocal inflections and/or facial expressions of the human participant who expressed the response.

Additionally, the analysis of the real-time conversational responses may further include ranking the support of reason groupings that may be associated with each unique answer grouping. For example, the support of reason grouping may be ranked from the most popular reason grouping associated with the answer grouping to the least popular reason grouping associated with the answer grouping. In some cases, the ranking may optionally weight the ranked items based on popularity.

In some cases, the ranking may optionally weight the ranked items based on the assessment on a measure of expressed conviction within each reason response from each of the plurality of human participants. In some examples, a reason response with high expressed conviction may contribute more to the ranked popularity of a reason grouping (i.e., associated with a particular answer grouping) than a reason response with low expressed conviction. In some cases, the conviction may be assessed based on the language of the reason response. In some cases, the conviction level associated with a given response may be assessed based on vocal inflections and/or facial expressions of the human participant who expressed the reason response.

Accordingly, the plurality of real-time responses from a plurality of real-time human participants may be rapidly assessed to produce a ranked ordering of the answers given (e.g., by answer grouping). Additionally, the plurality of real-time responses from a plurality of real-time human participants may be assessed to produce a ranked ordering of the reason groupings for each answer grouping. In some cases, select items from the ranked ordering may be sent back to the Large Language Model (or identified through API calls).

In some cases, a request may be made to create a Collective Response (e.g., in conversational form) that represents the prevailing view of the large population of human members. For example, the Collective Response may include the ANSWER RESPONSES within the most highly ranked Answer Grouping and the most supported REASON RESPONSES within the most highly ranked Reason Grouping that is associated with the most highly ranked Answer Grouping.

Next, the Large Language Model may process language within the most popular Answer Grouping to produce a summary in conversational form that represents the answer (i.e., most popular Answer Grouping) in concise language, expressed in the first person. For example, the summary may be a conversational statement expressing a particular answer to the inquiry provided by the interviewer and distributed in real-time to the large population of members. The Large Language Model may process the language within a number (e.g., a predefined number) of the most supported groupings (for example, top two) associated with the most supported answer grouping and may be tasked with generating a summary in conversational form that may represent the reason groupings in concise language in the first person.

Therefore, the Large Language Model may produce a block of conversational dialog in first person. For example, the block of conversational dialog may express the most supported answer grouping in concise form and may express a number of (for example, a predefined number such as the top two) reasons describing the answer grouping as a strong answer to the inquiry.

In some cases, the block of conversational dialog may be sent to the computing device of one or more interviewer(s) running the one-to-many instance of the client application. The dialog may be expressed in text form as a first-person text chat from a personified text bot. In some cases, the dialog may be expressed in audio and visual form as spoken dialog that may appear to be spoken by a realistic animated avatar representative (i.e., referred to herein as a Personified Collective Intelligent (PCI) agent). Accordingly, the interviewer may ask a question via the PCI agent and rapidly receive an answer from the (e.g., animated) PCI agent that represents the collective intelligence of a large population in first person conversational form along with supporting reasons for the answer.

According to an embodiment, the Personified Collective Intelligence (PCI) agent may be displayed as text, audio, video, or avatar to the plurality of collective intelligence (CI) members. Therefore, the members may be made aware of the response from the collective intelligence which enables the interviewer to ask follow-up questions that refer to (directly or implied from) a prior response from the PCI, where the members may be contributing to the collective intelligence. Accordingly, an interviewer may hold a real-time conversation discussion with a personified collective intelligence, i.e., asking questions and then following up with additional questions, since the PCI agent may respond in real-time.

According to an embodiment, the large population of human participants may be divided into a set of small sub-populations. In some cases, real-time communication may be enabled among the sub-populations, providing for deliberation among small groups. Accordingly, by generating sub-populations of a large population of human participants, embodiments of the present disclosure may amplify the collective superintelligence.

According to an embodiment of the present disclosure, participants may take turns having the role of the interviewer. For example, a large group of people, such as 50 people, 500 people, or 5000 people (or more than 5000 people) may have a shared experience of participating as part of a real-time Personified Collective Intelligence that can answer questions in a coherent, conversational, first-person manner. In some examples, the large group of people may get a chance to ask questions to the PCI agent.

As described herein, a coherent conversation refers to a conversation in which the participants are able to effectively communicate and understand each other. In case of small groups, each CI Member may earn credits that may be used to ask questions. In some cases, said credits being earned as a result of participating in answering questions. Accordingly, for example, a person (e.g., A) may be one of 50 people participating and each of the 50 people may be earning credits while answering questions.

In some examples, the person (e.g., A) may earn enough credits to occasionally ask a question. In some examples, the credit economy may be configured based on the number of participants. For example, a 50-person population may earn credits at a rate such that each individual may earn the right to ask a question approximately after every 50 questions. In some examples, such as in case of large groups, such as with 5000 members, users may be given the right to ask a question by randomized lottery. According to an embodiment, a high number of answered questions may increase an individual's chances of being selected in the lottery to ask a question.

In some cases, the lottery for each question may be open (e.g., only open) to the participants that answer the last question. In some cases, the lottery may consider the number of questions answered over a prior period of time and weights the chances of each user winning the chance to ask a question based on the number of questions the user may have participated in answering during the said period of time. In some cases, a human moderator may be able to assign the question asking ability to a particular user at a particular time.

According to an embodiment, users may be incentivized to provide thoughtful answers that may represent the collective intelligence of the population. In some cases, the right to ask a question may be dependent at least in part on whether the user provides responses to a prior question. In some examples, users (e.g., only users) that provide responses in the top 20% of popular responses to the prior question may be provided credits that can be redeemed to ask a question. Additionally or alternatively, users (e.g., only users) that provide responses in the top 20% of popular responses to the prior question may be considered in the lottery for asking a question. Accordingly, each participant may be incentivized to provide a thoughtful and reasonable answer.

The present disclosure describes systems and methods that enable very large groups of human users to form real-time collective intelligence (e.g., via an online method). In some cases, the real-time collective intelligence may be expressed verbally in the first person in the form of a Personified Collective Intelligence agent. In some cases, the facial expressions and/or vocal inflections that may be represented visually and aurally via the face and voice of the PCI, may be determined at least in part based on an emotional assessment and/or conviction assessment determined for each of a plurality of CI Members. For example, the emotional and conviction assessments may be based on the captured voice, captured facial expressions, and/or captured language content of the response.

According to an example, 4,264 members may reply to a question in real-time about predicting the winning team of the super bowl in a particular year. In some examples, the most popular answer may be Kansas City. In some examples, in case 2,345 of the members contribute to the choice Kansas City, an aggregation of emotional sentiment and/or conviction sentiment may be performed across the responses from the 2,345 members. In some examples, the aggregation may be used at least in part to determine the facial expressions and/or vocal inflections of the PCI agent when the agent (e.g., PCI agent) reports that Kansas City is the most likely winner.

For example, in case the aggregation shows low conviction, the PCI may be directed to express the answer with some uncertainty in the facial expressions and/or vocal inflections. Additionally or alternatively, for example, in case the overall conviction and/or emotion is very strong in favor of Kansas City, the PCI agent may be directed to express the answer with significant certainty and/or enthusiasm on the face and in vocal inflections. Accordingly, a large population may direct the informational content of collective responses and the conviction and/or emotional enthusiasm (e.g., or lack thereof) to define the display of the informational content.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for enabling real-time conversational interaction with an embodied large-scale personified collective intelligence, comprising:

a collective intelligence server configured to receive dialog-based conversational input from a human interviewer through a computing device, said conversational input including at least one inquiry, and route a representation of said at least one inquiry to a plurality of human participants;

a plurality of computing devices, each associated with one of the plurality of human participants, configured to receive and display the at least one inquiry and to receive and transmit a plurality of conversational responses from the plurality of human participants to the collective intelligence server;

a large language model configured to receive, analyze, and aggregate the plurality of conversational responses to determine a collective intelligence response; and a personified collective intelligence agent configured to receive and express the collective intelligence response in a first-person conversational form.

2. The system of claim 1, wherein the personified collective intelligence agent is an AI-powered conversational agent that responds conversationally to one or more dialog-based inquiries based on aggregated dialog-based input collected from the plurality of human participants.

3. The system of claim 1, wherein the personified collective intelligence agent is configured to provide its conversational response in first person, thereby taking on a personified identity of a collective intelligence.

4. The system of claim 1, wherein the personified collective intelligence agent is assigned a name and responds conversationally to inquiries in first-person voice of an entity with that name.

5. The system of claim 1, wherein the personified collective intelligence agent is an AI-powered avatar with a visual facial representation in 2D or 3D that is animated in real-time and outputs real-time dialog as computer-generated voice, complete with facial expressions and vocal inflections.

6. The system of claim 1, wherein the collective intelligence server is further configured to send a representation of the collective intelligence response to at least a computing device used by the interviewer such that the collective intelligence response is locally displayed to the interviewer as text chat, audio chat, video chat, or VR chat via a one-to-many chat application on the computing device used by the interviewer.

7. The system of claim 1, wherein the large language model is further configured to identify a most popular response or responses among the plurality of responses within a text file comprising the plurality of responses and to report the most popular response or top few responses in conversational form.

8. The system of claim 1, wherein the large language model is further configured to report a most popular response or prescribed top few responses in first-person conversational form.

9. The system of claim 1, wherein the large language model is further configured to add a conversational preamble to the collective intelligence response to give context for the personified collective intelligence agent.

10. The system of claim 1, wherein the plurality of computing devices are further configured to receive and display the collective intelligence response.

11. The system of claim 1, wherein the large language model is further configured to rank support of answer groupings based on a measure of expressed conviction within each response from each of the plurality of human participants, wherein a response with higher expressed conviction contributes more to the ranked support of an answer grouping than a response with lower expressed conviction.

12. The system of claim 11, wherein expressed conviction is assessed based on the conversational language of the response.

13. The system of claim 11, wherein the expressed conviction is assessed based on vocal inflections and/or facial expressions of the human participant who expressed the response.

14. The system of claim 11, wherein the ranking of the support of the answer groupings is further weighted by sentiment data such as textual sentiment, vocal inflection sentiment, or facial expression sentiment.

15. The system of claim 1, wherein the collective intelligence server is further configured to perform real-time language translation.

16. The system of claim 1, wherein the personified collective intelligence agent is further configured to display its collective intelligence response to the plurality of human participants, enabling them to see and hear each collective intelligence response as it emerges during the conversation.

17. The system of claim 16, wherein the display of the collective intelligence response to the plurality of human participants provides conversational context for follow-up questions from the interviewer that refer to a prior conversational response from the personified collective intelligence agent.

18. The system of claim 17, wherein the interviewer is enabled to hold a real-time conversation with the personified collective intelligence agent, asking questions and then following up with additional questions, as the personified collective intelligence agent responds in real-time.

19. The system of claim 1, wherein the large language model is further configured to categorize elements within responses as either answers to a posed question or reasons to support or reject a given answer.

20. The system of claim 19, wherein the large language model is further configured to group similar answers within a certain threshold of similarity, thereby creating answer groupings that effectively mean the same thing.

21. The system of claim 20, wherein the large language model is further configured to group similar reasons within each answer grouping, thereby creating reason groupings.

22. The system of claim 21, wherein the large language model is further configured to rank the support of the answer groupings from a most popular answer grouping to a least popular answer grouping.

23. The system of claim 22, wherein the large language model is further configured to rank the support of reason groupings that are associated with each unique answer grouping, from a most popular reason grouping associated with that answer grouping to a least popular reason grouping associated with that answer grouping.

24. The system of claim 1, further comprising a mechanism for enabling participants to take turns having the role of the interviewer, wherein the participants have a shared experience of participating as part of a real-time personified collective intelligence that can answer questions posed to it in a coherent, conversational, first-person manner, and also get a chance to ask questions to the personified collective intelligence agent.

25. The system of claim 24, wherein a right to ask a question may be dependent at least in part on whether that user provides responses to a prior question, thereby incentivizing users to provide thoughtful answers that are likely to represent the real-time personified collective intelligence of the plurality of human participants.

26. The system of claim 25, wherein only users who provided responses in a prescribed top percentage of popular responses to the prior question are given credits that can be redeemed to ask a question or are considered in a lottery for asking a question.

27. The system of claim 1, wherein the large language model is further configured to perform an emotional assessment and/or conviction assessment determined for each of a plurality of CI Members based on their captured voice, captured facial expressions, and/or captured language content of their response.

28. The system of claim 27, wherein emotional aggregation is used at least in part to determine the facial expressions and/or vocal inflections of the personified collective intelligence when it reports the collective intelligence response.

29. The system of claim 27, wherein the conviction is assessed based on the language of the response, vocal inflections, and/or facial expressions of the human participant who expressed the response.

30. The system of claim 27, wherein ranking of support of answer groupings is further weighted by sentiment data such as textual sentiment, vocal inflection sentiment, or facial expression sentiment.

31. The system of claim 1, wherein at least a portion of said participants are enabled to deliberate conversationally among themselves using a local chat application, said deliberation enabling at least a subset of the plurality of human participants to conversationally discuss possible answers to said at least one inquiry, said conversational discussion processed by said large language model when determining said collective intelligence response.

32. A method for enabling real-time conversational interaction with an embodied large-scale personified collective intelligence, comprising the steps of:

receiving dialog-based conversational input from a human interviewer through a computing device, said conversational input including at least one inquiry, and routing a representation of said at least one inquiry to a plurality of human participants;

receiving and displaying the said at least one inquiry on a plurality of computing devices, each associated with one of the plurality of human participants;

receiving from at least a portion of the plurality of human participants a plurality of conversational responses;

transmitting the plurality of conversational responses from the at least a portion of the plurality of human participants to a collective intelligence server;

receiving, analyzing, and aggregating the plurality of conversational responses using a large language model to determine a collective intelligence response;

transmitting the collective intelligence response from the collective intelligence server to a computing device used by the interviewer; and receiving and expressing the collective intelligence response in a first-person conversational form using a personified collective intelligence agent on the computing device used by the interviewer.

33. The method of claim 32, wherein the inquiries are received from the interviewer via a one-to-many chat application running on a respective computing device used by the each interviewer.

34. The method of claim 32, wherein the representation of the inquiries is routed to the plurality of human participants in real-time.

35. The method of claim 32, wherein the inquiries are displayed on the plurality of computing devices via a many-to-one chat application running on each computing device.

36. The method of claim 32, wherein the plurality of responses are transmitted from the plurality of human participants to the collective intelligence server in real-time.

37. The method of claim 32, wherein the personified collective intelligence agent is an AI-powered conversational agent that responds conversationally to the inquiries.

38. The method of claim 32, wherein the personified collective intelligence agent provides its conversational response in first person, thereby taking on a personified identity of a collective intelligence.

39. The method of claim 32, wherein the personified collective intelligence agent is assigned a name and responds conversationally to inquiries in first-person voice of an entity with that name.

40. The method of claim 32, wherein the personified collective intelligence agent is an AI-powered avatar with a visual facial representation in 2D or 3D that is animated in real-time and outputs real-time dialog as computer-generated voice.

41. The method of claim 32, wherein the personified collective intelligence agent is an AI-powered conversational agent that responds conversationally to one or more dialog-based inquiries based on aggregated dialog-based input collected from the plurality of human participants.

42. The method of claim 32, wherein the personified collective intelligence agent is configured to provide its conversational response in first person, thereby taking on a personified identity of a collective intelligence.

43. The method of claim 32, wherein the personified collective intelligence agent is assigned a name and responds conversationally to inquiries in first-person voice of an entity with that name.

44. The method of claim 32, wherein the personified collective intelligence agent is an AI-powered avatar with a visual facial representation in 2D or 3D that is animated in real-time and outputs real-time dialog as computer-generated voice, complete with facial expressions and vocal inflections.

45. The method of claim 32, wherein the collective intelligence server is further configured to send a representation of the collective intelligence response to at least a computing device used by the interviewer such that the representation of the collective intelligence response is locally displayed to the interviewer as text chat, audio chat, video chat, or VR chat via a one-to-many chat application on the computing device used by the interviewer.

46. The method of claim 32, wherein the large language model is further configured to identify a most popular response or responses among the plurality of responses within a text file comprising the plurality of responses and to report the most popular response or top few responses in conversational form.

47. The method of claim 32, wherein the large language model is further configured to report a most popular response or prescribed top few responses in first-person conversational form.

48. The method of claim 32, wherein the large language model is further configured to add a preamble to the collective intelligence response to give context for the personified collective intelligence agent.

49. The method of claim 32, wherein the plurality of computing devices are further configured to receive and display the collective intelligence response.

50. The method of claim 32, wherein the large language model is further configured to rank support of answer groupings based on a measure of expressed conviction within each response from each of the plurality of human participants, wherein a response with higher expressed conviction contributes more to the ranked support of an answer grouping than a response with lower expressed conviction.

51. The method of claim 32 further comprising:

transmitting the collective intelligence response from the collective intelligence server to the computing devices associated with at least a portion of the plurality of human participants; and receiving and expressing the collective intelligence response in a first person conversational form using a personified collective intelligence agent on computing devices used by at least a portion of the plurality of human participants.

52. The method of claim 32, further comprising the steps of:

enabling at least a portion of said participants to deliberate conversationally among themselves using a local chat application, said deliberation enabling at least a subset of the plurality of human participants to conversationally discuss possible answers to said at least one inquiry;

processing said conversational discussion by said large language model when determining said collective intelligence response.

* * * * *